US012591072B2

(12) United States Patent
Onishi et al.

(10) Patent No.: US 12,591,072 B2
(45) Date of Patent: Mar. 31, 2026

(54) RADIOGRAPHIC IMAGE ACQUIRING DEVICE, RADIOGRAPHIC IMAGE ACQUIRING SYSTEM, AND RADIOGRAPHIC IMAGE ACQUISITION METHOD

(71) Applicant: HAMAMATSU PHOTONICS K.K., Hamamatsu (JP)

(72) Inventors: Tatsuya Onishi, Hamamatsu (JP); Toshiyasu Suyama, Hamamatsu (JP); Satoshi Tsuchiya, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 199 days.

(21) Appl. No.: 17/918,380

(22) PCT Filed: Apr. 14, 2021

(86) PCT No.: PCT/JP2021/015464
§ 371 (c)(1),
(2) Date: Oct. 12, 2022

(87) PCT Pub. No.: WO2021/210612
PCT Pub. Date: Oct. 21, 2021

(65) Prior Publication Data
US 2023/0135988 A1     May 4, 2023

(30) Foreign Application Priority Data

| Apr. 16, 2020 | (JP) | 2020-073576 |
| Apr. 16, 2020 | (JP) | 2020-073578 |
| Feb. 15, 2021 | (JP) | 2021-021673 |

(51) Int. Cl.
*G01T 1/208* (2006.01)
*G01N 23/04* (2018.01)
(Continued)

(52) U.S. Cl.
CPC ............ *G01T 1/208* (2013.01); *G01N 23/04* (2013.01); *G01N 23/083* (2013.01); *G06T 5/60* (2024.01); *G06T 5/70* (2024.01); *G01N 2223/505* (2013.01)

(58) Field of Classification Search
CPC .......... G01T 1/208; G01N 23/04; G06T 5/60; G06T 5/70
See application file for complete search history.

(56) References Cited

U.S. PATENT DOCUMENTS

| 5,335,260 A | 8/1994 | Arnold |
| 5,565,678 A | 10/1996 | Manian |

(Continued)

FOREIGN PATENT DOCUMENTS

| CN | 102297873 A | 12/2011 |
| CN | 102577356 A | 7/2012 |

(Continued)

OTHER PUBLICATIONS

Sungmin Cha, Taesup Moon; Proceedings of the IEEE/CVF International Conference on Computer Vision (ICCV), 2019, pp. 4160-4169. (Year: 2019).*

(Continued)

*Primary Examiner* — Casey Bryant
(74) *Attorney, Agent, or Firm* — Faegre Drinker Biddle & Reath LLP

(57) ABSTRACT

A image acquiring device includes a camera configured to scan radiation passing through a target object in one direction and acquire an X-ray image, a scintillator configured to convert the X-rays into light, and a control device configured to input the X-ray image to a trained model constructed through machine learning in advance and execute a noise removal process. The camera includes a scan camera in which pixel lines each having M pixels arranged in one (Continued)

direction are configured to be arranged in N columns in a direction orthogonal to one direction and which is configured to output a detection signal for each of the pixels, and a readout circuit configured to output the X-ray image by adding the detection signals output from at least two pixels for each of the pixel lines of N columns in the scan camera and sequentially outputting the added N detection signals.

10 Claims, 46 Drawing Sheets

(51) Int. Cl.
| | |
|---|---|
| *G01N 23/083* | (2018.01) |
| *G06T 5/60* | (2024.01) |
| *G06T 5/70* | (2024.01) |

(56) References Cited

U.S. PATENT DOCUMENTS

| | | | |
|---|---|---|---|
| 5,585,603 | A | 12/1996 | Vogeley, Jr. |
| 5,687,210 | A | 11/1997 | Maitrejean et al. |
| 5,917,877 | A | 6/1999 | Chiabrera et al. |
| 6,173,038 | B1 | 1/2001 | Siffert et al. |
| 6,198,795 | B1 | 3/2001 | Naumann et al. |
| 6,201,850 | B1 | 3/2001 | Heumann |
| 6,231,231 | B1 | 5/2001 | Farrokhnia et al. |
| 6,269,142 | B1 | 7/2001 | Smith |
| 6,315,447 | B1 | 11/2001 | Nord et al. |
| 6,347,131 | B1 | 2/2002 | Gusterson |
| 6,370,223 | B1 | 4/2002 | Gleason et al. |
| 6,398,408 | B1 | 6/2002 | Polkus |
| 6,516,045 | B2 | 2/2003 | Shepherd et al. |
| 6,570,955 | B1 | 5/2003 | Siffert et al. |
| 6,574,302 | B2 | 6/2003 | Adriaansz |
| 6,574,303 | B2 | 6/2003 | Sawada |
| 6,600,805 | B2 | 7/2003 | Hansen |
| 6,632,020 | B2 | 10/2003 | Kaufhold et al. |
| 6,661,868 | B2 | 12/2003 | Sawada |
| 6,872,949 | B2 | 3/2005 | Mizuoka et al. |
| 7,260,177 | B2 | 8/2007 | Hirose |
| 7,311,440 | B2 | 12/2007 | Yoon et al. |
| 7,467,892 | B2 | 12/2008 | Lang et al. |
| 7,477,726 | B2 | 1/2009 | Kabumoto |
| 7,570,787 | B2 | 8/2009 | Hirose |
| 7,696,480 | B2 | 4/2010 | Kostka et al. |
| 7,746,976 | B2 | 6/2010 | Huo et al. |
| 7,980,760 | B2 | 7/2011 | Kabumoto et al. |
| 7,991,110 | B2 | 8/2011 | Hirose |
| 8,068,656 | B2 | 11/2011 | Hirose |
| 8,077,827 | B2 | 12/2011 | Perng |
| 8,223,922 | B2 | 7/2012 | Suyama et al. |
| 8,280,005 | B2 | 10/2012 | Suyama et al. |
| 8,858,076 | B2 | 10/2014 | Quintana et al. |
| 8,873,825 | B2 | 10/2014 | Mercuriev |
| 8,938,110 | B2 | 1/2015 | Goshen et al. |
| 8,989,345 | B2 | 3/2015 | Kim et al. |
| 9,413,995 | B2 * | 8/2016 | Ohguri .................... H04N 5/32 |
| 9,547,889 | B2 | 1/2017 | Goshen |
| 9,615,808 | B2 | 4/2017 | Mentrup |
| 9,619,906 | B2 | 4/2017 | Choi et al. |
| 9,886,765 | B2 | 2/2018 | Naito |
| 9,943,282 | B2 | 4/2018 | Katsumata |
| 10,010,304 | B2 | 7/2018 | Morita |
| 10,242,443 | B2 | 3/2019 | Hsieh et al. |
| 10,430,708 | B1 | 10/2019 | Hu et al. |
| 10,803,555 | B2 | 10/2020 | Song et al. |
| 10,820,197 | B2 | 10/2020 | Rosenberg et al. |
| 10,824,857 | B2 | 11/2020 | Flohr et al. |
| 10,832,381 | B2 | 11/2020 | Strobel et al. |
| 10,888,296 | B2 | 1/2021 | Ji et al. |
| 10,949,951 | B2 | 3/2021 | Tang et al. |
| 10,970,887 | B2 | 4/2021 | Wang et al. |
| 10,984,564 | B2 | 4/2021 | Bergner |
| 11,126,914 | B2 | 9/2021 | Thibault et al. |
| 11,166,994 | B2 | 11/2021 | Lichtenstein et al. |
| 11,185,302 | B2 | 11/2021 | Tsuchiya et al. |
| 11,195,277 | B2 | 12/2021 | Shanbhag et al. |
| 11,244,480 | B2 | 2/2022 | Teshigawara et al. |
| 11,257,196 | B2 | 2/2022 | Kaneko |
| 11,324,472 | B2 | 5/2022 | Hamill |
| 11,386,592 | B2 | 7/2022 | Paysan et al. |
| 11,436,720 | B2 | 9/2022 | Gong et al. |
| 11,501,431 | B2 | 11/2022 | Xiao et al. |
| 11,517,197 | B2 | 12/2022 | Zhou et al. |
| 11,574,170 | B2 | 2/2023 | Isogawa et al. |
| 11,710,230 | B2 | 7/2023 | Takeshima et al. |
| 11,798,159 | B2 | 10/2023 | Zhou et al. |
| 11,972,559 | B2 | 4/2024 | Hamauzu |
| 12,094,037 | B2 | 9/2024 | Takahashi |
| 12,141,965 | B2 | 11/2024 | Mao et al. |
| 12,167,926 | B2 | 12/2024 | Nishii et al. |
| 12,243,127 | B2 | 3/2025 | Lee et al. |
| 2005/0078802 | A1 | 4/2005 | Lang et al. |
| 2011/0206177 | A1 | 8/2011 | Hirasawa |
| 2012/0224760 | A1 | 9/2012 | Goshen et al. |
| 2013/0051516 | A1 | 2/2013 | Yang et al. |
| 2013/0051527 | A1 | 2/2013 | Sakaguchi et al. |
| 2013/0071876 | A1 | 3/2013 | Hao et al. |
| 2015/0342554 | A1 | 12/2015 | Mentrup et al. |
| 2015/0371414 | A1 | 12/2015 | Choi et al. |
| 2017/0065244 | A1 | 3/2017 | Taki |
| 2018/0122094 | A1 | 5/2018 | Naito |
| 2018/0349759 | A1 | 12/2018 | Isogawa et al. |
| 2019/0035058 | A1 | 1/2019 | Strobel et al. |
| 2019/0102621 | A1 | 4/2019 | Flohr et al. |
| 2019/0108441 | A1 | 4/2019 | Thibault et al. |
| 2019/0201106 | A1 * | 7/2019 | Siemionow .............. G06T 7/70 |
| 2019/0325621 | A1 | 10/2019 | Wang et al. |
| 2019/0385345 | A1 | 12/2019 | Bergner |
| 2020/0065940 | A1 | 2/2020 | Tang et al. |
| 2020/0241150 | A1 * | 7/2020 | Ikeda ...................... G01T 1/243 |
| 2020/0286214 | A1 | 9/2020 | Kaneko |
| 2020/0315566 | A1 * | 10/2020 | Takagi .................... A61B 6/52 |
| 2021/0059629 | A1 | 3/2021 | Hamill |
| 2021/0251583 | A1 | 8/2021 | Hamauzu |
| 2022/0313199 | A1 * | 10/2022 | Nishii ................... A61B 6/465 |
| 2023/0135988 | A1 * | 5/2023 | Onishi ................ A61B 6/5258 |
| | | | 250/370.11 |
| 2023/0136930 | A1 * | 5/2023 | Suyama ................... G06T 5/60 |
| | | | 250/370.11 |

FOREIGN PATENT DOCUMENTS

| | | | |
|---|---|---|---|
| CN | 103649990 | A | 3/2014 |
| CN | 106233127 | A | 12/2016 |
| CN | 107516330 | A | 12/2017 |
| CN | 107533019 | A | 1/2018 |
| CN | 107595312 | A | 1/2018 |
| CN | 107871332 | A | 4/2018 |
| CN | 108139489 | A | 6/2018 |
| CN | 108271411 | A | 7/2018 |
| CN | 108926353 | A | 12/2018 |
| CN | 109544477 | A | 3/2019 |
| CN | 109697476 | A | 4/2019 |
| CN | 109805950 | A | 5/2019 |
| CN | 109983325 | A | 7/2019 |
| JP | 2001-099941 | A | 4/2001 |
| JP | 2003-167060 | A | 6/2003 |
| JP | 2006-318103 | A | 11/2006 |
| JP | 2008-229161 | A | 10/2008 |
| JP | 2013-512024 | A | 4/2013 |
| JP | 2018-117900 | A | 8/2018 |
| JP | 2018-206382 | A | 12/2018 |
| JP | 6454820 | B1 | 1/2019 |
| JP | 2019045235 | A | 3/2019 |
| JP | 2019-068912 | A | 5/2019 |
| JP | 2019-091393 | A | 6/2019 |
| JP | 2019-111322 | A | 7/2019 |
| JP | 2019-158663 | A | 9/2019 |
| JP | 2019168360 | A | 10/2019 |
| JP | 2019-202087 | A | 11/2019 |
| JP | 2019-208990 | A | 12/2019 |

(56) References Cited

FOREIGN PATENT DOCUMENTS

| | | | |
|---|---|---|---|
| JP | 2019-535451 | A | 12/2019 |
| JP | 2020-096646 | A | 6/2020 |
| JP | 2020-141908 | A | 9/2020 |
| TW | 202018431 | A | 5/2020 |
| WO | 2007/114470 | A1 | 10/2007 |
| WO | WO-2011/064683 | A2 | 6/2011 |
| WO | WO-2013/005805 | A1 | 1/2013 |
| WO | 2014/052267 | A1 | 4/2014 |
| WO | WO-2018/098077 | A1 | 5/2018 |
| WO | WO-2018/104349 | A1 | 6/2018 |
| WO | WO-2019/082276 | A1 | 5/2019 |
| WO | WO-2019/097796 | A1 | 5/2019 |
| WO | WO-2020/031984 | A1 | 2/2020 |
| WO | 2021210617 | A1 | 10/2021 |
| WO | 2021210618 | A1 | 10/2021 |

OTHER PUBLICATIONS

English-language translation of International Preliminary Report on Patentability (IPRP) dated Aug. 24, 2023 that issued in WO Patent Application No. JP2021/037173.

Zhang et al, "FFDNet: Toward a Fast and Flexible Solution for CNN based Image Denoising", arxiv.org, Cornell University Library, 201 Olin Library, Cornell University, Ithaca, NY 14853, Oct. 11, 2017, XP081150272.

Abramova et al, "Analysis of Noise Properties in Dental Images", 2020 IEEE 40th International Conference on Electronics and Nano-technology (ELNANO), Apr. 22, 2020 May 6, 2020, p. 511-p. 515, XP033769133.

Sungmin Cha et al, "Fully Convolutional Pixel Adaptive Image Denoiser", arxiv.org, Cornell University Library, 201 Olin Library Cornell University Ithaca, NY 14853, Jul. 19, 2018, p. 1-p. 19, XP081114501.

Yuewen Sun, "Digital radiography image denoising using a generative adversarial network", Journal of X-Ray Science and Technology, vol. 26, No. 4, Aug. 10, 2018, p. 523-p. 534, XP93154123.

International Preliminary Report on Patentability mailed Oct. 27, 2022 for PCT/JP2021/015464.

International Preliminary Report on Patentability mailed Oct. 27, 2022 for PCT/JP2021/015488.

International Preliminary Report on Patentability mailed Oct. 27, 2022 for PCT/JP2021/015489.

Kenzo Isogawa et al., "Deep Shrinkage Convolutional Neural Network for Adaptive Noise Reduction", IEEE Signal Processing Letters, vol. 25, No. 2, Feb. 1, 2018, p. 224-p. 228, XP055508221.

Xiao-Ping Zhang et al., "Thresholding Neural Network for Adaptive Noise Reduction", IEEE Transactions on Neural Networks, IEEE Service Center, Piscataway, NJ, US, vol. 12, No. 3, May 1, 2001, p. 567-p. 584, XP011039623.

Hideki Kato et al., "A Presumption Calculating Formula of the X-ray Spectrum Generated from a Molybdenum Target X-ray Tube", The Journal of the Japan Society of Radiological Technology, Mar. 31, 2011, p. 193-p. 201.

Lu Qiu_hong et al., "Fault detecting technology based on neural netwom: algorithm", Optics and Precision Engineering, Feb. 2002, vol. 10, No. 1, p. 25-p. 30 May 29, 2025.

Li Wei, "High-resolution X-ray digital radiography of electronic industry", School of Information Engineering, Chang'an University, Xi'an 710064, China, Jul. 2012, vol. 33, No. 4, p. 654-p. 659.

Notice of Allowance dated Apr. 18, 2025 in related U.S. Appl. No. 17/918,397.

Office Action dated Aug. 21, 2025 that issued in U.S. Appl. No. 18/270,897.

Notice of Allowance dated Sep. 23, 2025 U.S. Appl. No. 17/918,397.

Tabary Joachim et al, "New Functionalities in "SINDBAD" Software for Realistic XRay Simulation Devoted to Complex Parts Inspection", 9th European Conference on NDT—Sep. 2006, Sep. 25, 2006, XP093363902.

Office Action dated Feb. 16, 2026 in EP Patent Application No. 21789365.0.

* cited by examiner

| SPECTRUM | G14 | G15 | G16 | G17 |
|---|---|---|---|---|
| THICKNESS | 0mm | 10mm | 20mm | 30mm |
| AVERAGE ENERGY | 17keV | 24keV | 26keV | 27keV |
| TRANSMITTANCE | 1 | 0.4 | 0.2 | 0.1 |

P1

G26

RADIOGRAPHIC IMAGE ACQUIRING DEVICE, RADIOGRAPHIC IMAGE ACQUIRING SYSTEM, AND RADIOGRAPHIC IMAGE ACQUISITION METHOD

TECHNICAL FIELD

One aspect of an embodiment relates to a radiographic image acquiring device, a radiographic image acquiring system, and a radiographic image acquisition method.

BACKGROUND ART

Since the past, a device that acquires a distribution of electromagnetic waves such as X-rays passing through a target object as image data by providing line sensors of multiple columns disposed orthogonally to the transport direction of the target object and adding detection data output from the line sensors of multiple columns has been used. According to such a device, it is possible to obtain an integrated exposure effect in the image data in which electromagnetic waves passing through the target object are detected.

CITATION LIST

Patent Literature

[Patent Literature 1] Japanese Unexamined Patent Republication No. WO2019/082276
[Patent Literature 2] Japanese Unexamined Patent Publication No. 2019-158663

SUMMARY OF INVENTION

Technical Problem

In the device of the related art as described above, the detection data obtained from the line sensors of multiple columns is added, and thus a signal value tends to improve and a noise value also tends to increase in the addition result. Therefore, an S/N ratio may not improve sufficiently in the image data.

Consequently, one aspect of an embodiment was contrived in view of such a problem, and an object thereof is to provide a radiographic image acquiring device, a radiographic image acquiring system, and a radiographic image acquisition method that make it possible to effectively improve an S/N ratio in a radiographic image.

Solution to Problem

According to one aspect of an embodiment, there is provided a radiographic image acquiring device including: an imaging device configured to scan radiation passing through a target object in one direction and capture an image thereof to acquire a radiographic image; a scintillator configured to be provided on the imaging device to convert the radiation into light; and an image processing module configured to input the radiographic image to a trained model constructed through machine learning in advance using image data and execute a noise removal process of removing noise from the radiographic image, wherein the imaging device includes a detection element in which pixel lines each having M (M is an integer equal to or greater than 2) pixels arranged in the one direction are configured to be arranged in N columns (N is an integer equal to or greater than 2) in a direction orthogonal to the one direction and which is configured to output a detection signal related to the light for each of the pixels, and a readout circuit configured to output the radiographic image by adding the detection signals output from at least two of the M pixels for each of the pixel lines of N columns in the detection element and sequentially outputting the added N detection signals.

Alternatively, according to another aspect of the embodiment, there is provided a radiographic image acquiring system including: the radiographic image acquiring device; a source configured to radiate radiation to the target object; and a transport device configured to transport the target object to the imaging device in the one direction.

Alternatively, according to another aspect of the embodiment, there is provided a radiographic image acquisition method including: a step of scanning scintillation light corresponding to radiation passing through a target object in one direction and capturing an image thereof to acquire a radiographic image; and a step of inputting the radiographic image to a trained model constructed through machine learning in advance using image data and executing a noise removal process of removing noise from the radiographic image, wherein the acquisition step includes using a detection element in which pixel lines each having M (M is an integer equal to or greater than 2) pixels arranged in the one direction are configured to be arranged in N columns (N is an integer equal to or greater than 2) in a direction orthogonal to the one direction and which is configured to output a detection signal related to the scintillation light for each of the pixels, to output the radiographic image by adding the detection signals output from at least two of the M pixels for each of the pixel lines of N columns in the detection element and sequentially output the added N detection signals According to the one aspect or the other aspects, the scintillation light corresponding to the radiation passing through the target object is detected by the detection element in which the pixel lines each having M pixels arranged in the direction of scanning of the target object are arranged in N columns, detection signals of at least two pixels out of detection signals of the M pixels output for each pixel line are added, and a radiographic image is output by the added N detection signals being sequentially output. Additionally, the output radiographic image is input to the trained model constructed through machine learning in advance using image data, and thus the noise removal process is performed on the radiographic image. Thereby, it is possible to remove noise components while increasing signal components in the radiographic image, and to effectively improve an S/N ratio in the radiographic image.

Advantageous Effects of Invention

According to the embodiment, it is possible to effectively improve an S/N ratio in the radiographic image.

BRIEF DESCRIPTION OF DRAWINGS

FIG. 14 is a chart table illustrating an example of results of simulation calculation of a relationship between the thickness of a target object, average energy, and transmittance which is performed by the calculation unit 202A of FIG. 11.

DESCRIPTION OF EMBODIMENTS

Hereinafter, embodiments of the present invention will be described in detail with reference to the accompanying drawings. Meanwhile, in the description, the same elements or elements having the same function are denoted by the same reference signs, and thus duplicate description will be omitted.

First Embodiment

Figure 1:
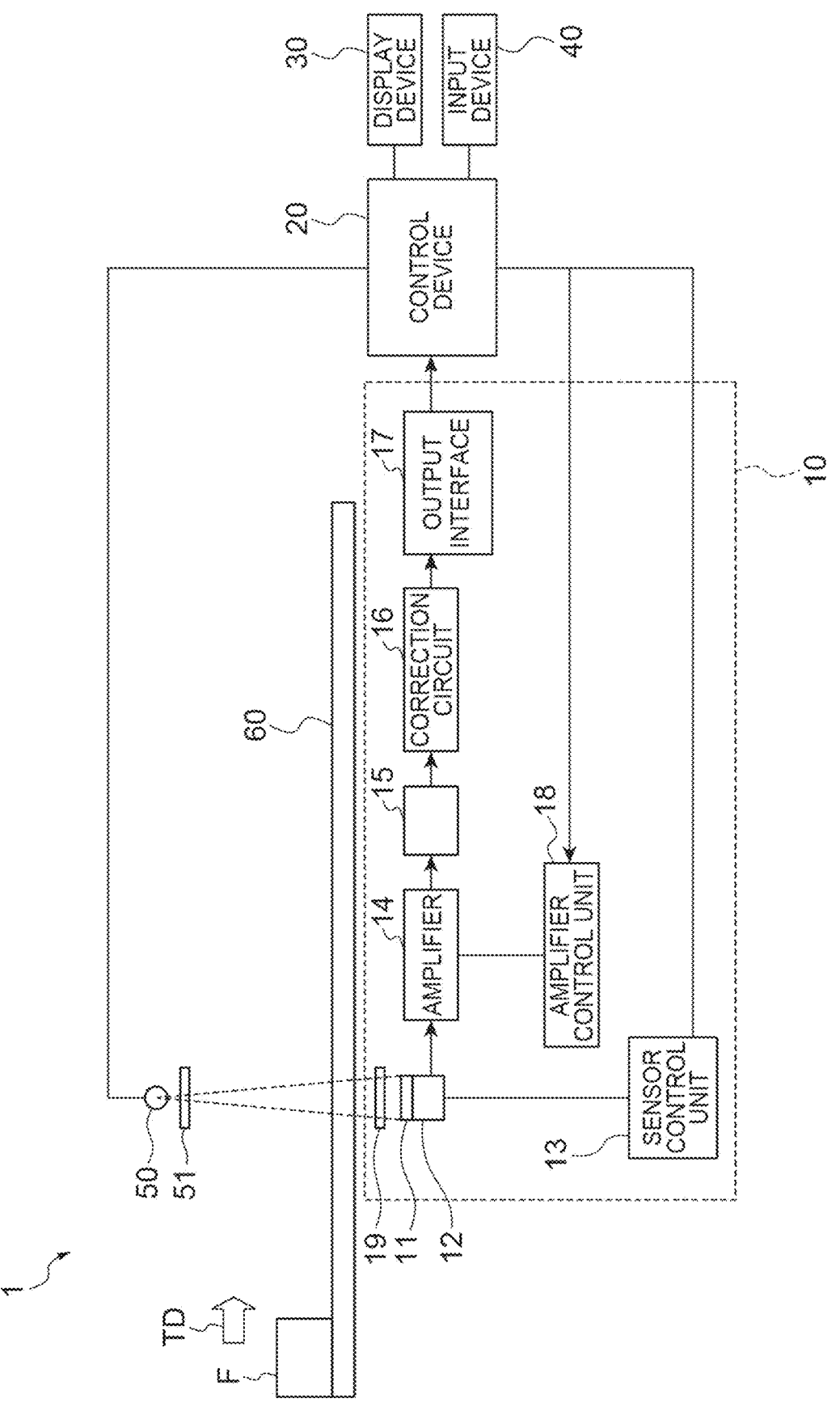
FIG. 1 is a schematic configuration diagram of an image acquiring device 1 according to a first embodiment.

FIG. 1 is a configuration diagram of an image acquiring device 1 which is a radiographic image acquiring device and a radiographic image acquiring system according to the present embodiment. As shown in FIG. 1, the image acquiring device 1 is a device that radiates X-rays (radiation) to a target object F which is transported in a transport direction TD and acquires an X-ray transmission image (radiographic image) obtained by capturing an image of the target object F on the basis of the X-rays passing through the target object F. The image acquiring device 1 performs a foreign substance inspection, a weight inspection, a product inspection, or the like on the target object F using an X-ray transmission image, and examples of the application include food inspection, baggage inspection, substrate inspection, battery inspection, material inspection, and the like. The image acquiring device 1 is configured to include a belt conveyor (transport device) 60, an X-ray irradiator (radiation source) 50, an X-ray detection camera (imaging device) 10, a control device (image processing module) 20, a display device 30, and an input device 40 for performing various inputs. Meanwhile, the radiographic image in the embodiment of the present disclosure is not limited to an X-ray image, and may also be an image caused by electromagnetic radiation other than X-rays such as γ-rays.

The belt conveyor 60 has a belt portion on which the target object F is placed, and transports the target object F in the transport direction (one direction) TD at a predetermined transport speed by moving the belt portion in the transport direction TD. The transport speed of the target object F is, for example, 48 m/min. The belt conveyor 60 can change the transport speed as necessary to a transport speed such as, for example, 24 m/min or 96 m/min. In addition, the belt conveyor 60 can appropriately change the height position of the belt portion to change a distance between the X-ray irradiator 50 and the target object F. Meanwhile, examples of the target object F transported by the belt conveyor 60 include foodstuffs such as meat, seafood, agricultural products, or confectionery, rubber products such as tires, resin products, metal products, resource materials such as minerals, waste, and various products such as electronic parts or electronic substrates. The X-ray irradiator 50 is a device that radiates (outputs) X-rays to the target object F as an X-ray source. The X-ray irradiator 50 is a point light source, and diffuses and radiates the X-rays in a predetermined angle range in a fixed irradiation direction. The X-ray irradiator 50 is disposed above the belt conveyor 60 at a predetermined distance from the belt conveyor 60 so that the irradiation direction of the X-rays is directed toward the belt conveyor 60 and the diffused X-rays extend in the entire width direction of the target object F (a direction intersecting the transport direction TD). In addition, the X-ray irradiator 50 is configured such that, in the lengthwise direction of the target object F (a direction parallel to the transport direction TD), a predetermined division range in the lengthwise direction is set as an irradiation range, and the X-rays are radiated in the entire lengthwise direction of the target object F by the target object F being transported in the transport direction TD by the belt conveyor 60. The X-ray irradiator 50 has a tube voltage and a tube current set by the control device 20, and radiates X-rays having predetermined energy and a radiation dose according to the set tube voltage and tube current toward the belt conveyor 60. In addition, a filter 51 that transmits a predetermined wavelength region of the X-rays is provided in the vicinity of the X-ray irradiator 50 on the belt conveyor 60 side.

The X-ray detection camera 10 detects X-rays passing through the target object F among the X-rays radiated to the target object F by the X-ray irradiator 50, and acquires and outputs a detection signal based on the X-rays. The image acquiring device 1 according to the present embodiment outputs an X-ray transmission image captured by scanning the X-ray transmission image in the transport direction TD by sequentially outputting the detection signal based on the X-rays passing through the target object F which is transported by the belt conveyor 60.

The X-ray detection camera 10 includes a filter 19, a scintillator 11, a scan camera 12 (detection element), a sensor control unit 13, an amplifier 14, an AD converter 15, a correction circuit 16, an output interface 17, and an amplifier control unit 18. The scintillator 11, the scan camera 12, the amplifier 14, the AD converter 15, the correction circuit 16, and the output interface 17 are electrically connected to each other.

The scintillator 11 is fixed on the scan camera 12 by adhesion or the like, and converts the X-rays passing through the target object F into scintillation light. The scintillator 11 outputs the scintillation light to the scan camera 12. The filter 19 transmits a predetermined wavelength region of the X-rays toward the scintillator 11.

Figure 2:
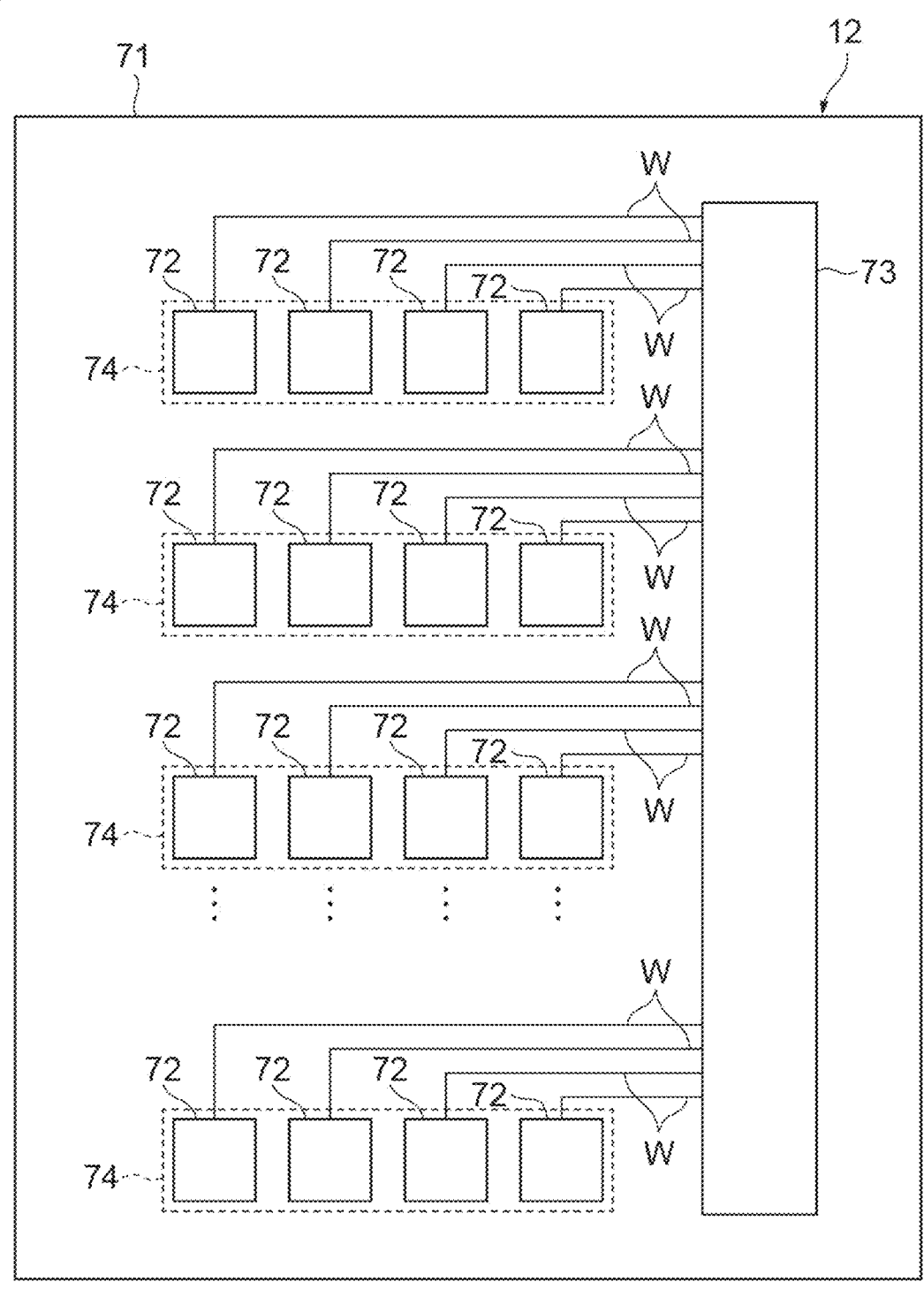
FIG. 2 is a plan view illustrating a configuration of a scan camera 12 of FIG. 1.

The scan camera 12 detects the scintillation light from the scintillator 11, converts the detected light into electric charge, and outputs it as a detection signal (electrical signal) to the amplifier 14. FIG. 2 is a plan view illustrating a configuration of the scan camera 12. As shown in FIG. 2, the scan camera 12 includes a plurality of pixels 72 which are photodiodes (photoelectric conversion elements) arranged on a substrate 71 two-dimensionally, a readout circuit 73 that outputs a detection signal output by the plurality of pixels 72 photoelectrically converting the scintillation light to the outside, and a wiring portion W that electrically connects the readout circuit 73 and each of the plurality of pixels 72.

Specifically, the scan camera 12 has a configuration in which pixel lines (pixel groups) 74 composed of M (M is an integer equal to or greater than 2) pixels 72 arranged in the transport direction TD are arranged in N columns (N is an integer equal to or greater than 2) on the substrate 71 in a direction substantially orthogonal to the transport direction TD. For example, the number of pixels M is four, and the number of pixel lines N is any integer equal to or greater than 200 and equal to or less than 30,000.

The readout circuit 73 sequentially receives detection signals which are output from M pixels 72 for each pixel line 74 at intervals of a predetermined detection period (the details will be described later) in accordance with control performed by the sensor control unit 13, performs a process of adding (summing up) detection signals of at least two pixels 72 among the detection signals from the M pixels 72, combines the detection signals that have undergone the addition process for each pixel line 74, and outputs the combined signals to the outside as detection signals for one line of the target object F orthogonal to the transport direction TD. In the present embodiment, the readout circuit 73 performs the addition process on all the M detection signals. Additionally, the readout circuit 73 outputs a detection signal for the next line of the target object F orthogonal to the transport direction TD by performing the addition process on the detection signals sequentially output from the M pixels 72 with a predetermined detection period shifted. In the same way, the readout circuit 73 sequentially outputs detection signals for a plurality of lines of the target object F orthogonal to the transport direction TD.

The sensor control unit 13 controls the scan camera 12 to repeatedly capture images at a predetermined detection period so that all the pixels 72 within the pixel line 74 in the scan camera 12 can capture an image of X-rays passing through the same region of the target object F. The predetermined detection period may be set on the basis of the pixel width of the pixel 72 within the pixel line 74 in the scan camera 12. As the predetermined detection period, for example, the deviation (delay time) of the detection timing of the pixel 72 within the pixel line 74 in the scan camera 12 may be specified on the basis of the distance between the pixels 72 within the pixel line 74 in the scan camera 12, the speed of the belt conveyor 60, the distance between the X-ray irradiator 50 and the target object F on the belt conveyor 60 (focus object distance (FOD)), and the distance between the X-ray irradiator 50 and the scan camera 12 (focus detector distance (FDD)), and the predetermined detection period may be set on the basis of the deviation.

The amplifier 14 amplifies the detection signal at a predetermined set amplification factor to generate an amplified signal, and outputs the amplified signal to the AD converter 15. The set amplification factor is an amplification factor which is set by the amplifier control unit 18. The amplifier control unit 18 sets the set amplification factor of the amplifier 14 on the basis of predetermined imaging conditions.

The AD converter 15 converts the amplified signal (voltage signal) output by the amplifier 14 into a digital signal, and outputs the converted signal to the correction circuit 16. The correction circuit 16 performs a predetermined correction such as signal amplification on the digital signal, and outputs the corrected digital signal to the output interface 17. The output interface 17 outputs the digital signal to the outside of the X-ray detection camera 10.

The control device 20 is a computer such as, for example, a personal computer (PC). The control device 20 generates an X-ray transmission image on the basis of the digital signal (amplified signal) corresponding to detection signals for a plurality of lines which are sequentially output from the X-ray detection camera 10 (more specifically, the output interface 17). In the present embodiment, the control device 20 generates one X-ray transmission image on the basis of the digital signals for 128 lines which are output from the output interface 17. The generated X-ray transmission image is output to the display device 30 after a noise removal process to be described later is performed, and is displayed by the display device 30. In addition, the control device 20 controls the X-ray irradiator 50, the amplifier control unit 18, and the sensor control unit 13. Meanwhile, the control device 20 of the present embodiment is a device which is independently provided outside the X-ray detection camera 10, but it may be integrated inside the X-ray detection camera 10.

Figure 3:
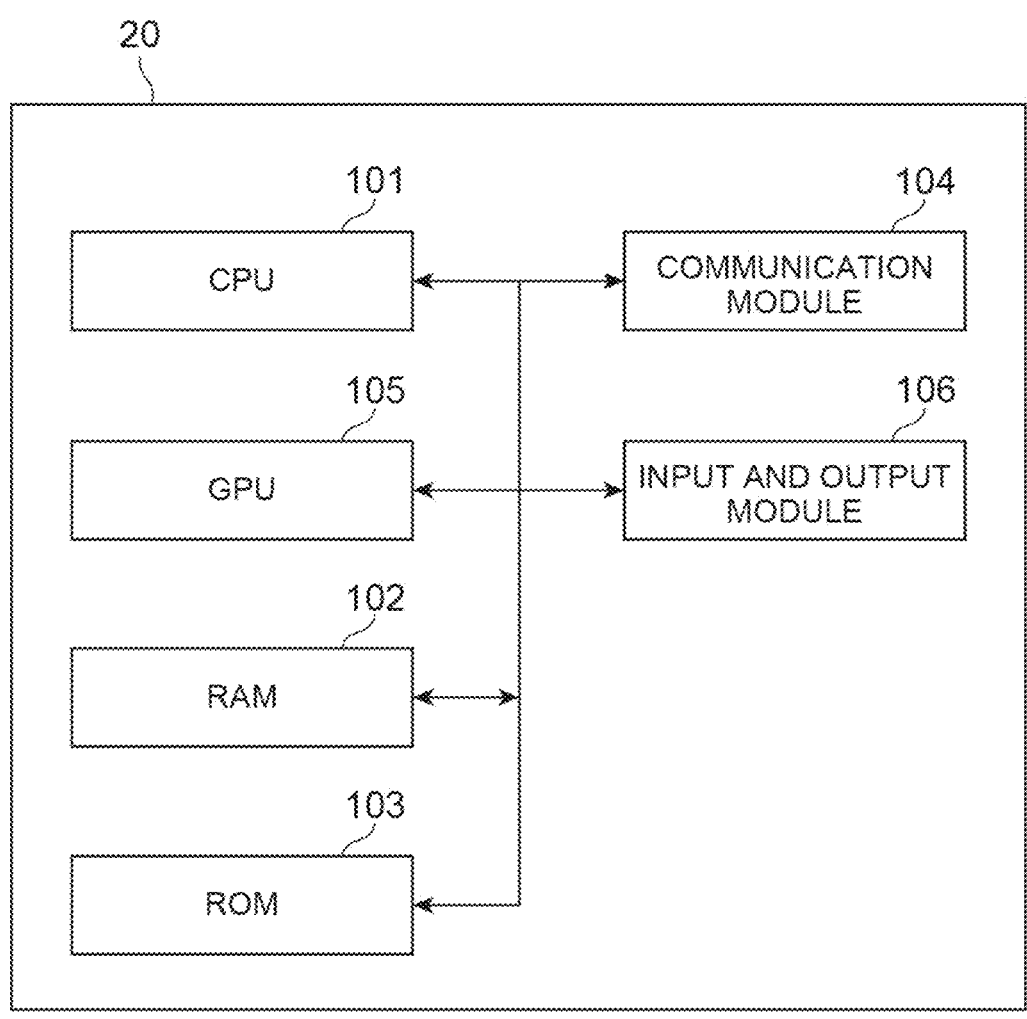
FIG. 3 is a block diagram illustrating an example of a hardware configuration of a control device 20 of FIG. 1.

FIG. 3 shows a hardware configuration of the control device 20. As shown in FIG. 3, the control device 20 is a computer or the like physically including a central processing unit (CPU) 101 and a graphic processing unit (GPU) 105 which are processors, a random access memory (RAM) 102 and a read only memory (ROM) 103 which are recording media, a communication module 104, an input and output module 106, and the like, which are electrically connected to each other. Meanwhile, the control device 20 may include a display, a keyboard, a mouse, a touch panel display, and the like as the input device 40 and the display device 30, or may include a data recording device such as a hard disk drive or a semiconductor memory. In addition, the control device 20 may be constituted by a plurality of computers.

Figure 4:
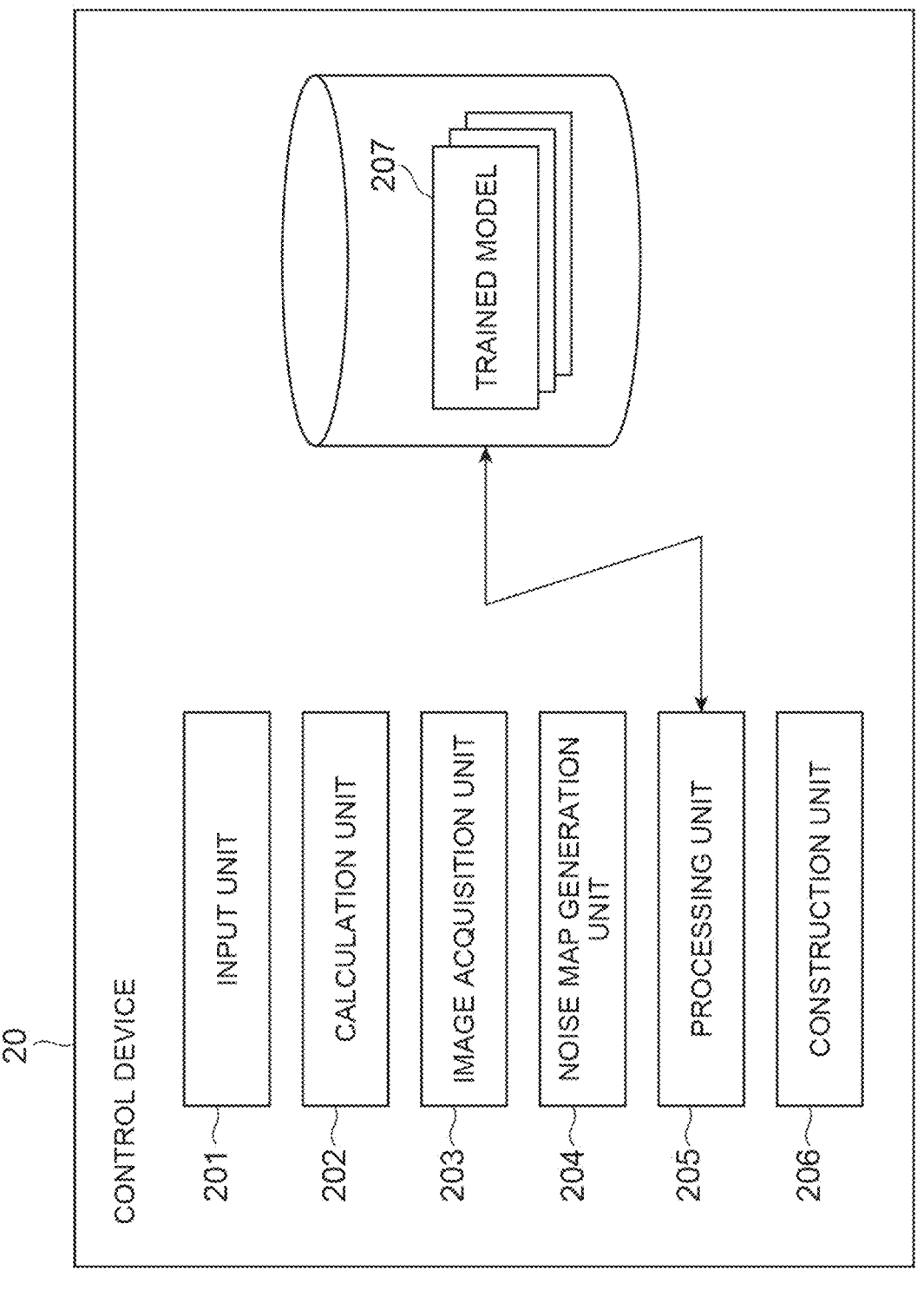
FIG. 4 is a block diagram illustrating a functional configuration of the control device 20 of FIG. 1.

FIG. 4 is a block diagram illustrating a functional configuration of the control device 20. The control device 20 includes an input unit 201, a calculation unit 202, an image acquisition unit 203, a noise map generation unit 204, a processing unit 205, and a construction unit 206. Each functional unit of the control device 20 shown in FIG. 4 is realized by loading a program (a radiographic image processing program of a first embodiment) on the hardware such as the CPU 101, the GPU 105, and the RAM 102 to thereby bring the communication module 104, the input and output module 106, and the like into operation under the control of the CPU 101 and the GPU 105 and read out and write data from and to the RANI 102. The CPU 101 and the GPU 105 of the control device 20 cause the control device 20 to function as each functional unit in FIG. 4 by executing this computer program, and sequentially execute processing corresponding to a radiographic image acquisition processing method to be described later. Meanwhile, the CPU 101 and the GPU 105 may be a single piece of hardware, or only one of them may be used. In addition, the CPU 101 and the GPU 105 may be implemented in a programmable logic such as an FPGA like a soft processor. The RANI or the ROM may also be a single piece of hardware, or may be built into a programmable logic such as an FPGA. Various types of data required for executing this computer program and various types of data generated by executing this computer program are all stored in a built-in memory such as the ROM 103 or the RANI 102, or a storage medium such as a hard disk drive. In addition, a built-in memory or a storage medium in the control device 20 stores in advance a trained model 207 that causes the CPU 101 and the GPU 105 to execute the noise removal process for an X-ray image (X-ray transmission image) by being read by the CPU 101 and the GPU 105 (which will be described later).

Hereinafter, the details of the function of each functional unit of the control device 20 will be described.

The input unit 201 accepts an input of condition information indicating either conditions of a source of radiation or imaging conditions when the radiation is radiated to capture an image of the target object F. Specifically, the input unit 201 accepts an input of condition information indicating the operating conditions of the X-ray irradiator (radiation source) 50 when the X-ray image of the target object F is captured, the imaging conditions of the X-ray detection camera 10, or the like from a user of the image acquiring device 1. Examples of the operating conditions include all or some of a tube voltage, a target angle, a target material, and the like. Examples of the condition information indicating the imaging conditions include information indicating the material and thickness of the filters 51 and 19 disposed between the X-ray irradiator 50 and the X-ray detection camera 10, the distance (FDD) between the X-ray irradiator 50 and the X-ray detection camera 10, the type of window material of the X-ray detection camera 10, and the material and thickness of the scintillator 11 of the X-ray detection camera 10, and all or some of X-ray detection camera information (for example, a gain setting value, a circuit noise value, an amount of saturated charge, a conversion coefficient value (e–/count), and the line rate (Hz) or line speed (m/min) of the camera), information on the target object F, and the like. The input unit 201 may accept an input of the condition information as a direct input of information such as numerical values, or may accept the input as a selective input for information such as numerical values which are set in an internal memory in advance. The input unit 201 accepts the input of the above condition information from a user, but it may acquire some condition information (such as a tube voltage) in accordance with the detection result of the state of control performed by the control device 20.

The calculation unit 202 calculates the average energy related to X-rays (radiation) passing through the target object F on the basis of the condition information. The condition information includes at least any one of a tube voltage of the source, information relating to the target object F, information on a filter included in a camera used to capture an image of the target object F, information on a scintillator included in the camera, and information on a filter included in the X-ray source. Specifically, the calculation unit 202 calculates the value of the average energy of X-rays that pass through the target object F using the image acquiring device 1 and are detected by the X-ray detection camera 10 on the basis of the condition information accepted by the input unit 201. For example, the calculation unit 202 calculates an X-ray spectrum detected by the X-ray detection camera 10 using, for example, a known approximate expression of Tucker or the like on the basis of information such as a tube voltage, a target angle, a target material, the material and thickness of the filters 51 and 19 and their presence or absence, the type of window material of the X-ray detection camera 10 and its presence or absence, and the material and thickness of the scintillator 11 of the X-ray detection camera 10 which are included in the condition information. The calculation unit 202 further calculates a spectral intensity integration value and a photon number integration value from the spectrum of the X-rays, and calculates the value of the average energy of the X-rays by dividing the spectral intensity integration value by the photon number integration value.

A calculation method using a known approximate expression of Tucker will be described. For example, in a case where the target is specified as tungsten and the target angle is specified as 25°, the calculation unit 202 can determine Em: kinetic energy during electron target collision, T: electron kinetic energy in the target, A: proportionality constant determined by the atomic number of the target substance, ρ: the density of the target, μ(E): the linear attenuation coefficient of the target substance, B: the function of Z and T that changes gently, C: Thomson-Whiddington constant, θ: target angle, and c: the speed of light in vacuum. Further, the calculation unit 202 can calculate an irradiation X-ray spectrum by calculating the following Expression (1) on the basis of these values.

[Expression 1]

$$\varphi(E) = A \cdot \int_E^{Em} \left( \frac{T + m_0 c^2}{T} \right) \cdot B \cdot \left( \frac{1}{\rho} \frac{dT}{dx} \right)^{-1} \exp \left\{ \mu(E) \frac{(E_m^2 - T^2)}{\rho C \sin(\theta + \varphi)} \right\} dT \quad (1)$$

Meanwhile, Em can be determined from information on the tube voltage, A, ρ, and μ(E) can be determined from information on the material of the target object F, and θ can be determined from information on the angle of the target object F.

Next, the calculation unit 202 can calculate the X-ray energy spectrum that passes through the filter and the target object F and is absorbed by the scintillator by using the X-ray attenuation expression of the following Expression (2).

[Expression 2]

$$I = I_0 e^{-\mu x} \quad (2)$$

Here, μ is the attenuation coefficient of the target object F, the filter, the scintillator, or the like, and x is the thickness of the target object F, the filter, the scintillator, or the like. In addition, μ can be determined from information on the materials of the target object F, the filter, and the scintillator, and x can be determined from information on the thicknesses of the target object F, the filter, and the scintillator. The X-ray photon number spectrum can be obtained by dividing this X-ray energy spectrum by energy of each X-ray. The calculation unit 202 calculates the average energy of X-rays using the following Expression (3) by dividing the integration value of energy intensity by the integration value of the number of photons.

Average energy $E$=spectral intensity integration value/photon number integration value     (3)

The calculation unit 202 calculates the average energy of X-rays through the above calculation process. Meanwhile, for the calculation of the X-ray spectrum, a known approximate expression of Kramers or Birch et al. may be used.

Figure 5:
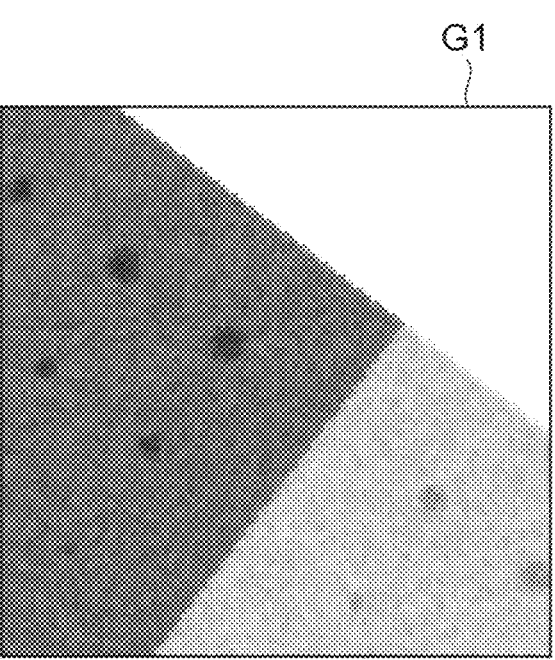
FIG. 5 is a diagram illustrating an example of an X-ray image acquired by an image acquisition unit 203 of FIG. 4.

The image acquisition unit 203 acquires a radiographic image in which radiation is radiated to the target object F and an image of the radiation passing through the target object F is captured. Specifically, the image acquisition unit 203 generates an X-ray image on the basis of the digital signal (amplified signal) output from the X-ray detection camera 10 (more specifically, the output interface 17). The image acquisition unit 203 generates one X-ray image on the basis of the digital signal for a plurality of lines output from the output interface 17. FIG. 5 is a diagram illustrating an example of an X-ray image acquired by the image acquisition unit 203.

The noise map generation unit 204 derives an evaluation value from the pixel value of each pixel of the radiographic image on the basis of relational data indicating a relationship between the pixel value and the evaluation value obtained by evaluating the spread of the noise value, and generates a noise map which is data obtained by associating the derived evaluation value with each pixel of the radiographic image. In this case, the noise map generation unit 204 derives an evaluation value from the average energy related to the radiation passing through the target object F and the pixel value of each pixel of the radiographic image. Specifically, the noise map generation unit 204 uses the relational expression (relational data) between the pixel value and the standard deviation of the noise value (evaluation value obtained by evaluating the spread of the noise value) to derive the standard deviation of the noise value from the average energy of X-rays calculated by the calculation unit 202 and the pixel value of each pixel of the X-ray image (radiographic image) acquired by the image acquisition unit 203. The noise map generation unit 204 generates a noise standard deviation map (noise map) by associating the derived standard deviation of the noise value with each pixel of the X-ray image.

The relational expression used by the noise map generation unit 204 between the pixel value and the average energy and the standard deviation of the noise value is represented by the following expression (4).

[Expression 3]

$$\text{Noise} = \sqrt{\left(FMCQ\sqrt{\frac{cf}{E_m M_E CQ} \cdot \text{Signal}}\right)^2 + \left(\sqrt{D}\right)^2 + (R)^2} \quad (4)$$

In Expression (4), the variable Noise is the standard deviation of the noise value, the variable Signal is the signal value (pixel value) of a pixel, the constant F is a noise factor, the constant M is the multiplication factor of the scintillator, the constant C is the coupling efficiency between the scan camera 12 and the scintillator 11 in the X-ray detection camera 10, the constant Q is the quantum efficiency of the scan camera 12, the constant cf is a conversion coefficient for converting the signal value of a pixel into electric charge in the scan camera 12, the variable Em is the average energy of X-rays, the constant D is information indicating dark current noise generated by thermal noise in an image sensor, and the constant R is information indicating readout noise in the scan camera 12. When Expression (4) is used, the noise map generation unit 204 substitutes the pixel value of each pixel of the X-ray image acquired by the image acquisition unit 203 into the variable Signal, and substitutes the numerical value of the average energy calculated by the calculation unit 202 into the variable Em. The noise map generation unit 204 obtains the variable Noise calculated using Expression (4) as the numerical value of standard deviation of the noise value. Meanwhile, other parameters including the average energy may be acquired by the input unit 201 accepting an input, or may be set in advance.

Figure 6:
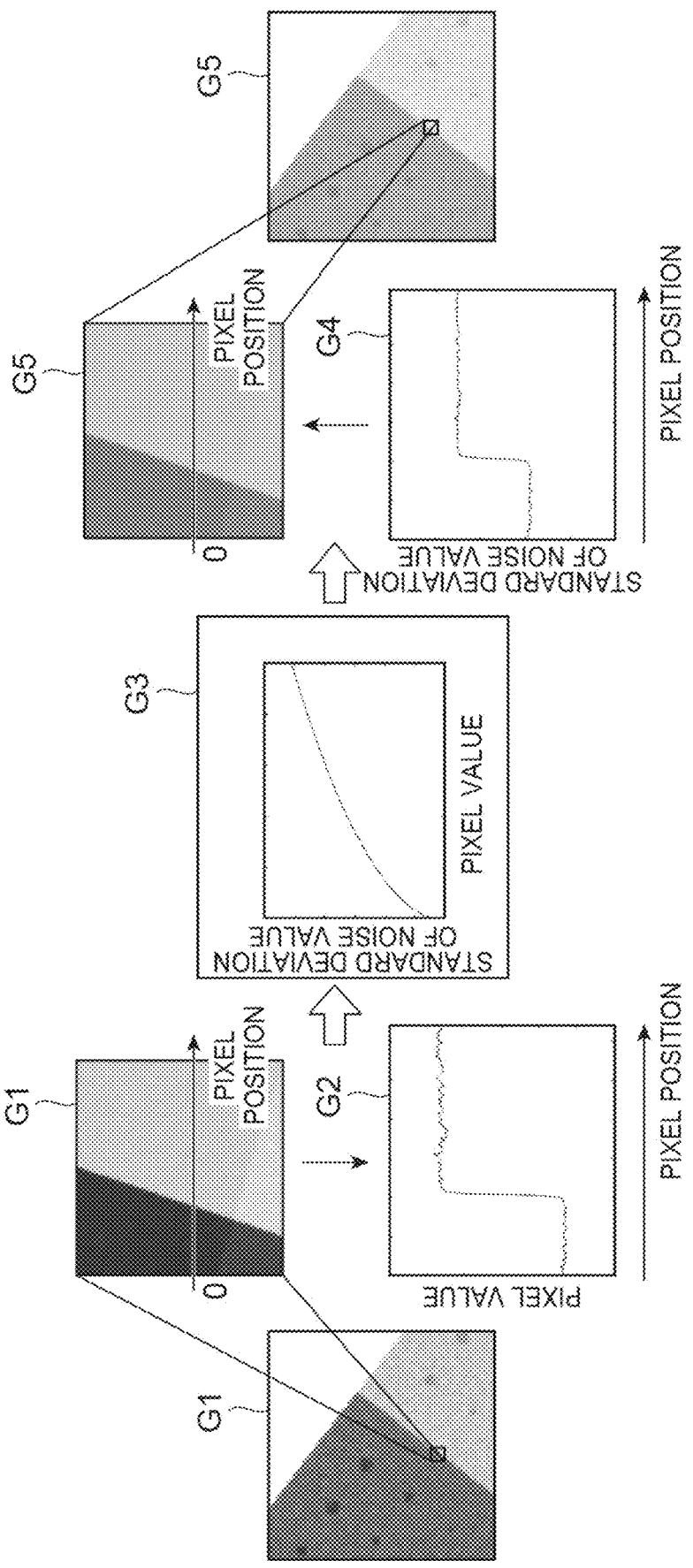
FIG. 6 is a diagram illustrating an example of generation of a noise standard deviation map which is performed by a noise map generation unit 204 of FIG. 4.

FIG. 6 is a diagram illustrating an example of generation of a noise standard deviation map which is performed by the noise map generation unit 204. The noise map generation unit 204 substitutes various pixel values into the variable Signal and acquires a correspondence relation between the pixel value and the variable Noise using Relational Expression (4) between the pixel value and the standard deviation of the noise value to derive a relational graph G3 showing the correspondence relation between the pixel value and the standard deviation of the noise value. The noise map generation unit 204 then derives the relational data G2 indicating the correspondence relation between each pixel position and the pixel value from an X-ray image G1 acquired by the image acquisition unit 203. Further, the noise map generation unit 204 derives the standard deviation of the noise value corresponding to a pixel at each pixel position in the X-ray image by applying the correspondence relation indicated by the relational graph G3 to each pixel value in the relational data G2. As a result, the noise map generation unit 204 associates the derived standard deviation of noise with each pixel position, and derives relational data G4 indicating the correspondence relation between each pixel position and the standard deviation of noise. The noise map generation unit 204 then generates a noise standard deviation map G5 on the basis of the derived relational data G4.

Figure 7:
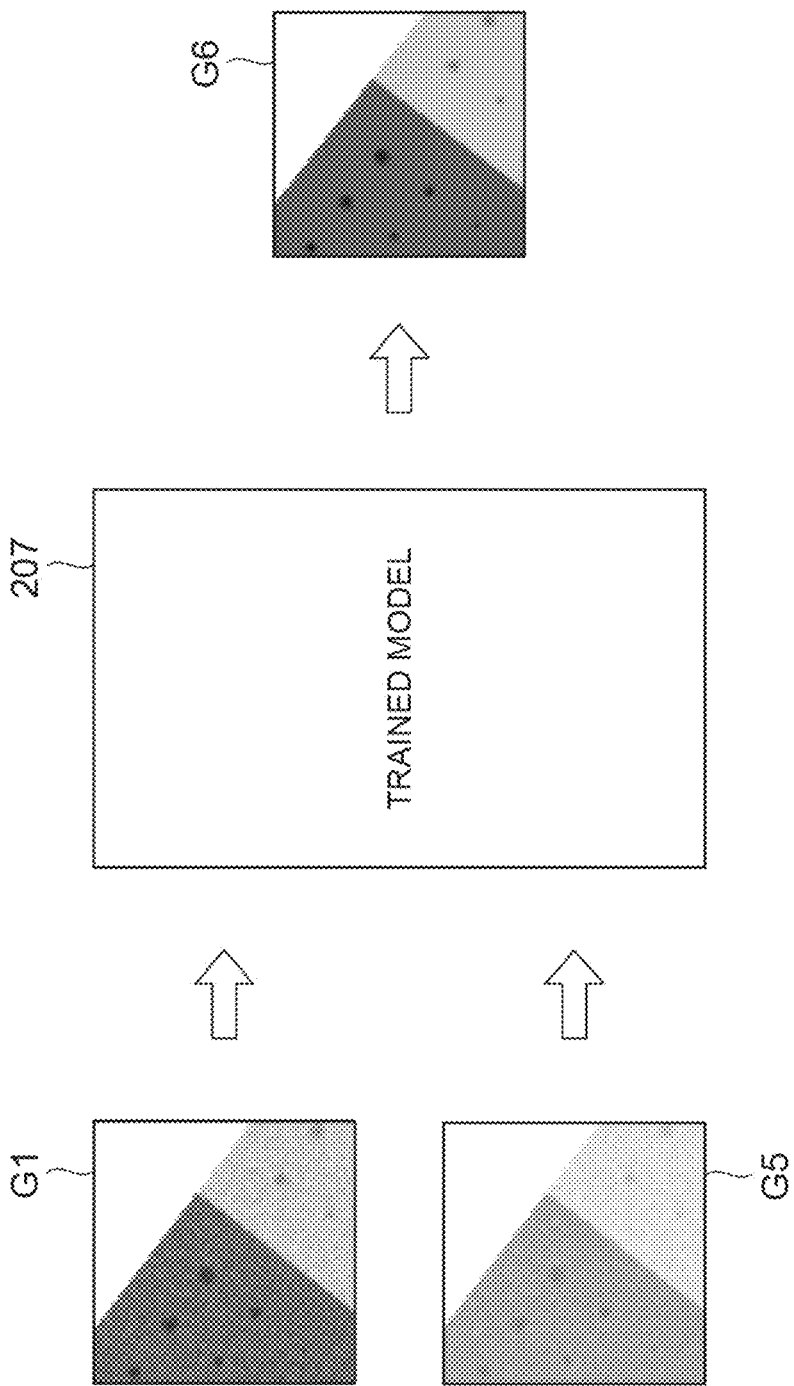
FIG. 7 is a diagram illustrating an example of input and output data of trained models 207 of FIG. 4.

The processing unit 205 inputs the radiographic image and the noise map to the trained model 207 constructed through machine learning in advance, and executes image processing for removing noise from the radiographic image. That is, as shown in FIG. 7, the processing unit 205 acquires the trained model 207 (which will be described later) constructed by the construction unit 206 from the built-in memory or the storage medium within the control device 20. The processing unit 205 inputs the X-ray image G1 acquired by the image acquisition unit 203 and the noise standard deviation map G5 generated by the noise map generation unit 204 to the trained model 207. Thereby, the processing unit 205 generates an output image G6 by executing image processing for removing noise from the X-ray image G1 using the trained model 207. The processing unit 205 then outputs the generated output image G6 to the display device 30 or the like.

The construction unit 206 constructs a trained model 207 for outputting noise-removed image data on the basis of the training image and the noise map through machine learning using, as training data, the training image which is a radiographic image, the noise map generated from the training image on the basis of the relational expression between the pixel value and the standard deviation of noise values, and the noise-removed image data which is data obtained by removing noise from the training image. The construction unit 206 stores the constructed trained model 207 in the built-in memory or storage medium within the control device 20. Examples of machine learning include supervised learning, unsupervised learning, and reinforcement learning, including deep learning, neural network learning, and the like. In the first embodiment, the two-dimensional convolutional neural network described in the paper "Beyond a Gaussian Denoiser: Residual Learning of Deep CNN for Image Denoising" authored by Kai Zhang et al. is adopted as an example of a deep learning algorithm Meanwhile, the trained model 207 may be generated by an external computer or the like and downloaded to the control device 20 in addition to being constructed by the construction unit 206. Meanwhile, the radiographic image used for machine learning includes a radiographic image obtained by capturing an image of a known structure or an image obtained by reproducing the radiographic image.

Figure 8:
FIG. 8 is a diagram illustrating an example of a training image which is one piece of training data used to construct the trained models 207.

FIG. 8 is an example of a training image which is one piece of training data used to construct the trained models 207. As the training image, an X-ray image having a pattern of various thicknesses, various materials, and various resolutions as an imaging target can be used. The example shown in FIG. 8 is a training image G7 generated for chicken. As the training image G7, an X-ray image actually generated for a plurality of types of known structures using the image acquiring device 1 may be used, or an image generated by simulation calculation may be used. The X-ray image may be acquired using a device different from the image acquiring device 1.

As preprocessing for performing machine learning, the construction unit 206 derives the evaluation value from the pixel value of each pixel of the radiographic image on the basis of the relational data indicating the relationship between the pixel value and the evaluation value obtained by evaluating the spread of the noise value, and generates a noise map which is data obtained by associating the derived evaluation value with each pixel of the radiographic image. Specifically, when constructing the trained model 207, the construction unit 206 acquires a training image generated by actual image capture, simulation calculation, or the like from the image acquisition unit 203 or the like. The construction unit 206 sets, for example, the operating conditions of the X-ray irradiator 50 of the image acquiring device 1, the imaging conditions of the image acquiring device 1, or the like. Alternatively, the construction unit 206 sets the imaging conditions or the operating conditions of the X-ray irradiator 50 during simulation calculation. The construction unit 206 uses the same method as the calculation unit 202 to calculate the average energy of X-rays on the basis of the above-described operating conditions or imaging conditions. Further, the construction unit 206 uses the same method as the method performed by the noise map generation unit 204 as shown in FIG. 6 to generate a noise standard deviation map on the basis of the average energy of X-rays and the training image. That is, the preprocessing method of the machine learning method includes a noise map generation step of deriving an evaluation value from the pixel value of each pixel of the radiographic image on the basis of the relational data indicating the relationship between the pixel value and the evaluation value obtained by evaluating the spread of the noise value and generating a noise map which is data obtained by associating the derived evaluation value with each pixel of the radiographic image.

The construction unit 206 constructs the trained model 207 through machine learning using, as training data, the training image, the noise map generated from the training image, and the noise-removed image data which is data in which noise is removed in advance from the training image. Specifically, the construction unit 206 acquires the noise-removed image data in which noise is removed in advance from the training image. In a case where the training image is an X-ray image generated by simulation calculation, the construction unit 206 uses an image before noise is added in a process of generating the training image as the noise-removed image data. On the other hand, in a case where the training image is an X-ray image actually generated for a plurality of types of known structures using the image acquiring device 1, the construction unit 206 uses an image in which noise is removed from the X-ray image using image processing such as an average value filter, a median filter, a bilateral filter, or an NLM filter as the noise-removed image data. The construction unit 206 constructs a trained model 207 for outputting the noise-removed image data on the basis of the training image and the noise standard deviation map by executing training through machine learning.

Figure 9:
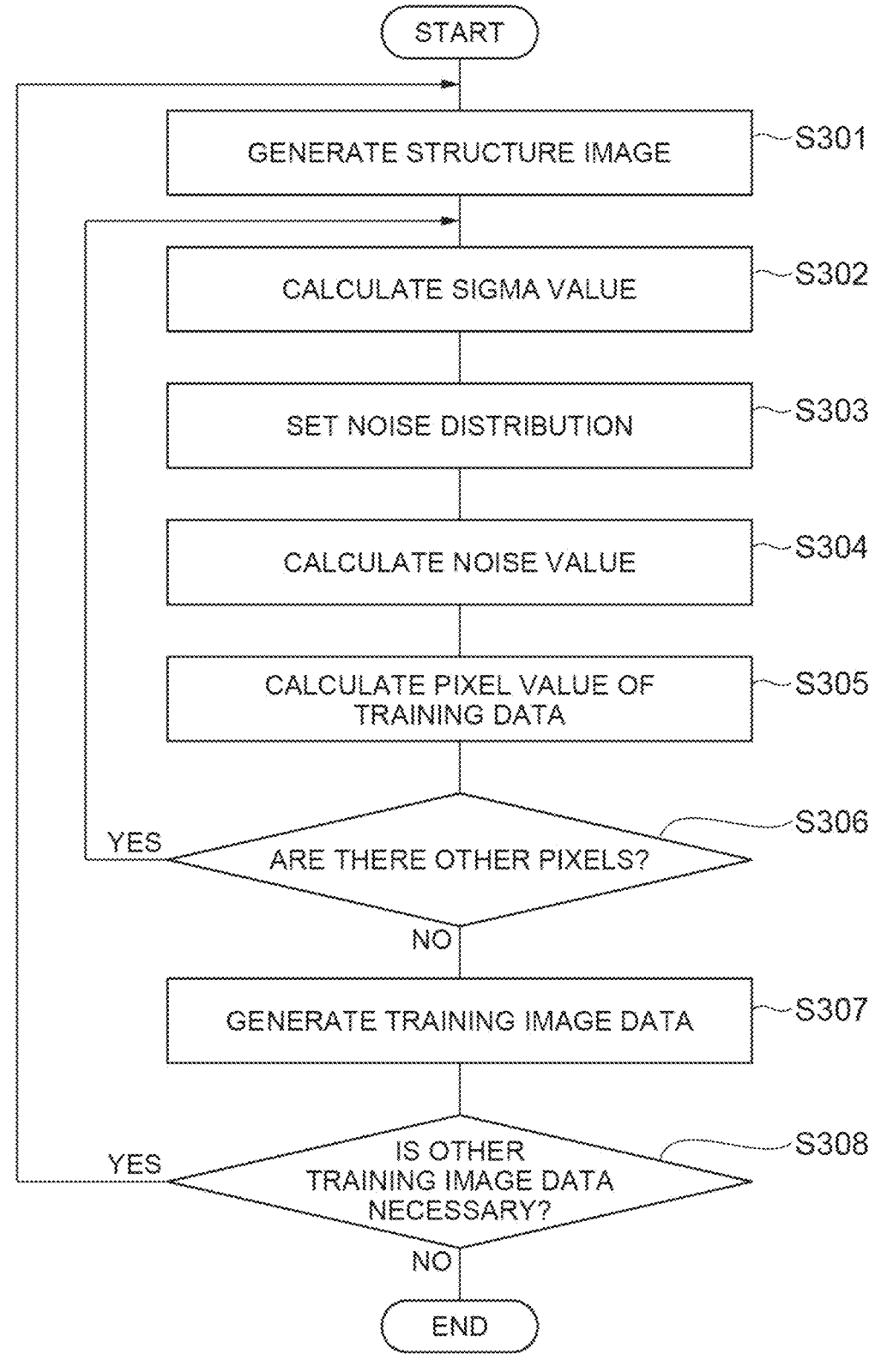
FIG. 9 is a flowchart illustrating a procedure of creating image data which is training data (training data) used for a construction unit 206 to construct the trained models 207.

FIG. 9 is a flowchart illustrating a procedure of creating image data which is training data used by the construction unit 206 to construct the trained models 207.

The image data (also referred to as training image data) which is training data is created by a computer in the following procedure. First, an image of a structural body having a predetermined structure (structure image) is created (step S301). For example, an image of a structure having a predetermined structure may be created by simulation calculation. In addition, an X-ray image of a structure such as a chart having a predetermined structure may be acquired to create a structure image. Next, a sigma value which is a standard deviation of pixel values is calculated for one pixel selected from a plurality of pixels constituting such a structure image (step S302). A normal distribution (Poisson distribution) indicating a noise distribution is then set on the basis of the sigma value obtained in step S302 (step S303). In this manner, training data for various noise conditions can be generated by setting the normal distribution on the basis of the sigma value. Subsequently, a noise value which is set at random is calculated along the normal distribution which is set on the basis of the sigma value in step S303 (step S304). Further, the noise value obtained in step S304 is added to the pixel value of one pixel to generate pixel values constituting the image data which is training data (step S305). The processes of steps S302 to S305 are performed for each of a plurality of pixels constituting the structure image (step S306), and training image data serving as training data is generated (step S307). In addition, in a case where the training image data is further required, it is determined that the processes of steps S301 to S307 are performed on another structure image (step S308), and another training image data serving as training data is generated. Meanwhile, the other structure image may be an image of a structural body having the same structure, or may be an image of a structural body having another structure.

Meanwhile, it is necessary to prepare a large number of pieces of image data which is training data used to construct the trained model 207. In addition, the structure image is preferably an image with less noise, ideally an image without noise. Therefore, when a structure image is generated through simulation calculation, many images without noise can be generated, and thus it is effective to generate a structure image through simulation calculation.

Figure 10:
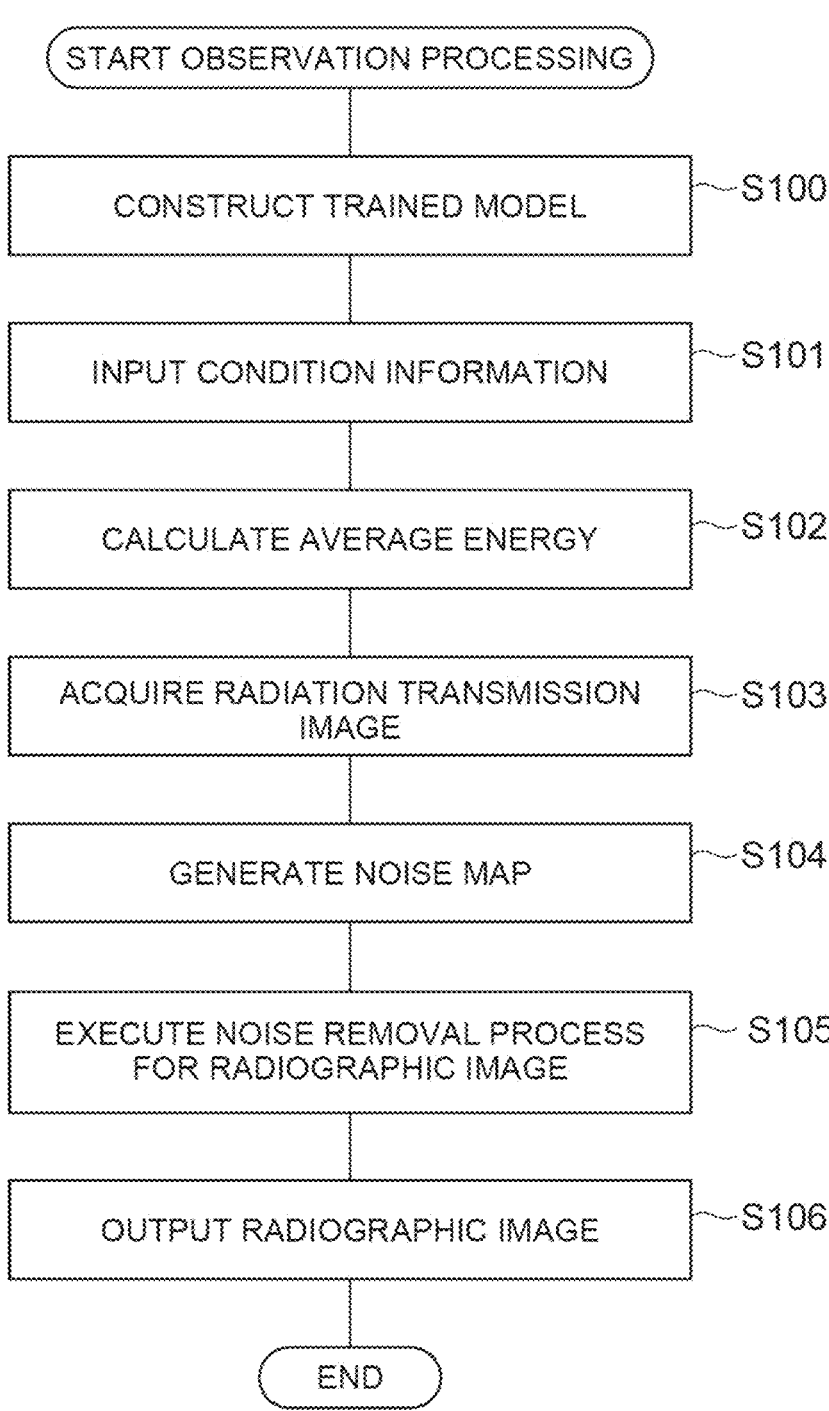
FIG. 10 is a flowchart illustrating a procedure of observation processing using the image acquiring device 1.

Next, a procedure of observing the X-ray transmission image of the target object F using the image acquiring device 1 according to the first embodiment, that is, a flow of the radiographic image acquisition method according to the first embodiment, will be described. FIG. 10 is a flowchart illustrating a procedure of observation processing using the image acquiring device 1.

First, the construction unit 206 uses, as training data, the training image, the noise standard deviation map generated from the training image on the basis of the relational expression, and the noise-removed image data to construct a trained model 207 for outputting the noise-removed image data on the basis of the training image and the noise standard deviation map, through machine learning (step S100). Next, the input unit 201 accepts an input of condition information indicating the operating conditions of the X-ray irradiator 50, the imaging conditions of the X-ray detection camera 10, or the like from an operator (user) of the image acquiring device 1 (step S101). The calculation unit 202 then calculates the value of the average energy of the X-rays detected by the X-ray detection camera 10 on the basis of the condition information (step S102).

Next, the target object F is set in the image acquiring device 1 to capture an image of the target object F, and the control device 20 acquires an X-ray image of the target object F (step S103). Further, the control device 20 derives the standard deviation of the noise value from the average energy of the X-rays and the pixel value of each pixel of the X-ray image on the basis of the relational expression between the pixel value and the standard deviation of the noise value, and the derived standard deviation of noise is associated with each pixel value to generate a noise standard deviation map (step S104).

Next, the processing unit 205 inputs an X-ray image of the target object F and the noise standard deviation map to the trained model 207 constructed and stored in advance, and executes the noise removal process for the X-ray image (step S105). Further, the processing unit 205 outputs an output image which is an X-ray image that has undergone the noise removal process to the display device 30 (step S106).

According to the image acquiring device 1 described above, the scintillation light corresponding to the X-rays passing through the target object F is detected by the scan camera 12 in which the pixel lines 74 each having M pixels 72 arranged in the direction TD of scanning of the target object F is arranged in N columns, detection signals of at least two pixels 72 out of detection signals of the M pixels 72 output for each pixel line 74 are added, and an X-ray image is output by the added N detection signals being sequentially output. Additionally, the output X-ray image is input to the trained model 207 constructed through machine learning in advance using image data, and thus the noise removal process is performed on the X-ray image. Thereby, it is possible to remove noise components while increasing signal components in the X-ray image, and to effectively improve an S/N ratio in the X-ray image. Specifically, in a case where the noise removal process using the trained model 207 is performed, it can be understood that the contrast to noise ratio (CNR) is improved approximately 6.4 times more than in a case where the noise removal process is not performed, and that the improvement effect is larger than the improvement effect of approximately 1.9 times the CNR based on the noise removal process using the bilateral filter.

In addition, in the image acquiring device 1, the trained model 207 is constructed through machine learning using image data obtained by adding noise values along a normal distribution to an X-ray image of a predetermined structure as training data. Thereby, it becomes easy to prepare image data which is training data used to construct the trained model 207, and thus it is possible to efficiently construct the trained model 207.

In addition, according to the image acquiring device 1, the standard deviation of the noise value is derived from the pixel value of each image of the X-ray image using the relational expression between the pixel value and the standard deviation of the noise value, and the noise standard deviation map which is data obtained by associating the derived standard deviation of the noise value with each pixel of the X-ray image is generated. The X-ray image and the noise standard deviation map are input to the trained model 207 constructed through machine learning in advance, and image processing for removing noise from the X-ray image is executed. With such a configuration, the standard deviation of the noise value derived from the pixel value of each pixel of the X-ray image is taken into consideration, and noise in each pixel of the X-ray image is removed through machine learning. Thereby, noise removal corresponding to the relationship between the pixel value and the standard deviation of the noise value in the X-ray image can be realized using the trained model 207. As a result, it is possible to effectively remove noise from the X-ray image.

Particularly, the mode of noise of the X-ray image changes depending on differences in a tube voltage, a filter, a scintillator, conditions of an X-ray detection camera (a gain setting value, a circuit noise value, an amount of saturated charge, a conversion coefficient value (e−/count), and the line rate of the camera), a target object, and the like. For this reason, in a case where noise removal is attempted to be realized through machine learning, the preparation of a learning model trained under various conditions can be considered. That is, as a comparative example, a method of constructing a plurality of learning models according to the conditions during measurement of the X-ray image, selecting a learning model for each condition, and executing the noise removal process can also be adopted. In the case of such a comparative example, for example, a learning model has to be constructed for each noise condition such as the average energy of X-rays, the gain of the X-ray detection camera, and the type of X-ray camera, and it is necessary to generate a huge number of learning models, which may take a lot of time for construction. As an example, when there are ten types of average energy of X-rays, eight gains of the X-ray detection camera, and three types of products, 240 trained models are required, but in a case where it takes one day for each model to construct a trained model, it takes 240 days for machine learning. In this regard, according to the present embodiment, by generating a noise map from the X-ray image and using the noise map as input data for machine learning, it is possible to reduce the noise conditions required to generate a trained model, and a learning time for constructing the trained model 207 is greatly reduced.

Modification Example of Control Device 20 of First Embodiment

Figure 11:
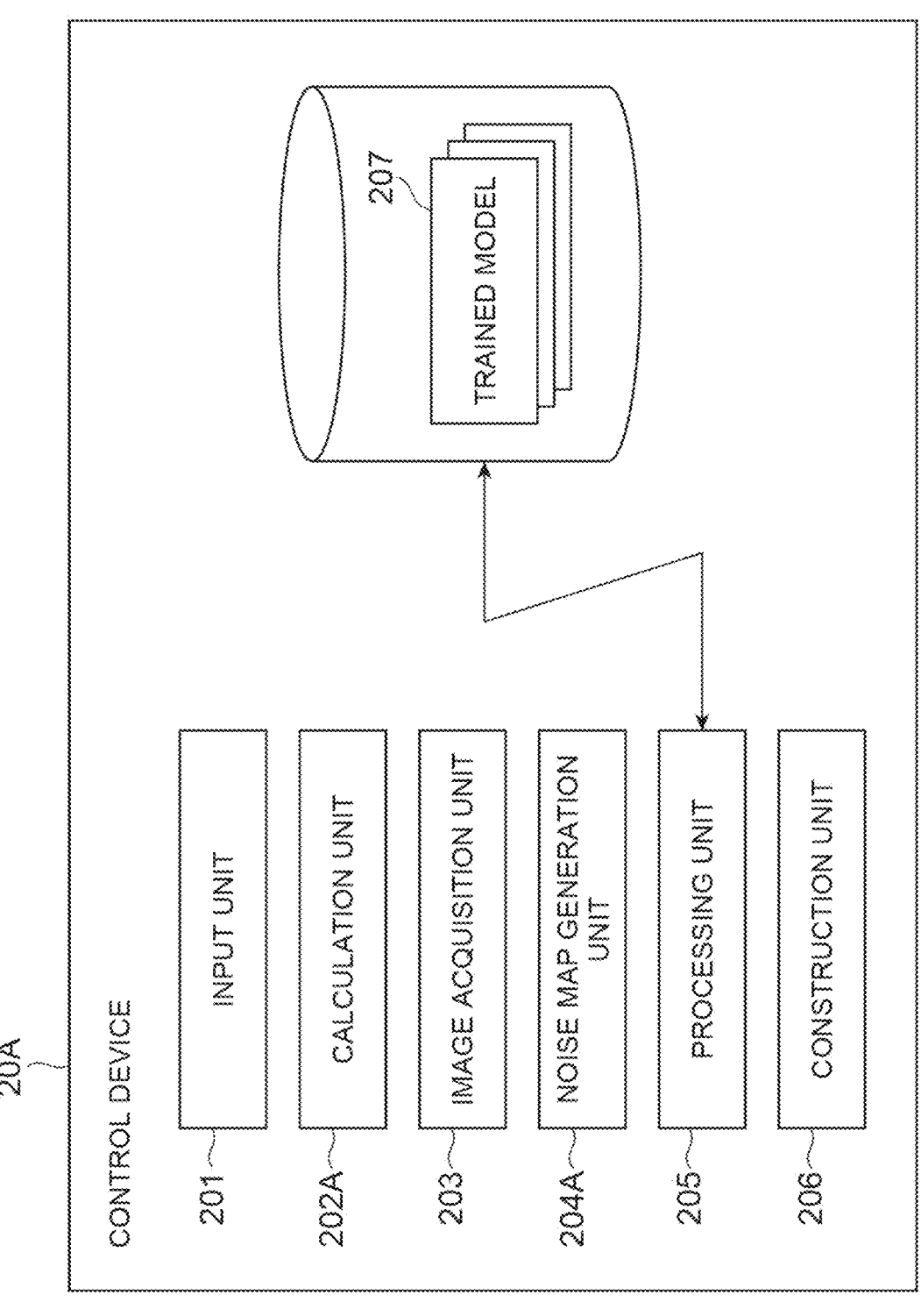
FIG. 11 is a block diagram illustrating a functional configuration of a control device 20A according to a modification example of the present disclosure.
Figure 12:
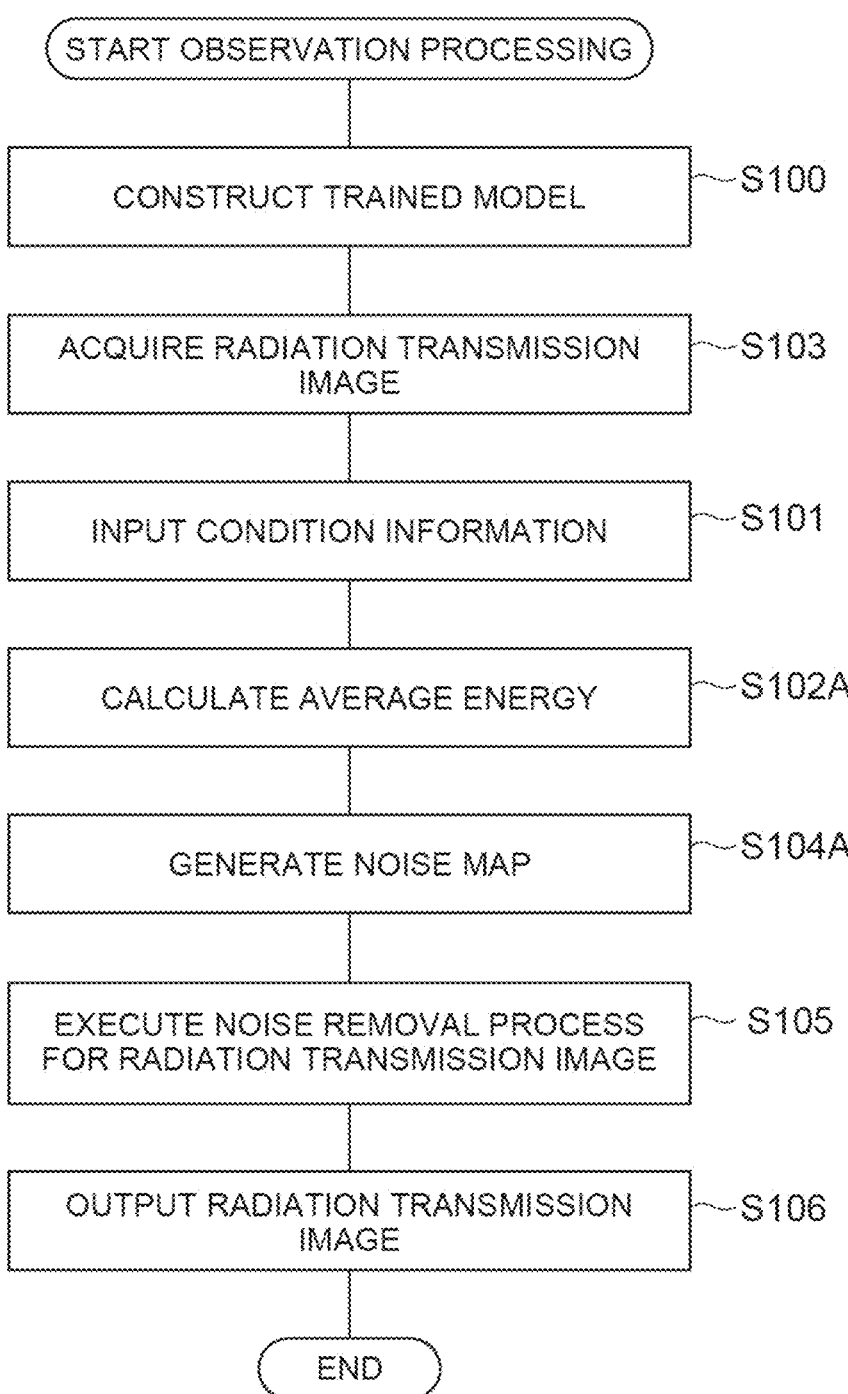
FIG. 12 is a flowchart illustrating a procedure of observation processing using an image acquiring device 1 according to the modification example of the present disclosure.

FIG. 11 is a block diagram illustrating a functional configuration of a control device 20A in a modification example of the first embodiment. The control device 20A is different from that of the first embodiment described above in that a calculation unit 202A has a function of deriving the average energy of X-rays from the pixel value of the X-ray image and that a noise map generation unit 204A has a function of deriving a noise standard deviation map on the basis of the pixel value of the X-ray image and the average energy of the X-rays derived from the X-ray image. FIG. 12 is a flowchart illustrating a procedure of observation processing using the image acquiring device 1 including the control device 20A of FIG. 11. As shown in FIG. 12, in the control device 20A, the process shown in step S103 of the control device 20 according to the first embodiment shown in FIG. 10 is performed immediately after step S100. In the control device 20A, the processes shown in S102A and S104A are executed in place of the processes of steps S102 and S104 of the control device 20.

The calculation unit 202A calculates the average energy from the pixel value of each pixel of the radiographic image (step S102A). Specifically, the calculation unit 202A derives the relationship between the pixel value and the average energy in advance for each piece of condition information through simulation calculation of the X-ray spectrum or the like. The calculation unit 202A acquires condition information acquired by the input unit 201, including at least the tube voltage and the information on the scintillator included in the X-ray detection camera 10. The calculation unit 202A then selects a relationship corresponding to the condition information from the relationship between the pixel value and the average energy derived in advance on the basis of the condition information. Further, the calculation unit 202A derives the average energy for each pixel from the pixel value of each pixel of the X-ray image acquired by the image acquisition unit 203 on the basis of the selected relationship.

Hereinafter, the derivation of the relationship between the pixel value and the average energy for each piece of condition information which is performed by the calculation unit 202A will be described with reference to FIGS. 13 to 17.

Figure 13:
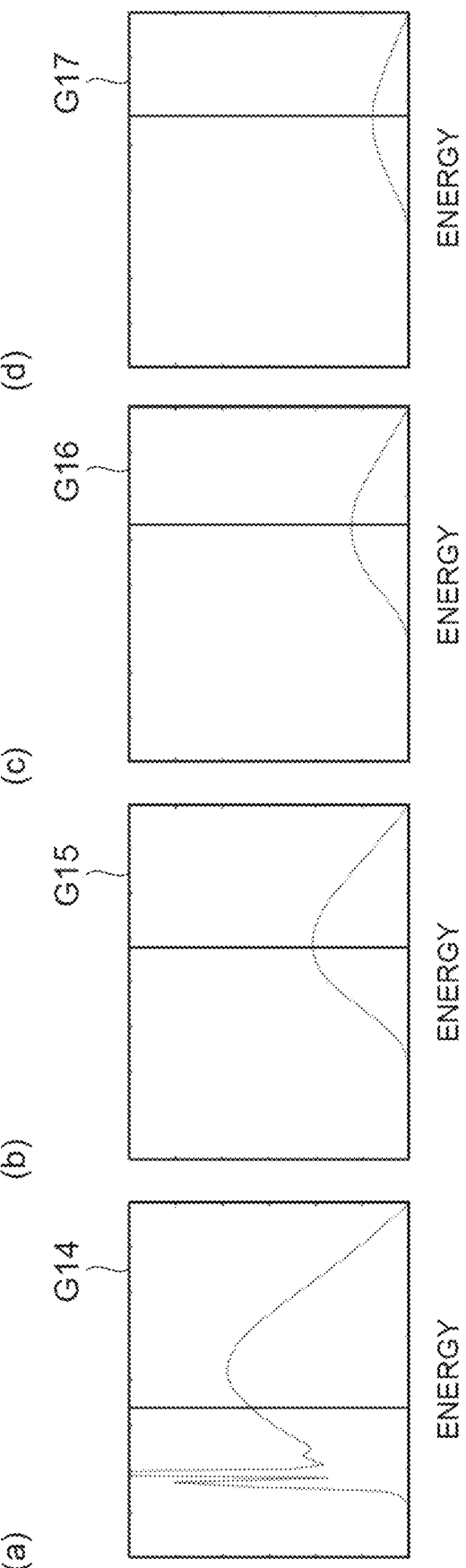
FIG. 13 is a graph illustrating an example of results of simulation calculation of an energy spectrum of transmitted X-rays which is performed by a calculation unit 202A of FIG. 11.

First, the calculation unit 202A derives a graph G18 showing the relationship between the thickness of the target object F and the transmittance of X-rays and a graph G19 showing the relationship between the thickness of the target object F and the average energy of X-rays on the basis of the condition information. Specifically, as shown in the parts (a) to (d) of FIG. 13, the calculation unit 202A calculates energy spectra G14 to G17 of X-rays transmitted in a case where the thickness of the target object F is variously changed through simulation calculation on the basis of the condition information including at least the tube voltage and the information on the scintillator included in the X-ray detection camera 10. FIG. 13 is a graph illustrating an example of results of simulation calculation of an energy spectrum of X-rays passing through the target object F which is performed by the calculation unit 202A. Here, the energy spectra G14 to G17 of transmitted X-rays in a case where simulation calculation is performed by gradually increasing the thickness of the target object F composed of water are exemplified. Further, the calculation unit 202A calculates the average energy of X-rays transmitted in a case where the thickness of the target object F is variously changed on the basis of the calculated energy spectra G14 to G17. Meanwhile, in addition to the simulation calculation, the calculation unit 202A may obtain a relationship between the thickness of the target object F and the average energy on the basis of the X-ray image obtained by capturing an image of a structure of which the thickness is known.

Further, the calculation unit 202A also derives the relationship between the thickness of the target object F and the transmittance of X-rays on the basis of the above simulation result. FIG. 14 is a chart table illustrating an example of the relationship between the thickness of the target object F, average energy, and transmittance which is derived by the calculation unit 202A. As shown in FIG. 14, the average energy of the transmitted X-rays and the transmittance of X-rays are derived corresponding to each of the energy spectra G14 to G17 calculated for each thickness of the target object F.

Figure 15:
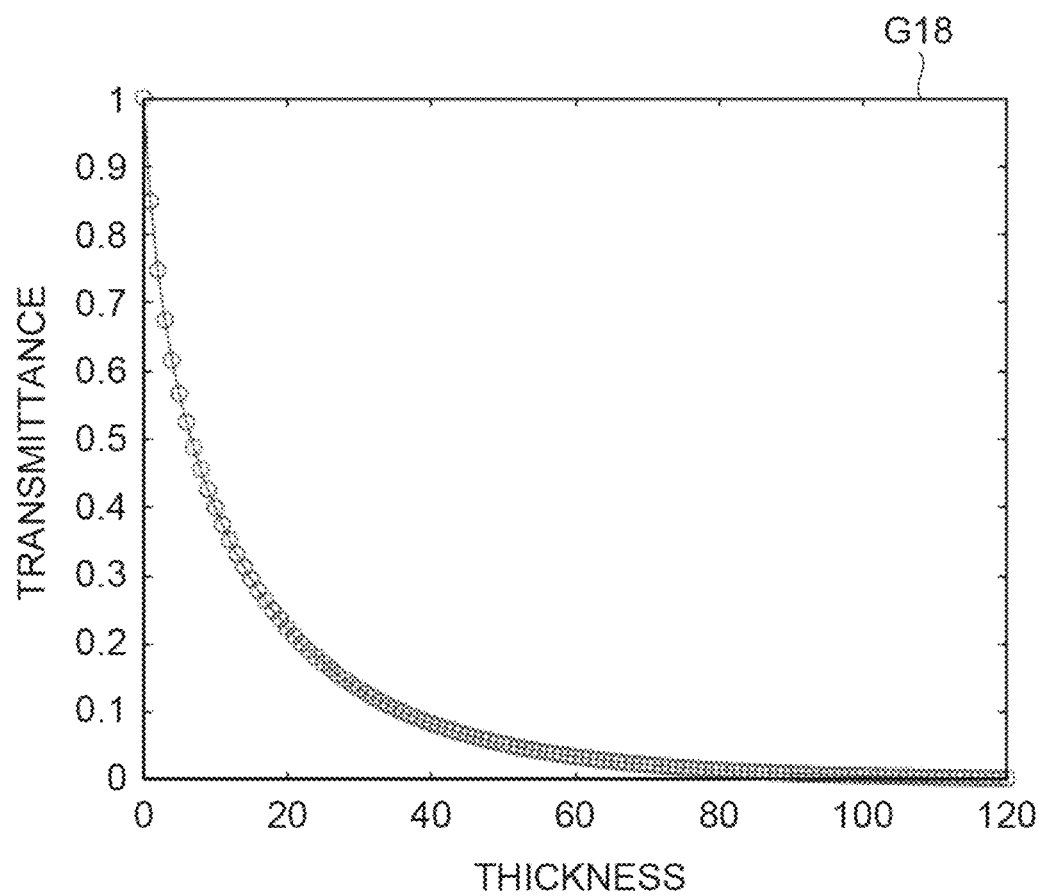
FIG. 15 is a graph illustrating an example of results of simulation calculation of a relationship between the thickness of the target object and the transmittance of X-rays which is performed by the calculation unit 202A of FIG. 11.
Figure 16:
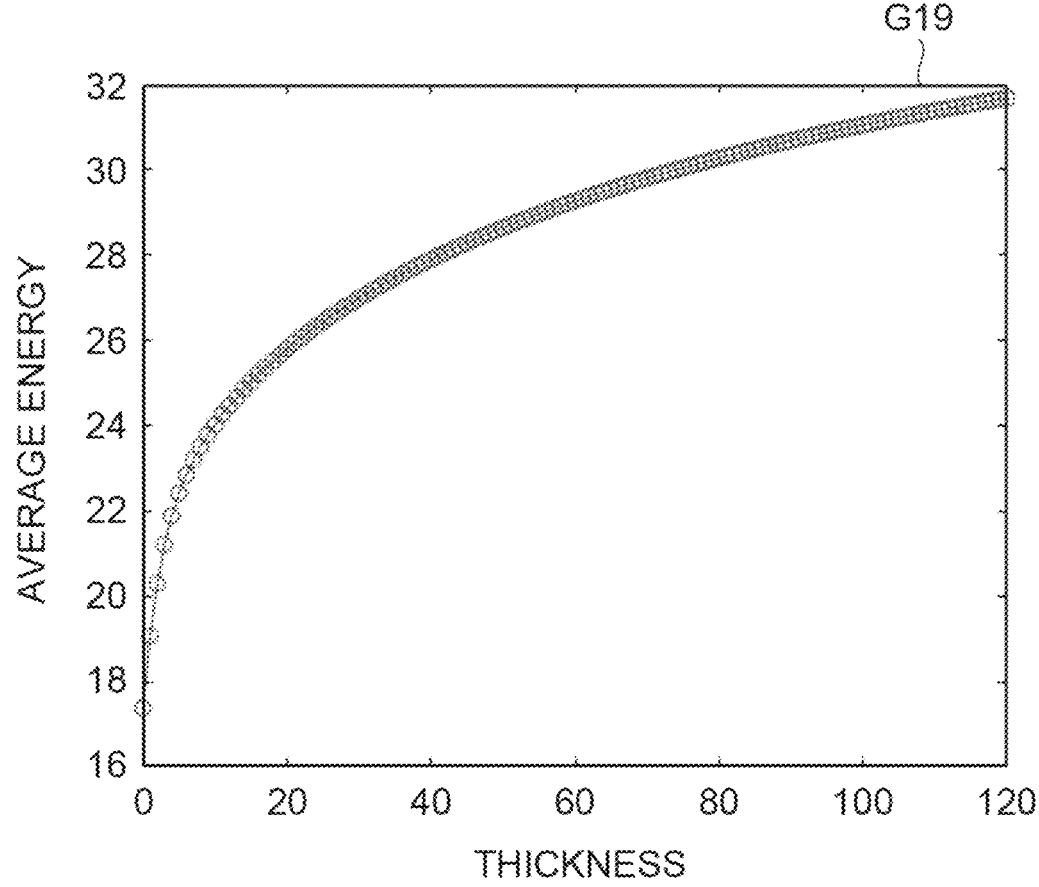
FIG. 16 is a graph illustrating an example of results of simulation calculation of a relationship between the thickness of the target object and the average energy of transmitted X-rays which is performed by the calculation unit 202A of FIG. 11.

Next, the calculation unit 202A derives the graph G18 showing the relationship between the thickness of the target object F and the transmittance of X-rays from the transmittance of the X-rays derived for the target object F having various thicknesses. FIG. 15 is a graph illustrating the relationship between the thickness of the target object F and the transmittance of X-rays with respect to the target object F which is derived by the calculation unit 202A. Additionally, the calculation unit 202A derives the graph G19 showing the relationship between the thickness of the target object F and the average energy of X-rays from the average energy of the X-rays derived for the target object F having various thicknesses. FIG. 16 is a graph illustrating the relationship between the thickness of the target object F and the average energy of X-rays passing through the target object F which is derived by the calculation unit 202A.

Figure 17:
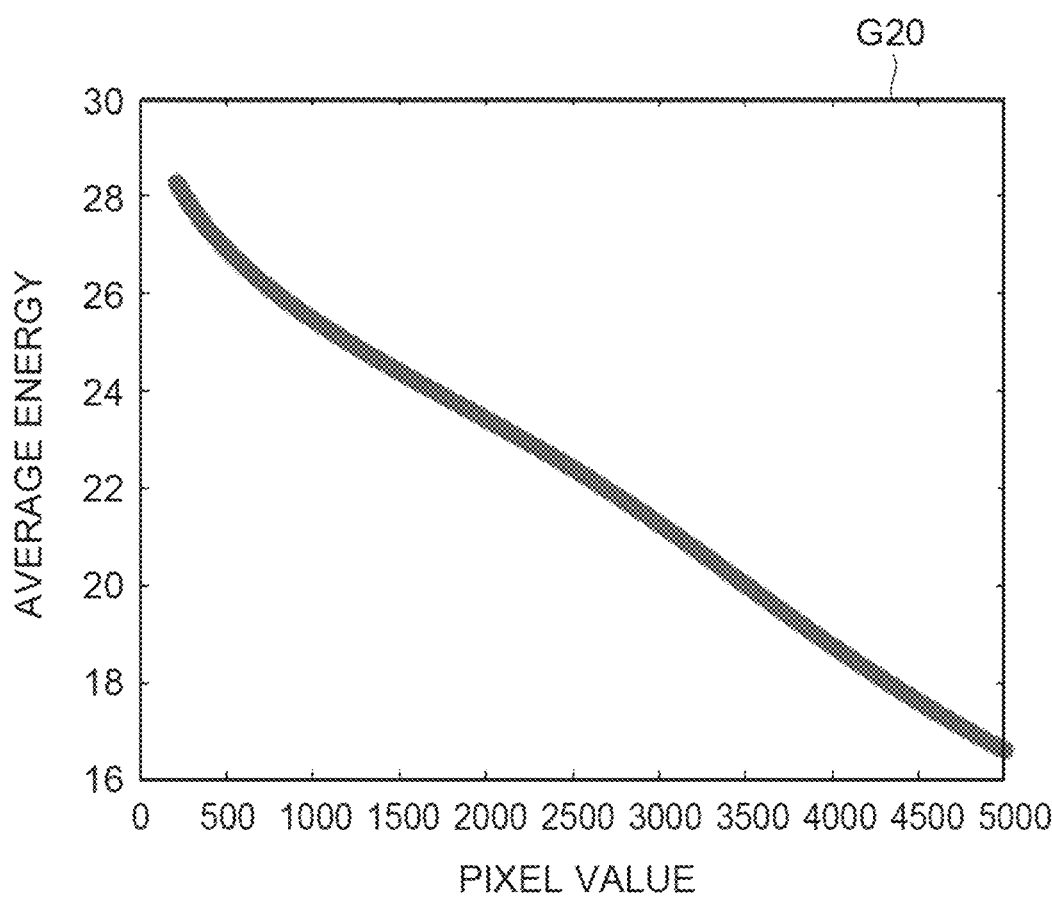
FIG. 17 is a graph illustrating an example of results of simulation calculation of a relationship between the pixel value of an X-ray image and the average energy which is performed by the calculation unit 202A of FIG. 11.

The calculation unit 202A derives a graph G20 showing the relationship between the pixel value of the X-ray image and the average energy as shown in FIG. 17 for each piece of various types of condition information on the basis of the two graphs G18 and G19 derived for each piece of various types of condition information. FIG. 17 is a graph illustrating the relationship between the pixel value of the X-ray image and the average energy which are derived by the calculation unit 202A. Specifically, the calculation unit 202A derives a pixel value $I_0$ of the X-ray transmission image in a case where the target object F is not present on the basis of the condition information. The calculation unit 202A then sets a pixel value I of the X-ray image in a case where the target object F is present, and calculates $I/I_0$ which is the transmittance of X-rays. Further, the calculation unit 202A derives the thickness of the target object F from $I/I_0$ which is the calculated transmittance of X-rays on the basis of the graph G18 of the thickness of the target object F and the transmittance of X-rays with respect to the target object F. Finally, the calculation unit 202A derives the average energy of the transmitted X-rays corresponding to the derived thickness of the target object F on the basis of the derived thickness of the target object F and the graph G19 of the thickness of the target object F and the average energy of the transmitted X-rays. Subsequently, the calculation unit 202A performs the above derivation for each piece of various types of condition information while variously changing the pixel value I of X-ray image to thereby derive the graph G20 showing the relationship between the pixel value of the X-ray image and the average energy of the transmitted X-rays for each piece of condition information.

Here, an example of derivation of average energy based on the pixel value which is performed by the calculation unit 202A will be described. For example, it is assumed that the calculation unit 202A derives the pixel value of the X-ray transmission image in a case where the target object F is not present as $I_0=5000$ on the basis of the condition information and sets the pixel value of the X-ray image in a case where the target object F is present to be $I=500$. In this case, the calculation unit 202A calculates the transmittance of X-rays as $I/I_0=0.1$. Subsequently, the calculation unit 202A derives that the thickness corresponding to the X-ray transmittance of 0.1 is 30 mm on the basis of the graph G18 showing the relationship between the thickness of the target object F and the transmittance of X-rays with respect to the target object F. Further, the calculation unit 202A derives that the average energy corresponding to the pixel value of 500 is 27 keV on the basis of the graph G19 showing the relationship between the thickness of the target object F and the average energy of the transmitted X-rays. Finally, the calculation unit 202A repeatedly derives the average energy of X-rays for each pixel value, and derives the graph G20 showing the relationship between the pixel value of the X-ray image and the average energy.

Further, the calculation unit 202A selects a graph G20 corresponding to the condition information acquired by the input unit 201 from a plurality of graphs G20 derived in advance in the above procedure. The calculation unit 202A derives the average energy of the transmitted X-rays corresponding to the pixel value of each pixel of the X-ray image acquired by the image acquisition unit 203 on the basis of the selected graph G20.

Meanwhile, the calculation unit 202A does not derive the relationship between the pixel value and the average energy of X-rays in advance for each piece of condition information, and may derive the average energy of X-rays from the condition information acquired by the input unit 201 and the pixel value of each pixel of the X-ray image with reference to the graphs G18 and G19. Specifically, the calculation unit 202A derives the pixel value $I_0$ of the X-ray image in a case where the target object is not present on the basis of the condition information. The calculation unit 202A then calculates the transmittance by obtaining a ratio to the pixel value $I_0$ for each pixel value I of each pixel of the X-ray image acquired by the image acquisition unit 203. Further, the calculation unit 202A derives the thickness on the basis of the graph G18 showing the relationship between the thickness and the transmittance of X-rays and the calculated transmittance. The calculation unit 202A then derives the average energy for each pixel value of each pixel of the X-ray image by deriving the average energy on the basis of the graph G19 showing the relationship between the thickness and the average energy and the derived thickness.

The noise map generation unit 204A generates a noise standard deviation map from the X-ray image acquired by the image acquisition unit 203 and the average energy of X-rays corresponding to each pixel of the X-ray image derived by the calculation unit 202A (step S104A). Specifically, the noise map generation unit 204A derives the standard deviation of the noise value for each pixel in consideration of the thickness of the target object by substituting the pixel value of each pixel of the X-ray image acquired by the image acquisition unit 203 and the average energy derived for each pixel by the calculation unit 202A into Relational Expression (4). The noise map generation unit 204A generates the standard deviation of the noise value corresponding to each pixel of the X-ray image as a noise standard deviation map.

Figure 18:
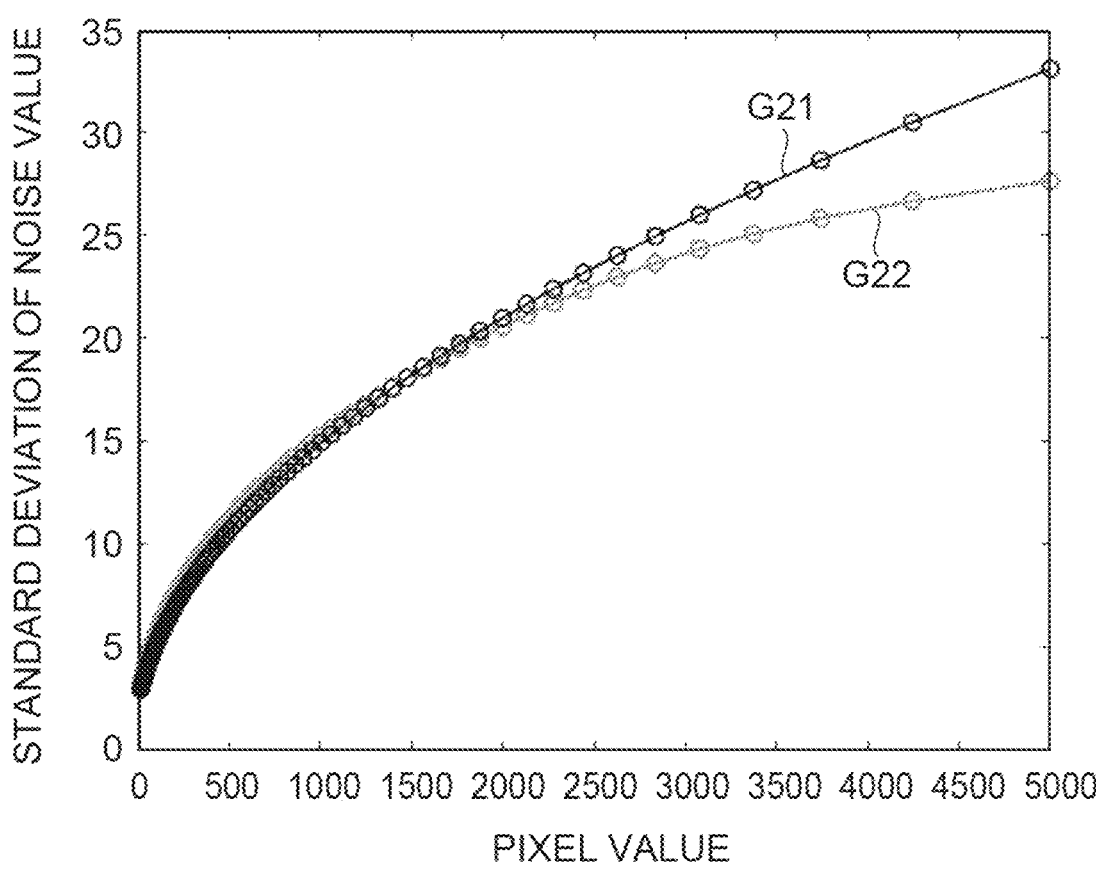
FIG. 18 is a graph illustrating an example of results of simulation calculation of a relationship between the pixel value of the X-ray image and the standard deviation of noise values.

FIG. 18 is a graph showing an example of the relationship between the pixel value and the standard deviation of the noise value. This graph shows the relationship between the standard deviation of the noise value derived from the pixel value of the X-ray image by the calculation unit 202A and the noise map generation unit 204A according to the present modification example and the pixel value of the X-ray image. In the present modification example, since the standard deviation of the noise value is derived in consideration of the thickness of the target object, the thickness of the target object becomes smaller as the pixel value increases, and the average energy in a pixel decreases. Therefore, as estimated from Relational Expression (4), a change in the standard deviation of the noise value when the pixel value increases differs between the first embodiment and the present modification example. In the example shown in FIG. 18, a graph G22 of the present modification example has a smaller degree of increase in the standard deviation of the noise value when the pixel value increases than a graph G21 of the first embodiment.

In the control device 20A of the modification example of first embodiment, the average energy is calculated from the pixel value of each pixel of the X-ray image. Here, for example, in a case where a plurality of target objects having different thicknesses and materials are present in the X-ray image, the average energy differs greatly for each target object, and noise cannot be removed sufficiently from the X-ray image. With such a configuration, the average energy of X-rays passing through the target object F is calculated for pixel value of each pixel of the X-ray image, and thus it is possible to realize noise removal corresponding to the relationship between the pixel value of each pixel of the X-ray image and the noise, for example, in consideration of the difference in thickness and material or the like. As a result, it is possible to effectively remove the noise from the X-ray image.

Figure 19:
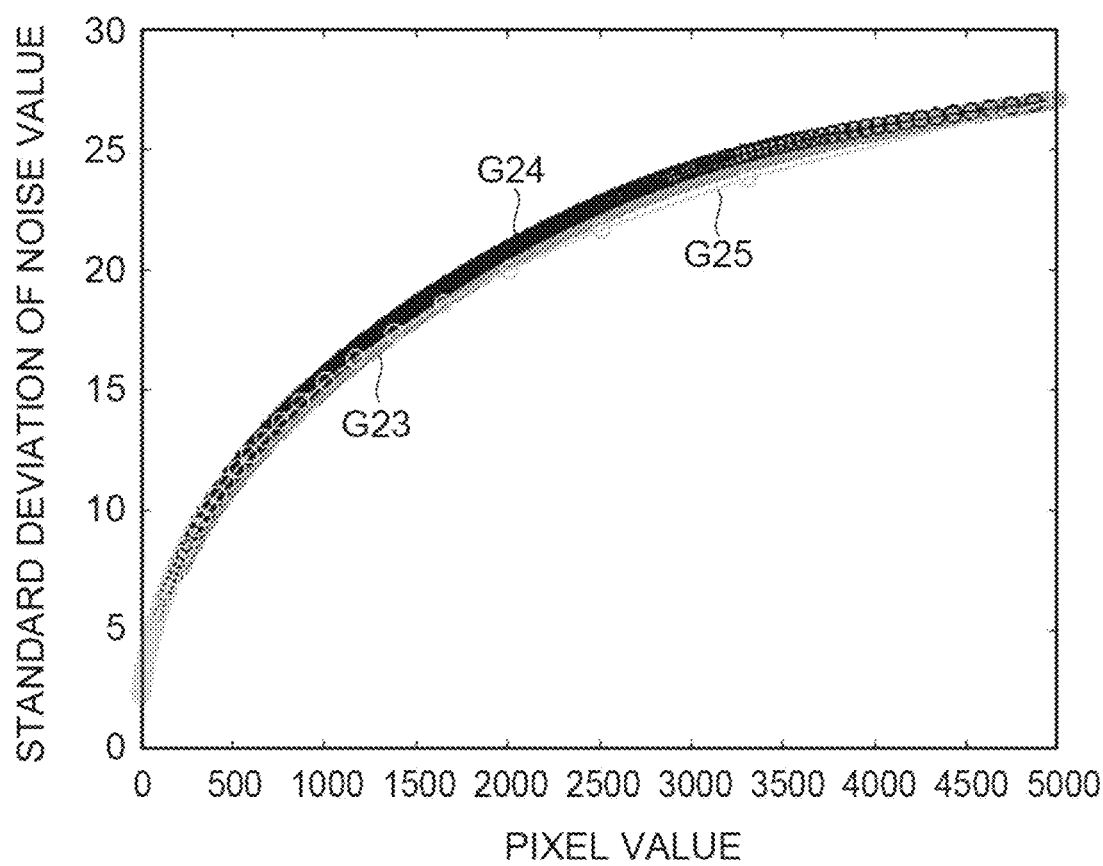
FIG. 19 is a graph illustrating an example of a relationship between the pixel value and the standard deviation of noise values in a case where the material of the target object changes which is derived by the calculation unit 202A of FIG. 11.

Meanwhile, the control device 20A according to the present modification example derives the average energy from the pixel value of the X-ray image using the graph G20 derived for each piece of various types of condition information. In this case, the average energy may be derived from the pixel value while ignoring the difference in the material of the target object F. FIG. 19 is a graph illustrating the relationship between the pixel value of the X-ray image and the standard deviation of the noise value derived by the calculation unit 202A. Here, a change in the material of the target object F is also taken into consideration as the condition information to derive the relationship. A graph G24 shows a derivation example in a case where the material is aluminum, a graph G23 shows a derivation example in a case where the material is polyethylene terephthalate (PET), and a graph G25 shows a derivation example in a case where the material is copper. In this way, when the tube voltage of the X-ray irradiator 50 and the information on the scintillator included in the X-ray detection camera 10 used for capturing an image of the target object F are the same as each other even in a case where the material of the target object F changes, the relationship between the pixel value and the average energy of the transmitted X-rays does not change greatly, and thus the relationship between the pixel value and the standard deviation of the noise value also does not change greatly. In consideration of such a property, the control device 20A can derive the average energy from the pixel value of the X-ray image while ignoring the difference in the material of the target object F as the condition information. Even in such a case, according to the control device 20A of the present modification example, it is possible to realize noise removal corresponding to the relationship between the pixel value and the standard deviation of noise. As a result, it is possible to further effectively remove the noise from the X-ray image.

Another Modification Example of Control Device 20 of First Embodiment

Figure 20:
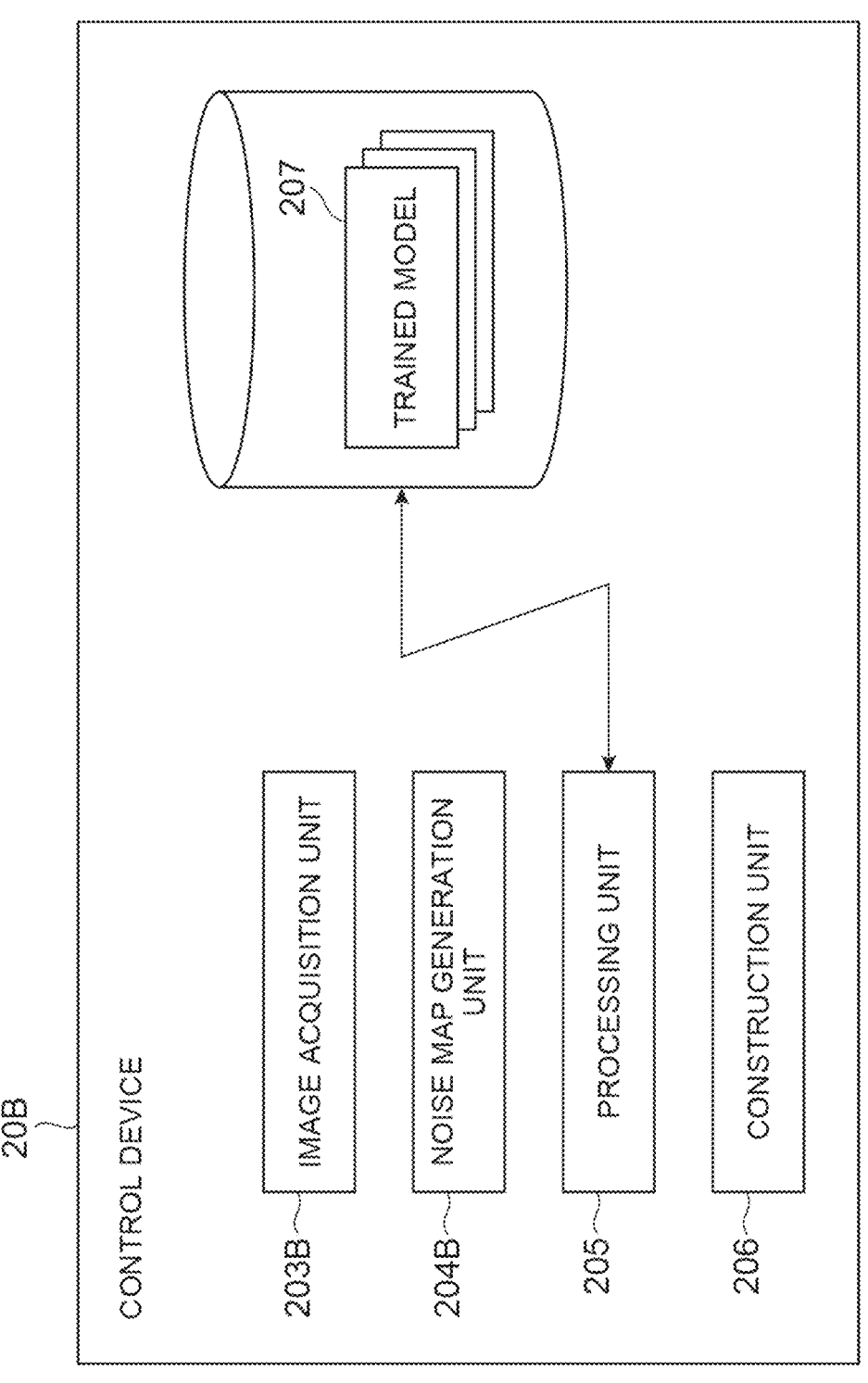
FIG. 20 is a block diagram illustrating a functional configuration of a control device 20B according to another modification example of the present disclosure.
Figure 21:
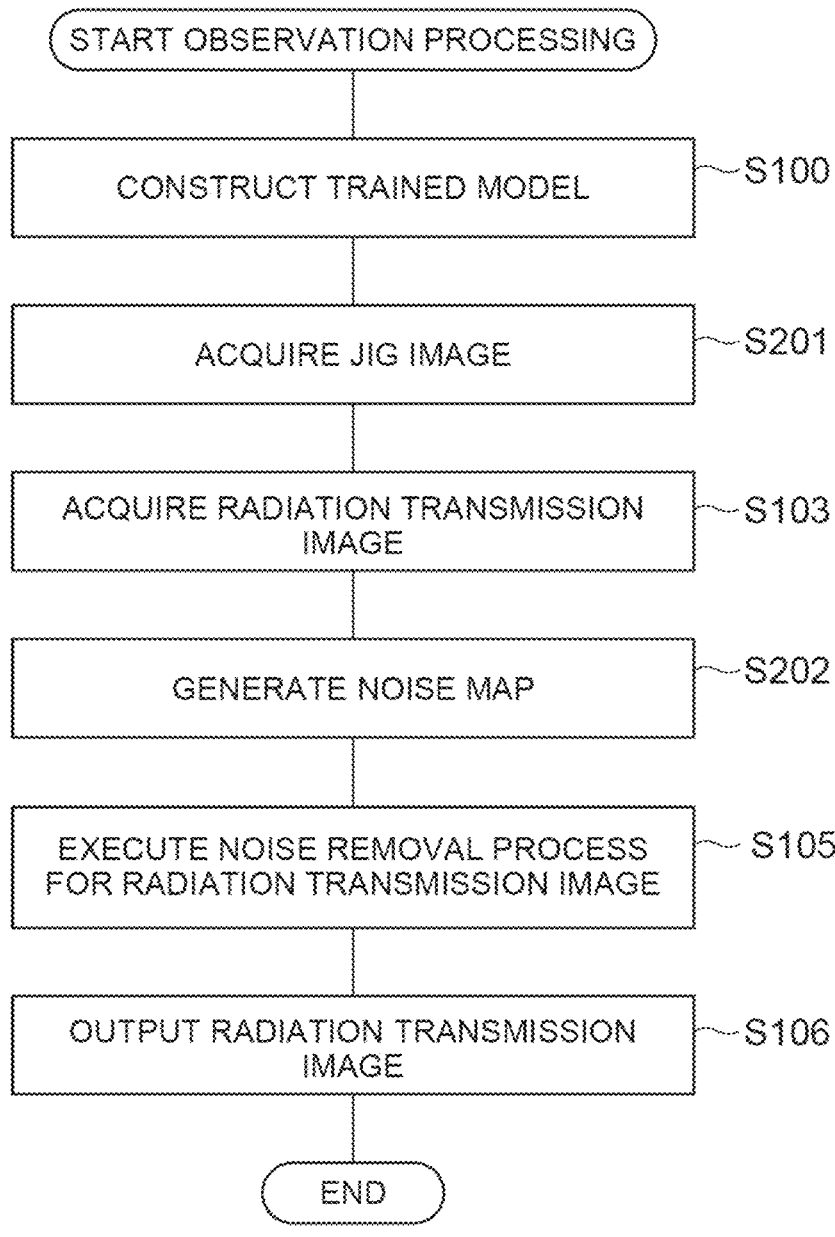
FIG. 21 is a flowchart illustrating a procedure of observation processing using an image acquiring device 1 according to another modification example of the present disclosure.

FIG. 20 is a block diagram illustrating a functional configuration of a control device 20B according to another modification example of the first embodiment. The control device 20B is different from the first embodiment described above in that an image acquisition unit 203B has a function of acquiring an X-ray image of the jig and that a noise map generation unit 204B has a function of deriving a graph showing the relationship between the pixel value and the standard deviation of the noise value from the X-ray image of the jig. FIG. 21 is a flowchart illustrating a procedure of observation processing using the image acquiring device 1 including the control device 20B of FIG. 20. As shown in FIG. 21, in the control device 20B according to the present modification example, the processes shown in steps S201 and S202 are executed in place of the processes of steps S101, S102, and S104 which are performed by the control device 20 according to the first embodiment shown in FIG. 10.

The image acquisition unit 203B acquires a radiographic image of the jig obtained by radiating radiation to the jig and capturing an image of the radiation passing through the jig (step S201). Specifically, the image acquisition unit 203B acquires an X-ray image captured by radiating X-rays to the jig and the target object F using the image acquiring device 1. As the jig, a flat plate-like member or the like whose thickness and material are known is used. That is, the image acquisition unit 203B acquires an X-ray image of the jig captured using the image acquiring device 1 in advance of the observation processing of the target object F. The image acquisition unit 203B then acquires an X-ray image of the target object F captured using the image acquiring device 1. However, the acquisition timings of the X-ray images of the jig and the target object F are not limited to the above, and may be simultaneous or reverse (step S103). In addition, similarly to the image acquisition unit 203, the image acquisition unit 203B acquires an X-ray image obtained by radiating X-rays to the target object F and capturing an image of the X-rays passing through the target object F.

In the image acquiring device 1, the jig is set to capture an image of the jig, and the noise map generation unit 204B derives relational data indicating the relationship between the pixel value and the evaluation value obtained by evaluating the spread of the noise value from the radiographic image of the jig obtained as a result (step S202). Specifically, the noise map generation unit 204B derives a noise standard deviation map indicating the relationship between the pixel value and the standard deviation of the noise value from the X-ray image of the jig.

Figure 22:
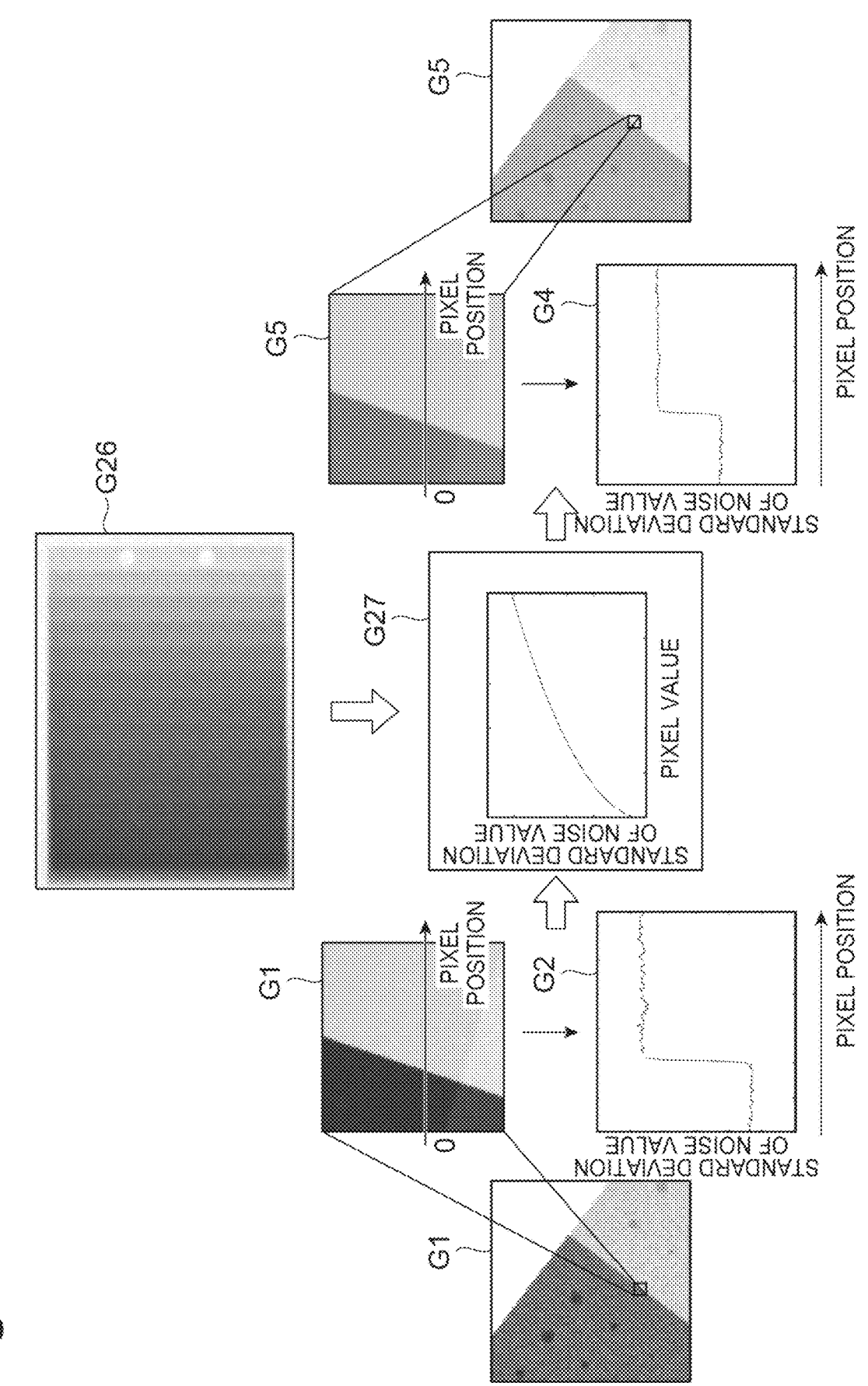
FIG. 22 is a diagram illustrating an example of generation of a noise standard deviation map which is performed by a noise map generation unit 204B of FIG. 20.

FIG. 22 is a diagram illustrating an example of generation of a noise standard deviation map which is performed by the noise map generation unit 204B. The noise map generation unit 204B derives a relational graph G27 showing the correspondence relation between the pixel value and the standard deviation of the noise value from the X-ray image G26 of the jig. In the same manner as in the first embodiment, the noise map generation unit 204B then derives the relational data G2 indicating the correspondence relation between each pixel position and the pixel value from the X-ray image G1 acquired by the image acquisition unit 203B. Further, the noise map generation unit 204 derives the standard deviation of the noise value corresponding to a pixel at each pixel position in the X-ray image by applying the correspondence relation indicated by the relational graph G27 to each pixel in the relational data G2. As a result, the noise map generation unit 204 associates the derived standard deviation of noise with each pixel position, and derives relational data G4 indicating the correspondence relation between each pixel position and the standard deviation of noise. The noise map generation unit 204 then generates a noise standard deviation map G5 on the basis of the derived relational data G4.

Figure 23:
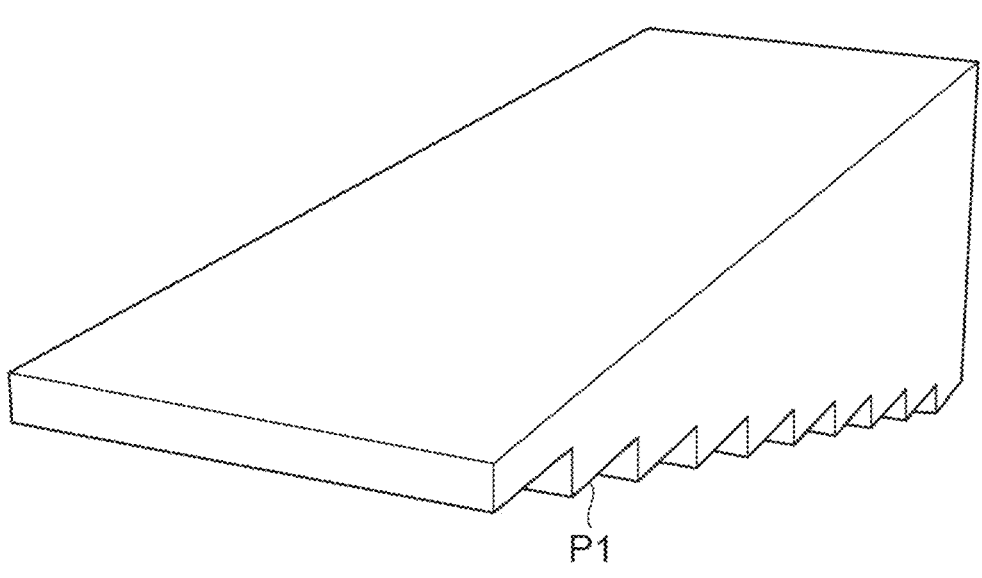
FIG. 23 is a perspective view illustrating an example of a structure of a jig used for image capture in the image acquiring device 1 according to another modification example of the present disclosure.
Figure 24:
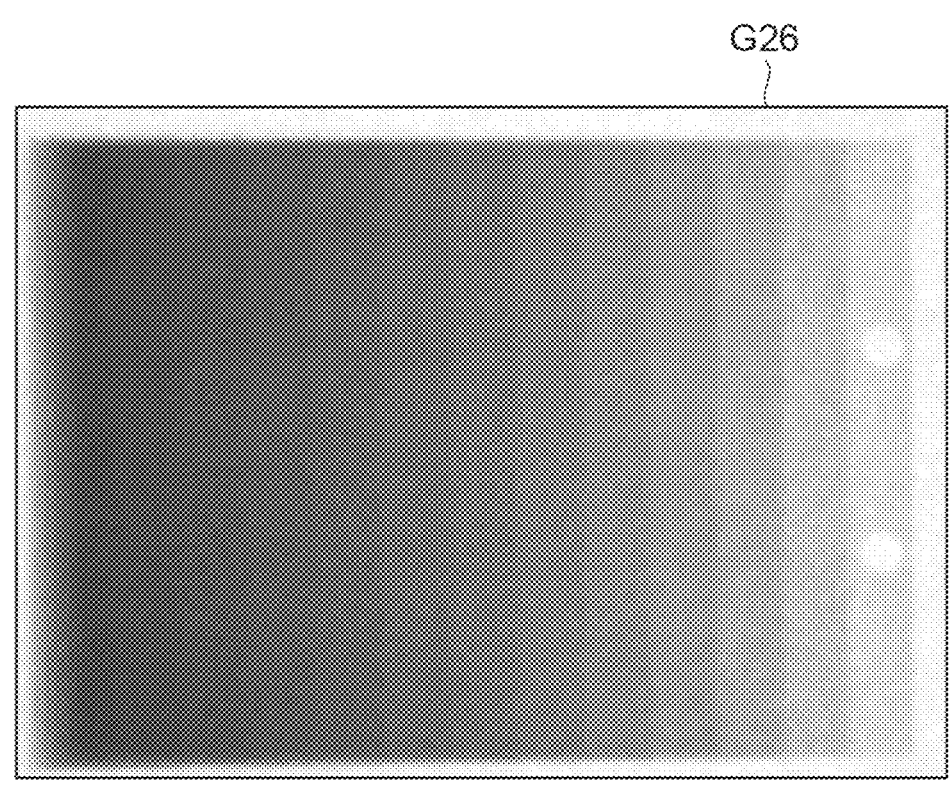
FIG. 24 is a diagram illustrating an example of a captured image of the jig of FIG. 23.

The derivation of the relational graph G27 showing the relationship between the pixel value and the standard deviation of the noise value from the X-ray image G26 of the jig which is performed by the noise map generation unit 204B will be described. FIG. 23 shows an example of the structure of the jig used for image capture in the present modification example. As the jig, for example, a member P1 of which the thickness changes stepwise in one direction can be used. FIG. 24 shows an example of an X-ray image of the jig of FIG. 23. First, in the X-ray image G26 of the jig, the noise map generation unit 204B derives a pixel value (hereinafter referred to as a true pixel value) in a case where there is no noise for each step of the jig, and derives the standard deviation of the noise value on the basis of the true pixel value. Specifically, the noise map generation unit 204B derives the average value of the pixel values in a certain step of the jig. The noise map generation unit 204B sets the derived average value of the pixel values as a true pixel value in the step. The noise map generation unit 204B derives a difference between each pixel value and the true pixel value as a noise value in the step. The noise map generation unit 204B derives the standard deviation of the noise value from the derived noise value for each pixel value.

The noise map generation unit 204B then derives the relationship between the true pixel value and the standard deviation of the noise value as the relationship graph G27 between the pixel value and the standard deviation of the noise value. Specifically, the noise map generation unit 204B derives the true pixel value and the standard deviation of the noise value for each step of the jig. The noise map generation unit 204B derives the relational graph G27 showing the relationship between the pixel value and the standard deviation of the noise value by plotting the derived relationship between the true pixel value and the standard deviation of the noise value on a graph and drawing an approximate curve. Meanwhile, for the approximate curve, exponential approximation, linear approximation, logarithmic approximation, polynomial approximation, power approximation, or the like is used.

In the control device 20B according to the present modification example, relational data is generated on the basis of a radiographic image obtained by capturing an image of an actual jig. Thereby, the best relational data for noise removal of the radiographic image of the target object F is obtained. As a result, it is possible to more effectively remove noise from the radiographic image.

Meanwhile, the noise map generation unit 204B may derive the relationship between the pixel value and the standard deviation of the noise value from the captured image in a case where the tube current or the exposure time is changed in a state where there is no target object without using a jig. With such a configuration, since the relational data is generated on the basis of the radiographic image obtained by actually performing image capture and the noise map is generated, it is possible to realize noise removal corresponding to the relationship between the pixel value and the spread of noise. As a result, it is possible to more effectively remove the noise from the radiographic image.

Specifically, the image acquisition unit 203B may acquire a plurality of radiographic image captured in a state where there is no target object (step S201), and the noise map generation unit 204B may derive the relationship between the pixel value and the standard deviation of the noise value from the radiographic image acquired by the image acquisition unit 203B (step S202). A plurality of radiographic images are a plurality of images in which at least one of the conditions of the source of radiation or imaging conditions is different from each other. As an example, the image acquisition unit 203B acquires a plurality of X-ray images captured using the image acquiring device 1 in a state where there is no target object F in advance of the observation processing of the target object F while the tube current or the exposure time is changed. The noise map generation unit 204B then derives a true pixel value for each X-ray image, and derives the standard deviation of noise on the basis of the true pixel value in the same manner as in the present modification example. Further, in the same manner as in the present modification example, the noise map generation unit 204B derives a relational graph showing the relationship between the pixel value and the standard deviation of the noise value by plotting the relationship between the true pixel value and the standard deviation of noise on a graph and drawing an approximate curve. Finally, in the same manner as in the first embodiment, the noise map generation unit 204B generates a noise standard deviation map from the X-ray image acquired by the image acquisition unit 203B on the basis of the derived relational graph.

Second Embodiment

Figure 25:
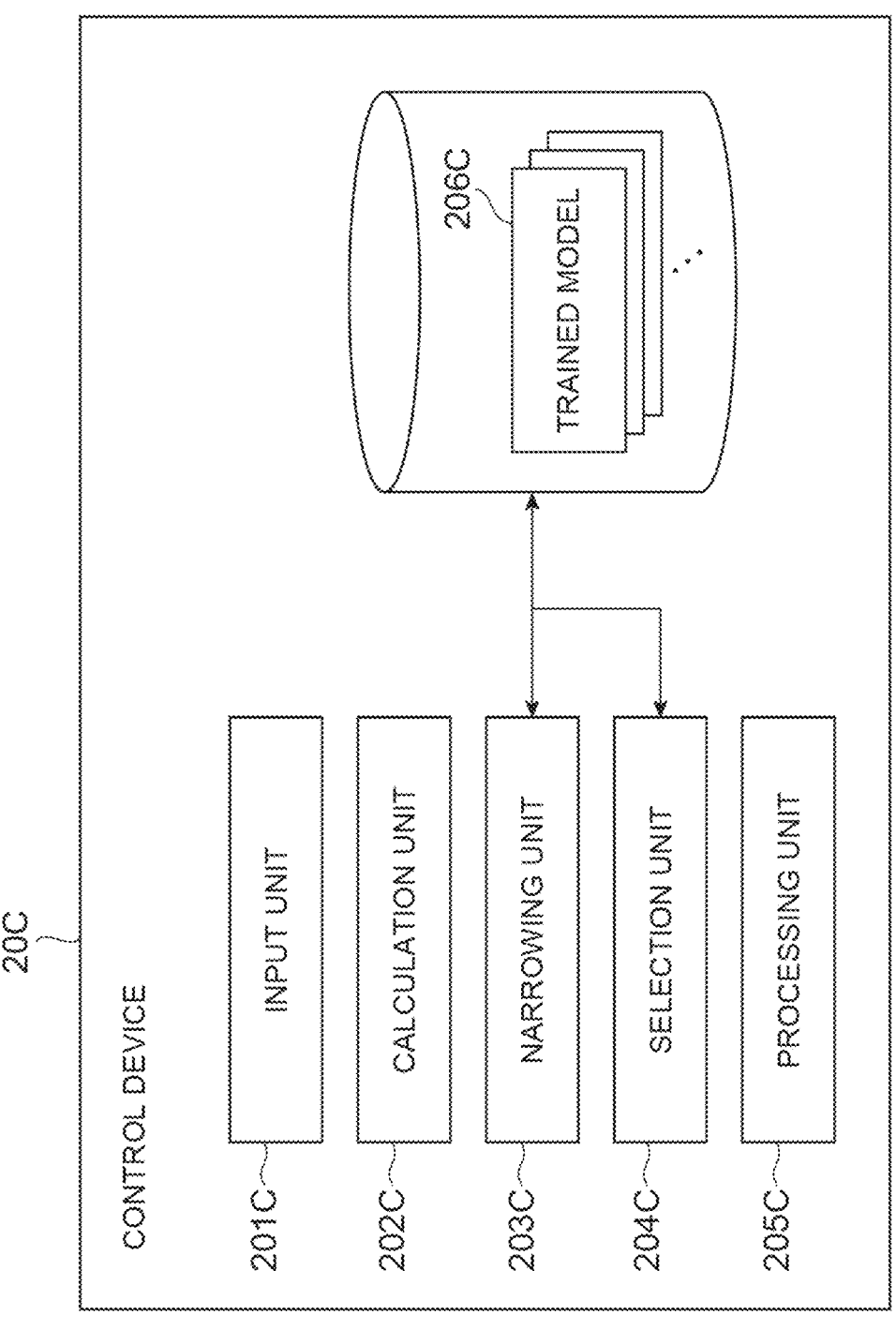
FIG. 25 is a block diagram illustrating a functional configuration of a control device 20C according to a second embodiment.

FIG. 25 is a block diagram illustrating a functional configuration of a control device 20C according to a second embodiment. The control device 20C includes an input unit 201C, a calculation unit 202C, a narrowing unit 203C, a selection unit 204C, and a processing unit 205C.

In addition, a plurality of trained models 206C for executing the noise removal process for an X-ray transmission image are stored in advance in the control device 20C. Each of the plurality of trained models 206C is a learning model based on machine learning constructed in advance using image data as training data. Examples of machine learning include supervised learning, deep learning, reinforcement learning, neural network learning, and the like. In the present embodiment, the two-dimensional convolutional neural network described in the paper "Beyond a Gaussian Denoiser: Residual Learning of Deep CNN for Image Denoising" authored by Kai Zhang et al. is adopted as an example of a deep learning algorithm. The plurality of trained models 206C may be generated by an external computer or the like and downloaded to the control device 20C, or may be generated in the control device 20C.

Figure 26:
FIG. 26 is a diagram illustrating an example of image data which is training data used to construct trained models 206C of FIG. 25.

FIG. 26 shows an example of image data which is training data used to construct trained models 206C. As the training data, an X-ray transmission image having a pattern of various thicknesses, various materials, and various resolutions as an imaging target can be used. The example shown in FIG. 26 is an example of an X-ray transmission image generated for chicken. As the image data, an X-ray transmission image actually generated for a plurality of types of target objects using the image acquiring device 1 may be used, or image data generated by simulation calculation may be used. The X-ray transmission image may be acquired using a device different from the image acquiring device 1. In addition, the X-ray transmission image and the image data generated by simulation calculation may be used in combination. Each of the plurality of trained models 206C is constructed in advance using image data obtained for transmitted X-rays having different average energy and having a known noise distribution. The average energy of X-rays in the image data is set to a different value in advance by setting the operating conditions of the X-ray irradiator (radiation source) 50 of the image acquiring device 1, the imaging conditions of the image acquiring device 1, or the like, or setting the operating conditions of the X-ray irradiator 50 or imaging conditions during simulation calculation (a method of setting average energy according to the operating conditions or imaging conditions will be described later). That is, the plurality of trained models 206C are constructed through machine learning using, as training data, a training image which is an X-ray image corresponding to average energy related to X-rays passing through the target object F calculated on the basis of condition information indicating the operating conditions of the X-ray irradiator (radiation source) 50 when the X-ray transmission image of the target object F is captured, the imaging conditions of the X-ray detection camera 10, or the like (construction step). For example, in the present embodiment, each of the plurality of trained models 206C is constructed using multiple frames (for example, 20,000 frames) of a plurality of types of image data in which the average energy is 10 keV, 20 keV, 30 keV, . . . and values in increments of 10 keV are set.

The image data which is training data used to construct the trained model 206C is generated by the same creation procedure as the creation procedure in the first embodiment described above.

Hereinafter, referring back to FIG. 25, the details of the function of each functional unit of the control device 20C will be described.

The input unit 201C accepts an input of condition information indicating the operating conditions of the X-ray irradiator (radiation source) 50 when the X-ray transmission image of the target object F is captured, the imaging conditions of the X-ray detection camera 10, or the like from a user of the image acquiring device 1. Examples of the operating conditions include all or some of a tube voltage, a target angle, a target material, and the like. Examples of the condition information indicating the imaging conditions include information indicating the material and thickness of the filters 51 and 19 (a filter included in a camera used to capture an image of a target object or a filter included in a source) disposed between the X-ray irradiator 50 and the X-ray detection camera 10, the distance (FDD) between the X-ray irradiator 50 and the X-ray detection camera 10, the type of window material of the X-ray detection camera 10, and the material and thickness of the scintillator 11 of the X-ray detection camera 10, all or some of X-ray detection camera information (for example, a gain setting value, a circuit noise value, an amount of saturated charge, a conversion coefficient value (number of electrons/count), and the line rate (Hz) or line speed (m/min) of the camera), information on the target object, and the like. The input unit 201C may accept an input of the condition information as a direct input of information such as numerical values, or may accept the input as a selective input for information such as numerical values which are set in an internal memory in advance. The input unit 201C accepts the input of the above condition information from a user, but it may acquire some condition information (such as a tube voltage) in accordance with the detection result of the state of control performed by the control device 20C.

The calculation unit 202C calculates the value of the average energy of X-rays (radiation) that pass through the target object F using the image acquiring device 1 and are detected by the X-ray detection camera 10 on the basis of the condition information accepted by the input unit 201C. For example, the calculation unit 202C calculates an X-ray spectrum detected by the X-ray detection camera 10 using, for example, a known approximate expression of Tucker or the like on the basis of information such as a tube voltage, a target angle, a target material, the material and thickness of a filter and its presence or absence, the type of a window material and its presence or absence, and the material and thickness of the scintillator 11 of the X-ray detection camera 10 which are included in the condition information. The calculation unit 202C further calculates a spectral intensity integration value and a photon number integration value from the spectrum of the X-rays, and calculates the value of the average energy of the X-rays by dividing the spectral intensity integration value by the photon number integration value.

A calculation method using a known approximate expression of Tucker will be described. For example, in a case where the target is specified as tungsten and the target angle is specified as 25°, the calculation unit 202C can determine Em: kinetic energy during electron target collision, T: electron kinetic energy in the target, A: proportionality constant determined by the atomic number of the target substance, ρ: the density of the target, μ(E): the linear attenuation coefficient of the target substance, B: the function of Z and T that changes gently, C: Thomson-Whiddington constant, θ: target angle, and c: the speed of light in vacuum. Further, the calculation unit 202C can calculate an irradiation X-ray spectrum by calculating Expression (1) described above on the basis of these values.

Next, the calculation unit 202C can calculate the X-ray energy spectrum that passes through the filter and the target object F and is absorbed by the scintillator by using the X-ray attenuation expression of Expression (2) described above. The X-ray photon number spectrum can be obtained by dividing this X-ray energy spectrum by energy of each X-ray. The calculation unit 202C calculates the average energy of X-rays using Expression (3) described above by dividing the integration value of energy intensity by the integration value of the number of photons. The calculation unit 202C calculates the average energy of X-rays through the above calculation process. Meanwhile, for the calculation of the X-ray spectrum, a known approximate expression of Kramers or Birch et al. may be used.

The narrowing unit 203C narrows down candidates for the trained model from the plurality of trained models 206C constructed in advance on the basis of the value of the average energy calculated by the calculation unit 202C. That is, the narrowing unit 203C compares the calculated average energy value with the value of the X-ray average energy in the image data used to construct the plurality of trained models 206C, and narrows down a plurality of trained models 206C constructed by image data having similar average energy values as candidates. More specifically, in a case where the average energy value calculated by the calculation unit 202C is 53 keV, the narrowing unit 203C uses trained models 206C constructed by image data having average energy values of 40 keV, 50 keV, and 60 keV whose difference from the value is less than a predetermined threshold (for example, 15 keV) as candidates for the trained model.

The selection unit 204C selects trained models 206C to be finally used for a noise removal process of the X-ray transmission image of the target object F from the candidates narrowed down by the narrowing unit 203C. Specifically, the selection unit 204C acquires an X-ray transmission image captured by radiating X-rays to a jig in the image acquiring device 1, and selects trained models 206C to be finally used on the basis of the image characteristics of the X-ray transmission image. In this case, the selection unit 204C analyzes energy characteristics, noise characteristics, resolution characteristics, or the like as the image characteristics of the X-ray transmission image, and selects trained models 206C on the basis of the analysis result.

More specifically, the selection unit 204C acquires an X-ray transmission image for a flat plate-like member as a jig whose thickness and material are known and whose relationship between the average energy of X-rays and the transmittance of X-rays is known, compares the luminance of the X-ray image passing through the jig with the luminance of the X-ray image passing through the air, and calculates the transmittance of X-rays at one point (or the average of a plurality of points) in the jig. For example, in a case where the luminance of the X-ray image passing through the jig is 5,550 and the luminance of the X-ray image passing through the air is 15,000, the transmittance is calculated to be 37%. The selection unit 204C then specifies the average energy (for example, 50 keV) of transmitted X-rays estimated from the transmittance of 37% as the energy characteristics of the X-ray transmission image of the jig. The selection unit 204C selects one trained model 206C constructed by image data of average energy closest to the specified average energy value.

Figure 27:
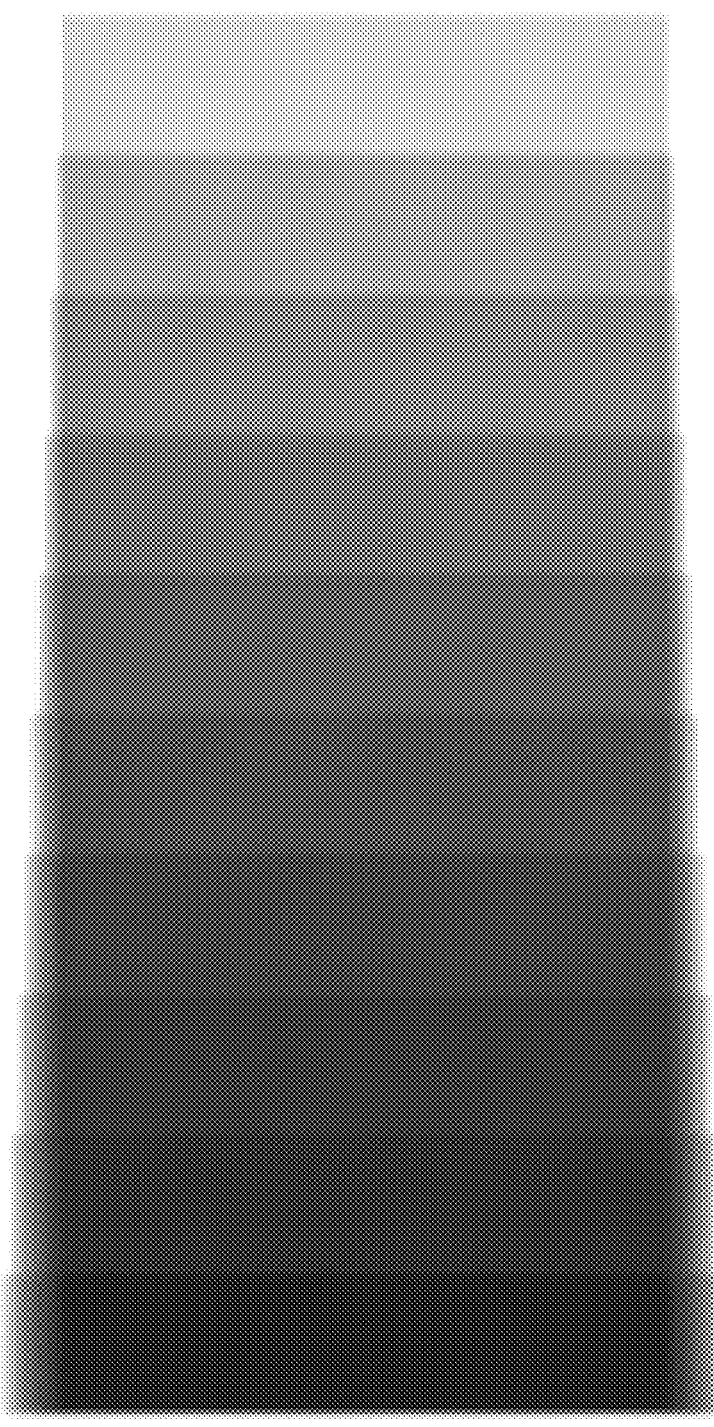
FIG. 27 is a diagram illustrating an example of an X-ray transmission image to be analyzed by a selection unit 204C of FIG. 25.
Figure 28:
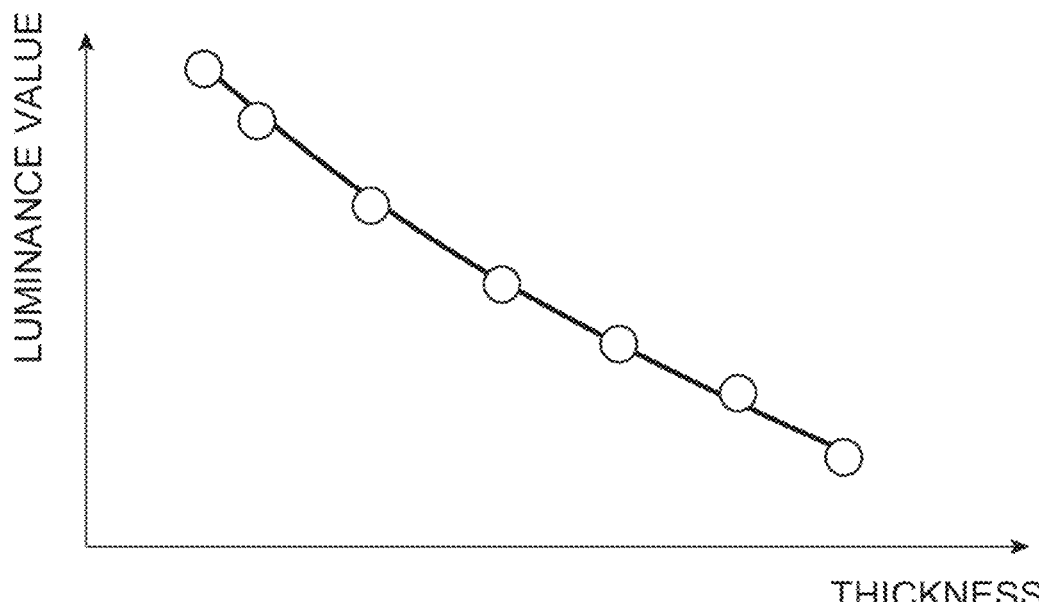
FIG. 28 is a diagram illustrating an example of a characteristic graph of thickness and luminance acquired by the selection unit 204C FIG. 25.

In addition, the selection unit 204C may analyze the characteristics at a plurality of points of the jig whose thickness or material changes as the energy characteristics of the X-ray transmission image of the jig. FIG. 27 is a diagram illustrating an example of an X-ray transmission image to be analyzed by the selection unit 204C. FIG. 27 is an X-ray transmission image for a jig having a shape in which the thickness changes stepwise. The selection unit 204C selects a plurality of measurement regions (regions of interest (ROI)) having different thicknesses from such an X-ray transmission image, analyzes the luminance average value for each of the plurality of measurement regions, and acquires a characteristic graph of thickness and luminance as energy characteristics. FIG. 28 shows an example of a characteristic graph of thickness and luminance acquired by the selection unit 204C.

Further, the selection unit 204C similarly acquires a characteristic graph of thickness and luminance for the image data used to construct the trained model 206C narrowed down by the narrowing unit 203C, and selects trained models 206C constructed by image data having characteristics closest to the characteristic graph acquired for the jig as final trained models 206C. However, the image characteristics of the image data used to construct the trained models 206C may refer to those calculated in advance outside the control device 20C. By setting a plurality of measurement regions in this way, it is possible to select the best trained model for noise removal of the X-ray transmission image of the target object F. Particularly, it is possible to accurately estimate a difference in the X-ray spectrum or a difference in the effect of the filter during measurement of the X-ray transmission image.

Figure 29:
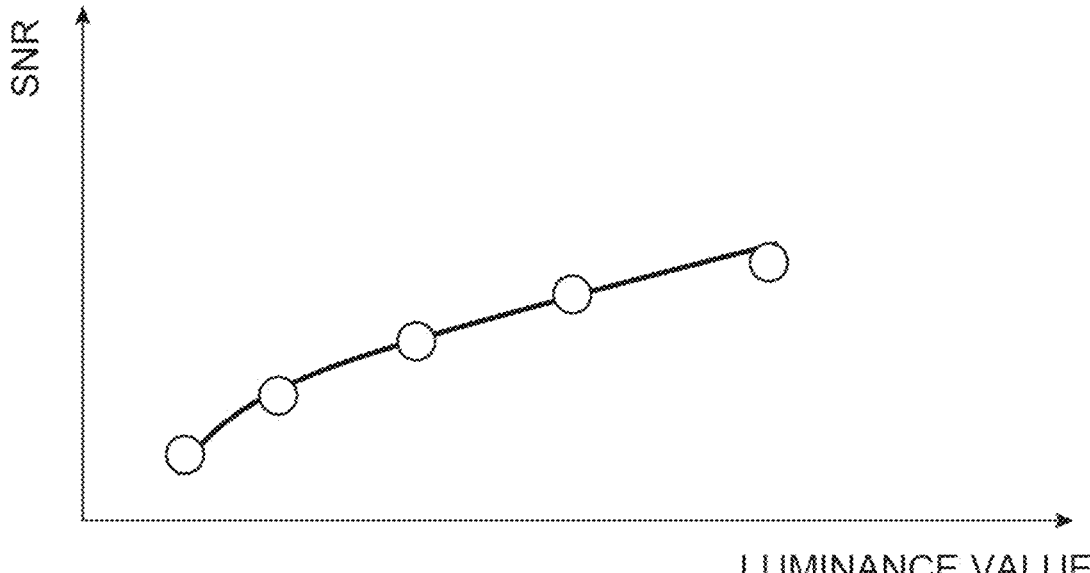
FIG. 29 is a diagram illustrating an example of a characteristic graph of luminance and SNR acquired by the selection unit 204C of FIG. 25.

In addition, the selection unit 204C can also analyze the luminance value and noise for each of the plurality of measurement regions as the noise characteristics of the X-ray transmission image of the jig, and acquire a characteristic graph of a luminance to noise ratio as the noise characteristics. That is, the selection unit 204C selects a plurality of measurement regions ROI having different thicknesses or materials from the X-ray transmission image, analyzes the standard deviation of the luminance values of the plurality of measurement regions ROI and the average value of the luminance values thereof, and acquires a characteristic graph of luminance and a SN ratio (SNR) as the noise characteristics. In this case, the selection unit 204C calculates the SNR for each measurement region ROI using SNR=(average value of luminance values)÷(standard deviation of luminance values). FIG. 29 shows an example of a characteristic graph of luminance and SNR acquired by the selection unit 204C. The selection unit 204C then selects trained model 206C constructed by image data having the noise characteristics closest to the acquired characteristic graph as final trained model 206C.

Here, the selection unit 204C may acquire a characteristic graph in which the vertical axis is noise calculated from the standard deviation of the luminance values, as the noise characteristics, instead of the above characteristic graph of luminance and SNR. By using such a characteristic graph of luminance and noise, it is possible to specify a dominant noise factor (such as shot noise or readout noise) from the slope of the graph in the region of each signal amount with respect to each signal amount detected by the X-ray detection camera 10, and to select trained models 206C on the basis of the specified result.

Figure 30:
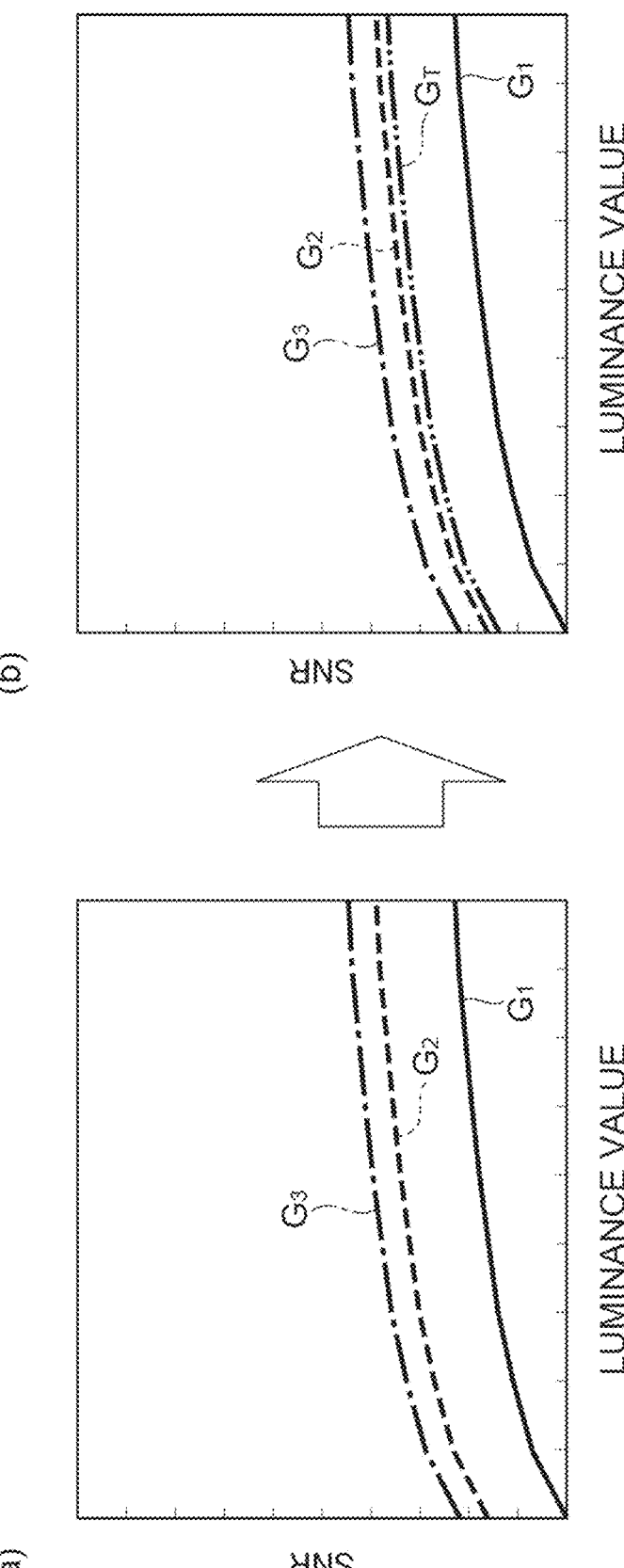
FIG. 30 is a diagram illustrating a function of selection of a trained model based on image characteristics which is performed by the selection unit 204C of FIG. 25.

FIG. 30 is a diagram illustrating a function of selection of a trained model based on image characteristics which is performed by the selection unit 204C. In FIG. 30, the part (a) shows characteristic graphs $G_1$, $G_2$, and $G_3$ of luminance and SNR of image data used to construct the plurality of trained models 206C, and the part (b) shows a characteristic graph $G_T$ of luminance and SNR of the X-ray transmission image obtained by capturing an image of the jig in addition to these characteristic graphs $G_1$, $G_2$, and $G_3$. In a case where such characteristic graphs $G_1$, $G_2$, $G_3$, and $G_T$ are targeted, the selection unit 204C functions so as to select trained models 206C constructed by image data of the characteristic graph $G_2$ closest to the characteristics of the characteristic graph $G_T$. At the time of selection, the selection unit 204C calculates an SNR error for each luminance value at regular intervals between each of the characteristic graphs $G_1$, $G_2$, and $G_3$ and the characteristic graph $G_T$, calculates the root mean squared error (RMSE) of these errors, and selects trained models 206C corresponding to the characteristic graphs $G_1$, $G_2$, and $G_3$ having the smallest root mean squared error. In addition, even in a case where the selection is performed using the energy characteristics, the selection unit 204C can select trained models 206C in the same way.

The selection unit 204C can also select trained model 206C on the basis of the characteristics of an image after a plurality of trained models are applied to the X-ray transmission image of the jig and the noise removal process is executed.

Figure 31:
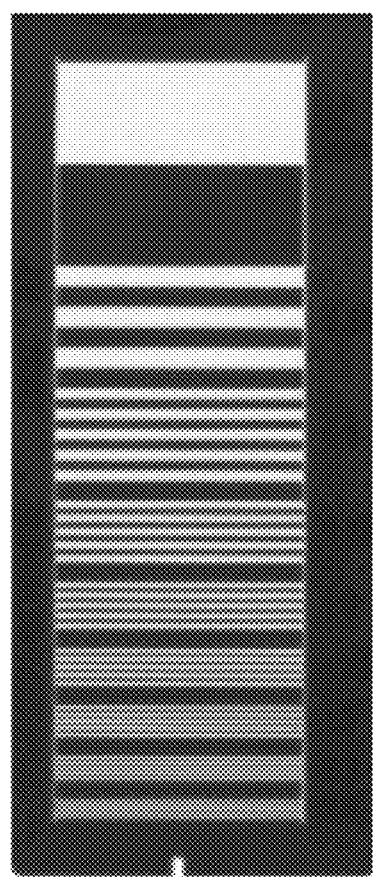
FIG. 31 is a diagram illustrating an example of an X-ray transmission image used for the evaluation of resolution which is performed by the selection unit 204C of FIG. 25.

For example, the selection unit 204C uses the X-ray transmission image obtained by capturing an image of the jig having charts of various resolutions to apply a plurality of trained models 206C to the image and evaluate the resulting image after noise removal. The selection unit 204C then selects trained model 206C used for an image having the smallest change in resolution before and after the noise removal process. FIG. 31 shows an example of an X-ray transmission image used for the evaluation of resolution. In this X-ray transmission image, a chart whose resolution changes stepwise in one direction is used as an imaging target. The resolution of the X-ray transmission image can be measured using a modulation transfer function (MTF) or a contrast transfer function (CTF).

Figure 32:
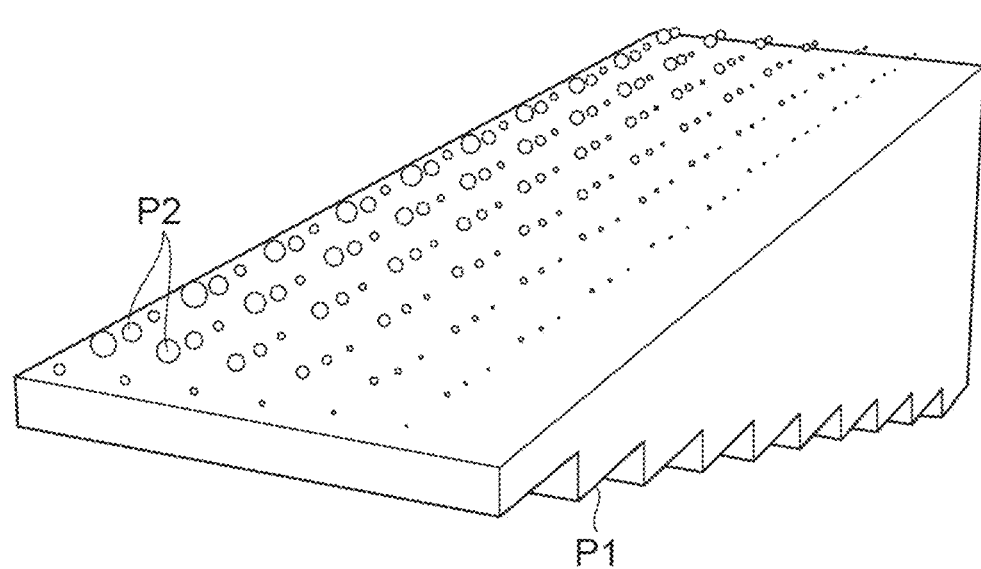
FIG. 32 is a perspective view illustrating an example of a structure of a jig used for the evaluation of a luminance to noise ratio which is performed by the selection unit 204C of FIG. 25.
Figure 33:
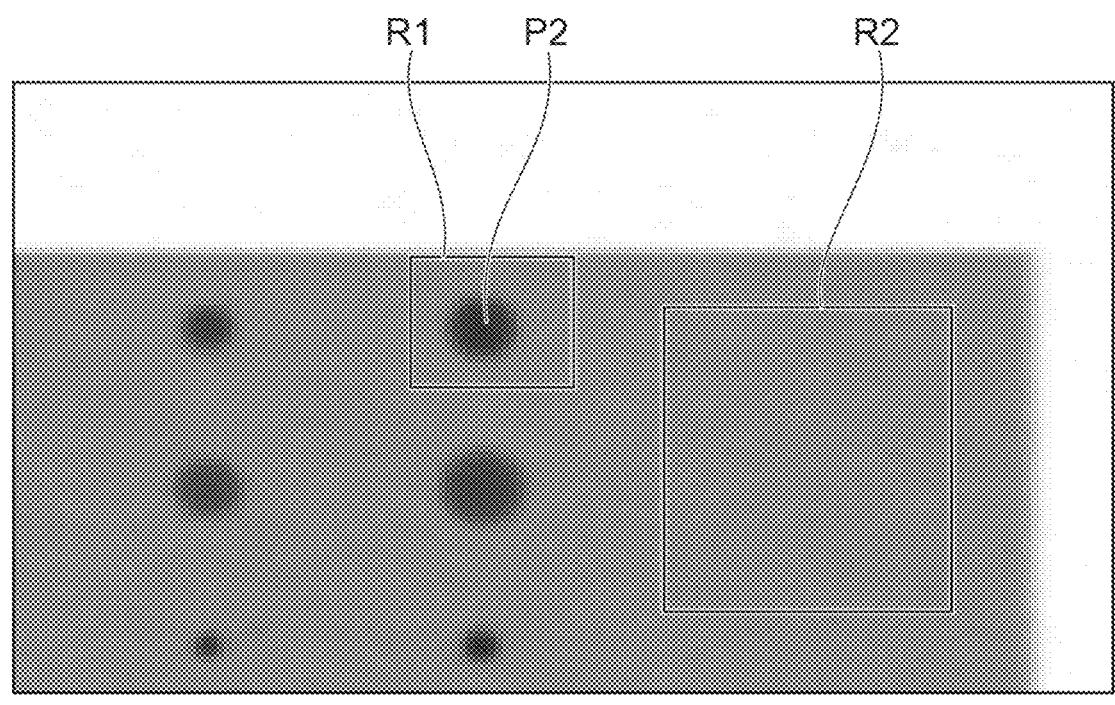
FIG. 33 is a diagram illustrating an X-ray transmission image after a noise removal process obtained for the jig of FIG. 32.

In addition to the evaluation of the above change in resolution, the selection unit 204C may evaluate the characteristics of the luminance to noise ratio of the image after noise removal and select trained model 206C used to generate an image having the highest characteristics. FIG. 32 shows an example of the structure of the jig used for the evaluation of the luminance to noise ratio. For example, as the jig, a jig in which foreign substances P2 having various materials and various sizes are scattered in a member P1 whose thickness changes stepwise in one direction can be used. FIG. 33 shows an X-ray transmission image obtained for the jig of FIG. 32 after the noise removal process. The selection unit 204C selects an image region R1 containing an image of the foreign substance P2 in the X-ray transmission image and an image region R2 not containing an image of the foreign substance P2 in the vicinity of the region R1, and calculates the minimum value $L_{MIN}$ of luminance in the image region R1, the average value $L_{AVE}$ of luminance in the image region R2, and the standard deviation $L_{SD}$ of luminance in the image region R2. The selection unit 204C calculates the luminance to noise ratio CNR using the following expression.

$$CNR = (L_{AVE} - L_{MIN})/L_{SD}$$

Further, the selection unit 204C calculates the luminance to noise ratio CNR for each of the X-ray transmission images after the application of the plurality of trained models 206C, and selects trained models 206C used to generate an X-ray transmission image having the highest luminance to noise ratio CNR.

Alternatively, the selection unit 204C may perform the calculation using the following expression on the basis of the average value $L_{AVE\_R1}$ of luminance in the image region R1, the average value $L_{AVE\_R2}$ of luminance in the image region R2, and the standard deviation $L_{SD}$ of luminance in the image region R2.

$$CNR = (L_{AVE\_R1} - L_{MIN\_R2})/L_{SD}$$

The processing unit 205C applies the trained models 206C selected by the selection unit 204C to the X-ray transmission image acquired for the target object F, and generates an output image by executing image processing for removing noise. The processing unit 205C then outputs the generated output image to the display device 30 or the like.

Figure 34:
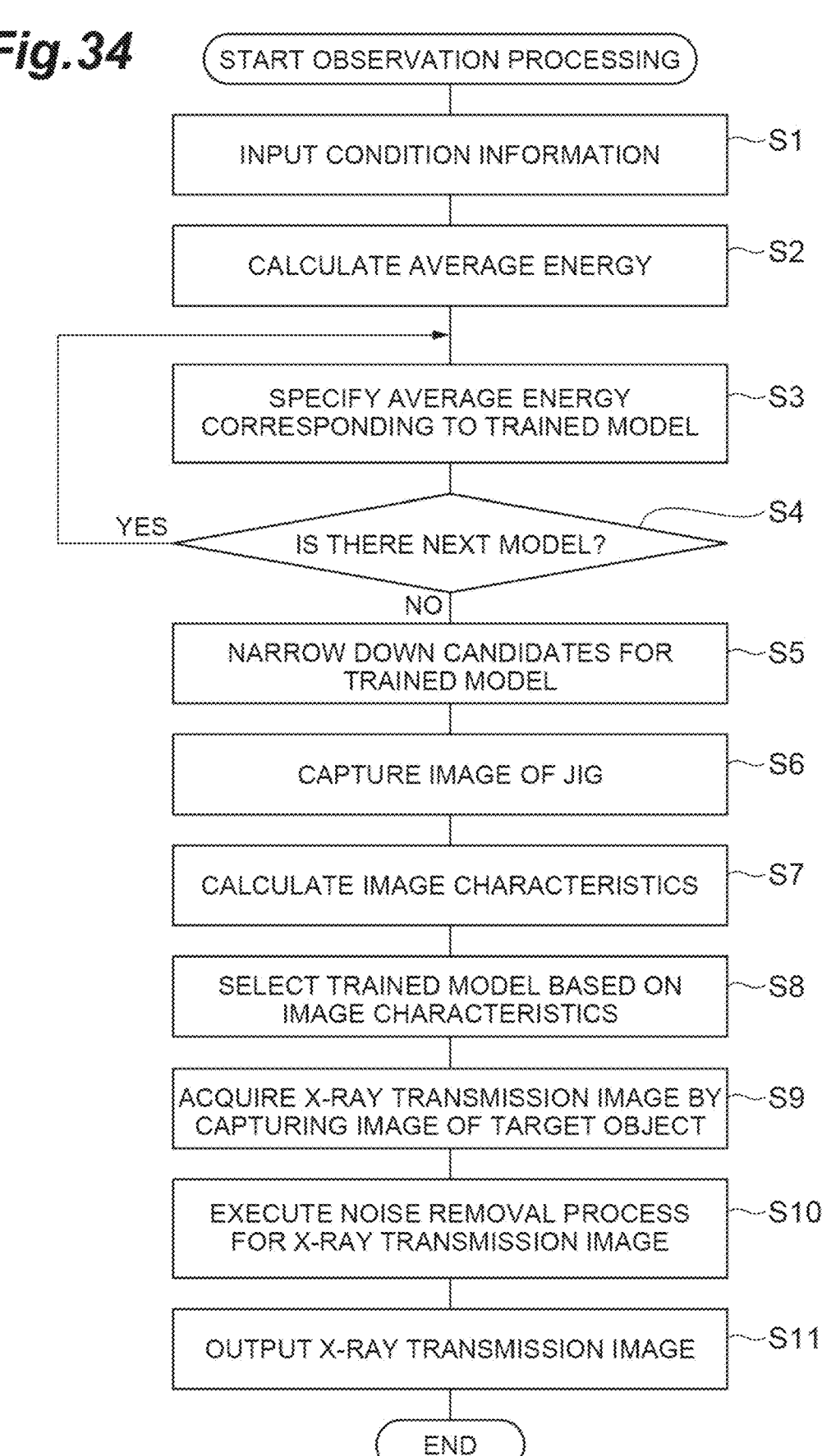
FIG. 34 is a flowchart illustrating a procedure of observation processing using an image acquiring device 1 according to the second embodiment.

Next, a procedure of observing an X-ray transmission image of the target object F using the image acquiring device 1 according to the second embodiment, that is, a flow of a radiographic image acquisition method according to the second embodiment, will be described. FIG. 34 is a flowchart illustrating a procedure of observation processing using the image acquiring device 1.

First, the control device 20C accepts an input of condition information indicating the operating conditions of the X-ray irradiator 50, the imaging conditions of the X-ray detection camera 10, or the like from an operator (user) of the image acquiring device 1 (step S1). Next, the control device 20C calculates the value of the average energy of the X-rays detected by the X-ray detection camera 10 on the basis of the condition information (step S2).

Further, the control device 20C specifies the value of the average energy of the X-rays in the image data used to construct the trained models 206C stored in the control device 20C (step S3). Thereafter, the specification of the average energy value of the X-rays is repeated for all the trained models 206C stored in the control device 20C (step S4).

Next, the control device 20C compares the calculated average energy values of the X-rays to thereby narrow down candidates for a plurality of trained models 206C (step S5). Further, in the image acquiring device 1, a jig is set to capture an image of the jig, and thus an X-ray transmission image of the jig is acquired (step S6).

Thereafter, the control device 20C acquires the image characteristics of the X-ray transmission image of the jig (such as the average energy value of the X-rays, the characteristics of thickness and luminance, the characteristics of the luminance to noise ratio, the characteristics of luminance and noise, and the characteristics of change in resolution) (step S7). The control device 20C then selects final trained model 206C on the basis of the acquired image characteristics (step S8).

Further, in the image acquiring device 1, the target object F is set to capture an image of the target object F, and thus an X-ray transmission image of the target object F is acquired (step S9). Next, the control device 20C applies the finally selected trained model 206C to the X-ray transmission image of the target object F, and thus the noise removal process is executed for the X-ray transmission image (step S10). Finally, the control device 20C outputs an output image which is an X-ray transmission image that has undergone the noise removal process to the display device 30 (step S11).

With the image acquiring device 1 described above, it is also possible to remove noise components while increasing signal components in the X-ray transmission image, and to effectively improve an S/N ratio in the X-ray transmission image. In addition, the average energy of the X-rays passing through the target object F is calculated on the basis of the operating conditions of the source of the X-rays or the imaging conditions of the X-ray transmission image when the X-ray transmission image of the target object F is acquired. Candidates for the trained model 206C used for noise removal are narrowed down from the trained models 206C constructed in advance on the basis of the average energy. Thereby, the trained model 206C corresponding to the average energy of the X-rays which are a target for imaging is used for noise removal, and thus it is possible to realize noise removal corresponding to the relationship between luminance and noise in the X-ray transmission image. As a result, it is possible to effectively remove noise from the X-ray transmission image, and to improve, for example, foreign substance detection performance. Particularly, the mode of noise of the X-ray transmission image changes depending on differences in a tube voltage, a filter, a scintillator, conditions of an X-ray detection camera (a gain setting value, a circuit noise value, an amount of saturated charge, a conversion coefficient value (e−/count), and the line rate of the camera), a target object, and the like. For this reason, in a case where noise removal is attempted to be realized through machine learning, it is necessary to prepare a plurality of learning models trained under various conditions. In the related art, it has not been realized to select a learning model suitable for the mode of noise from a plurality of learning models in accordance with conditions during measurement of an X-ray transmission image. According to the present embodiment, the trained model 206C corresponding to the average energy of the X-rays which are a target for imaging is selected, and thus the selection of a learning model that always matches the mode of noise is realized.

Generally, an X-ray transmission image contains noise derived from the generation of X-rays. It is also conceivable to increase the X-ray dose in order to improve the SN ratio of the X-ray transmission image. However, in that case, there is a problem in that increasing the X-ray dose increases the exposure of a sensor, shortens the life of the sensor, and shortens the life of the X-ray source, and thus it is difficult to achieve both an improvement in the SN ratio and an increase in life. In the present embodiment, it is not necessary to increase the X-ray dose, and thus it is possible to achieve both an improvement in the SN ratio and an increase in life.

In addition, the control device 20C of the present embodiment has a function of executing image processing for removing noise from the X-ray transmission image of the target object F using the selected trained model 206C. With such a function, it is possible to realize noise removal corresponding to the relationship between luminance and noise in the X-ray transmission image, and to effectively remove the noise from the X-ray transmission image.

In addition, the control device 20C of the present embodiment has a function of narrowing down candidates for the trained model by comparing the average energy value of the X-rays calculated from selection information with the average energy value specified from the image data used to construct the trained model 206C. With such a function, it is possible to reliably realize noise removal corresponding to the relationship between luminance and noise in the X-ray transmission image.

Further, the control device 20C of the present embodiment has a function of selecting the trained model 206C from the candidates on the basis of the image characteristics of the X-ray transmission image of the jig. With such a function, it is possible to select the best trained model 206C for noise removal of the X-ray transmission image of the target object F. As a result, it is possible to more reliably realize noise removal corresponding to the relationship between luminance and noise in the X-ray transmission image.

Modification Example of Second Embodiment

The control device 20C of the second embodiment has selected candidates for the trained model 206C on the basis of the average energy value of the X-rays calculated from the condition information, but it may have a function corresponding to a degradation in performance of the X-ray detection camera 10 and a fluctuation in output of the X-ray irradiator 50 or a degradation in performance thereof.

Figure 35:
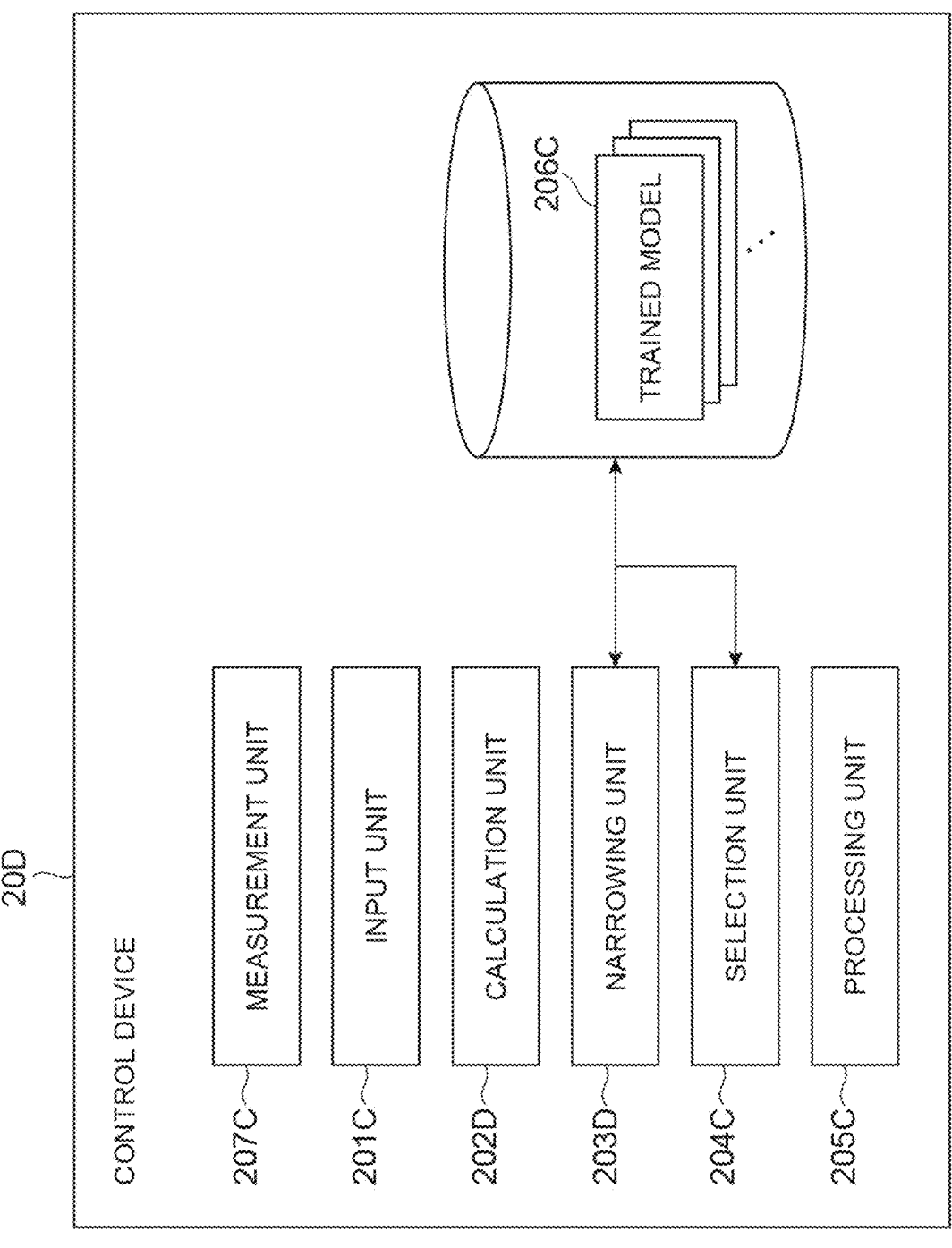
FIG. 35 is a block diagram illustrating a functional configuration of a control device 20D according to a modification example of the second embodiment.

FIG. 35 is a block diagram illustrating a functional configuration of a control device 20D according to a modification example of the second embodiment. The control device 20D is different from the control device 20C according to the second embodiment in that it has a measurement unit 207C and has different functions of a calculation unit 202D and a narrowing unit 203D.

The control device 20C has no degradation in performance of the X-ray detection camera 10 and no fluctuation in output of the X-ray irradiator 50 or no degradation in performance thereof, and narrows down the trained models 206C on the premise that the relationship between luminance and noise in the X-ray transmission image can be estimated from the average energy of the X-rays. On the other hand, the control device 20D according to the present modification example has a function of calculating an X-ray conversion coefficient in consideration of a degradation in performance of the X-ray detection camera 10 and a fluctuation in output of the X-ray irradiator 50 or a degradation in performance thereof, and narrowing down the trained models 206C on the basis of the X-ray conversion coefficient. The X-ray conversion coefficient is a parameter indicating the efficiency until the X-rays are converted into visible light by a scintillator and then converted into electrons (electrical signal) by a camera sensor.

Generally, when the average energy of the X-rays is E [keV], the light emission amount of the scintillator is EM [photon/keV], the coupling efficiency in the sensor is C, and the quantum efficiency of the sensor is QE, the X-ray conversion coefficient $F_T$ can be calculated using the following expression.

$$F_T = E \times EM \times C \times QE$$

In addition, the SN ratio (SNR) in the X-ray transmission image is obtained from the following expression using the X-ray conversion coefficient $F_T$, the X-ray photon number $N_P$, and the readout noise Nr of the camera.

$$SNR = F_T N_P / \{(F_T N_P + Nr^2)^{1/2}\}$$

Thus, the relationship between luminance and noise in the X-ray transmission image after considering a degradation in performance of the camera can be estimated on the basis of the X-ray conversion coefficient $F_T$.

The measurement unit 207C of the control device 20D has a function of measuring the amount of decrease in the light emission amount EM as a degradation in performance of the scintillators 11, the amount of decrease in the quantum efficiency QE of the sensor as a degradation in performance of the scan camera 12, and the amount of change in the average energy E as a fluctuation in output of the X-ray irradiator 50 and a degradation in performance thereof. For example, the measurement unit 207C measures the amount of decrease in the light emission amount between a state where there is no degradation in performance of the scintillator 11 (state when new) and the current scintillators 11, and estimates the current light emission amount EM from the amount of decrease. In addition, the measurement unit 207C measures the amount of decrease in luminance between a state where there is no degradation in performance of the scan camera 12 (state when new) and the current scan camera 12, and estimates the current quantum efficiency QE from the amount of decrease. In addition, the measurement unit 207C estimates the current average energy E from the amount of change in the average energy between a state where there is no degradation in performance of the X-ray irradiator 50 (state when new) and the current X-ray irradiator 50. The average energy E may be obtained from imaging data of a flat plate-like member whose thickness and material are known and in which a relationship between the average energy of the X-rays and the transmittance of the X-rays is known, may be obtained from imaging data at a plurality of points of the jig whose thickness or material changes, or the like.

The calculation unit 202D of the control device 20D calculates the X-ray conversion coefficient $F_T$ using the calculated average energy E of the X-rays and the light emission amount EM and quantum efficiency QE estimated by the measurement unit 207C. The narrowing unit 203D of the control device 20D has a function of narrowing down candidates for the trained model 206C by comparing the calculated X-ray conversion coefficient $F_T$ with the X-ray conversion coefficient $F_T$ in the image data used to construct the trained model 206C.

Figure 36:
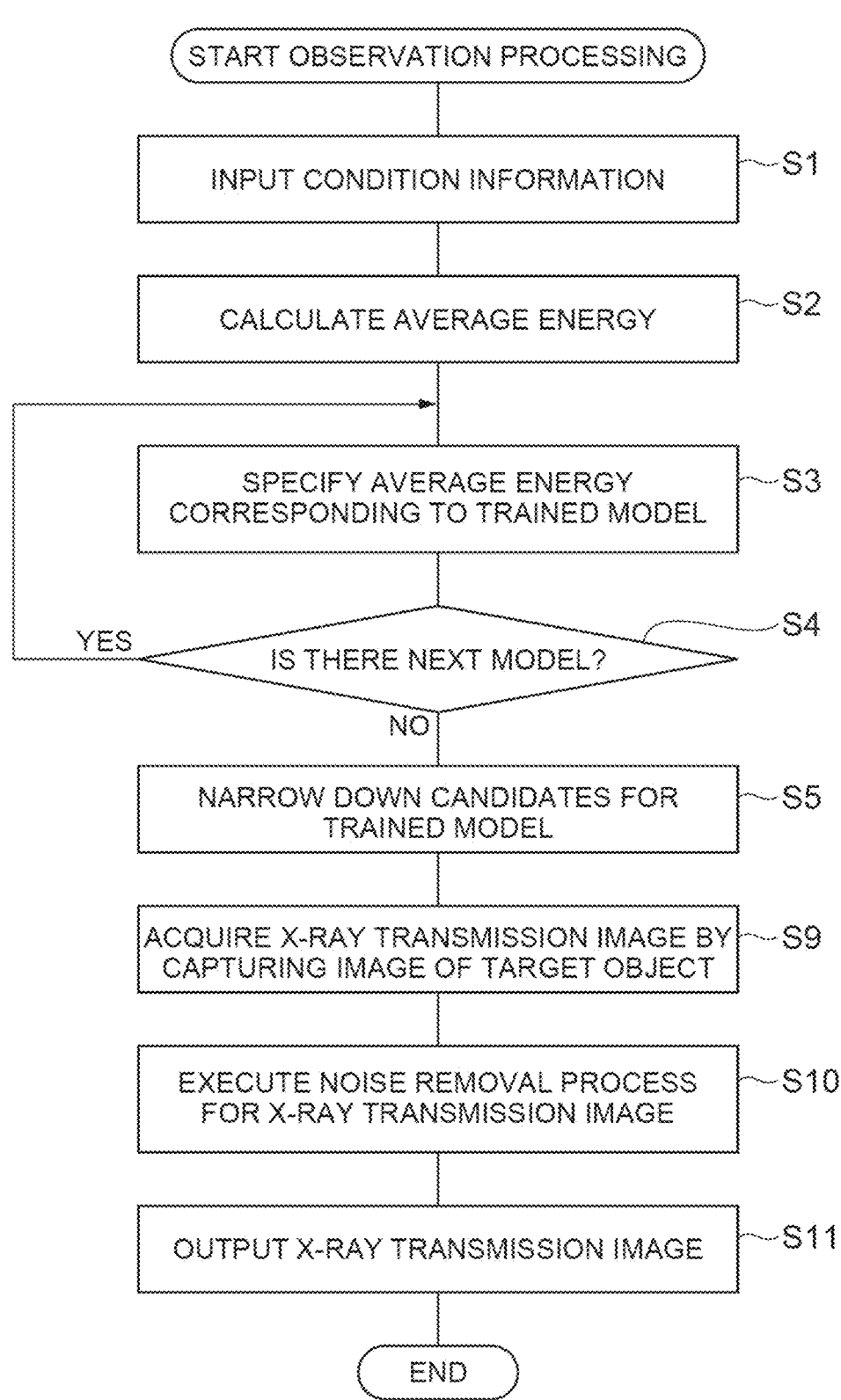
FIG. 36 is a flowchart illustrating a procedure of observation processing using an image acquiring device 1 according to the modification example of the second embodiment.

In addition, the control device 20D of the above modification example narrows down candidates for the trained model and then selects the trained model on the basis of the image characteristics obtained by capturing an image of the jig, but it may execute the noise removal process with respect to the X-ray transmission image of the target object without capturing an image of the jig. FIG. 36 is a flowchart illustrating a procedure of observation processing using the image acquiring device 1 according to another modification example. In this way, it is also possible to omit the processes of steps S6 to S8 in FIG. 34 and to execute the noise removal process using the trained models narrowed down on the basis of the average energy.

Third Embodiment

Figure 37:
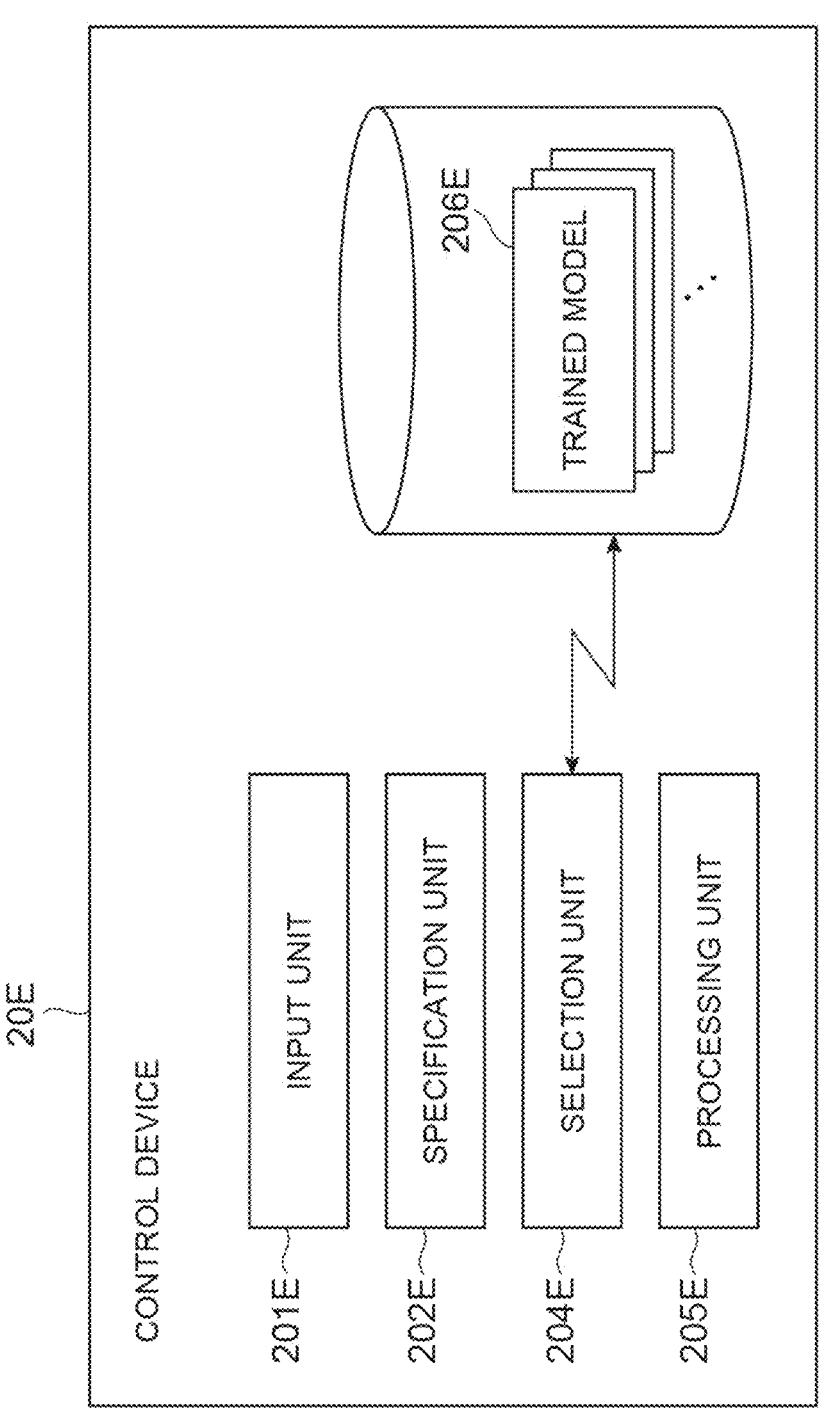
FIG. 37 is a block diagram illustrating a functional configuration of a control device 20E according to a third embodiment.

FIG. 37 is a block diagram illustrating a functional configuration of a control device 20E according to a third embodiment. The control device 20E includes an acquisition unit 201E, a specification unit 202E, a selection unit 204E, and a processing unit 205E.

In addition, a plurality of trained models 206E for executing the noise removal process for an X-ray transmission image are stored in advance in the control device 20E. Each of the plurality of trained models 206E is a learning model based on machine learning constructed in advance using image data as training data. Examples of machine learning include supervised learning, deep learning, reinforcement learning, neural network learning, and the like. In the present embodiment, the two-dimensional convolutional neural network described in the paper "Beyond a Gaussian Denoiser: Residual Learning of Deep CNN for Image Denoising" authored by Kai Zhang et al. is adopted as an example of a deep learning algorithm. The plurality of trained models 206E may be generated by an external computer or the like and downloaded to the control device 20E, or may be generated in the control device 20E.

Figure 38:
FIG. 38 is a diagram illustrating an example of image data which is training data used to construct trained models 206E of FIG. 37.

FIG. 38 shows an example of image data which is training data used to construct trained models 206E. As the training data, an X-ray transmission image having a pattern of various thicknesses, various materials, and various resolutions as an imaging target can be used. The example shown in FIG. 38 is an example of an X-ray transmission image generated for chicken. As the image data, an X-ray transmission image actually generated for a plurality of types of target objects using the image acquiring device 1 may be used, or image data generated by simulation calculation may be used. The X-ray transmission image may be acquired using a device different from the image acquiring device 1. In addition, the X-ray transmission image and the image data generated by simulation calculation may be used in combination. Each of the plurality of trained models 206E is constructed in advance using image data obtained for transmitted X-rays having different average energy and having a known noise distribution. The average energy of X-rays in the image data is set to a different value in advance by setting the operating conditions of the X-ray irradiator (radiation source) 50 of the image acquiring device 1, the imaging conditions of the image acquiring device 1, or the like, or setting the operating conditions or imaging conditions of the X-ray irradiator 50 during simulation calculation. That is, the plurality of trained models 206E are constructed through machine learning using, as training data, a training image which is an X-ray image corresponding to average energy related to X-rays passing through the target object F calculated on the basis of condition information indicating the operating conditions of the X-ray irradiator (radiation source) 50 when the X-ray transmission image of the target object F is captured, the imaging conditions of the X-ray detection camera 10, or the like (construction step). For example, in the present embodiment, each of the plurality of trained models 206E is constructed using multiple frames (for example, 20,000 frames) of a plurality of types of image data in which the average energy is 10 keV, 20 keV, 30 keV, . . . and values in increments of 10 keV are set.

The image data which is training data used to construct the trained model 206E is generated by the same creation procedure as the creation procedure in the first embodiment described above.

Hereinafter, referring back to FIG. 37, the details of the function of each functional unit of the control device 20E will be described.

The acquisition unit 201E acquires an X-ray transmission image captured by radiating X-rays to a jig and the target object F using the image acquiring device 1. As the jig, a flat plate-like member whose thickness and material are known and in which a relationship between the average energy of X-rays and the transmittance of X-rays is known, or a jig having a chart whose image is captured at various resolutions is used. That is, the acquisition unit 201E acquires an X-ray transmission image of the jig captured by using the image acquiring device 1 in advance of the observation processing of the target object F. The acquisition unit 201E acquires an X-ray transmission image of the target object F captured by using the image acquiring device 1 at a timing after the trained model 206E is selected on the basis of the X-ray transmission image of the jig. However, the acquisition timings of the X-ray transmission images of the jig and the target object F are not limited to the above, and may be simultaneous or reverse timings.

The specification unit 202E specifies the image characteristics of the X-ray transmission image of the jig acquired by the acquisition unit 201E. Specifically, the selection unit 204E specifies energy characteristics, noise characteristics, resolution characteristics, frequency characteristics, or the like as the image characteristics of the X-ray transmission image.

For example, in a case where a flat plate-like member whose thickness and material are known is used as a jig, the specification unit 202E compares the luminance of the X-ray image passing through the jig with the luminance of the X-ray image passing through the air, and calculates the transmittance of X-rays at one point (or the average transmittance of a plurality of points) in the jig. For example, in a case where the luminance of the X-ray image passing through the jig is 5,550 and the luminance of the X-ray image passing through the air is 15,000, the transmittance is calculated to be 37%. The specification unit 202E then specifies the average energy (for example, 50 keV) of transmitted X-rays estimated from the transmittance of 37% as the energy characteristics of the X-ray transmission image of the jig.

Figure 39:
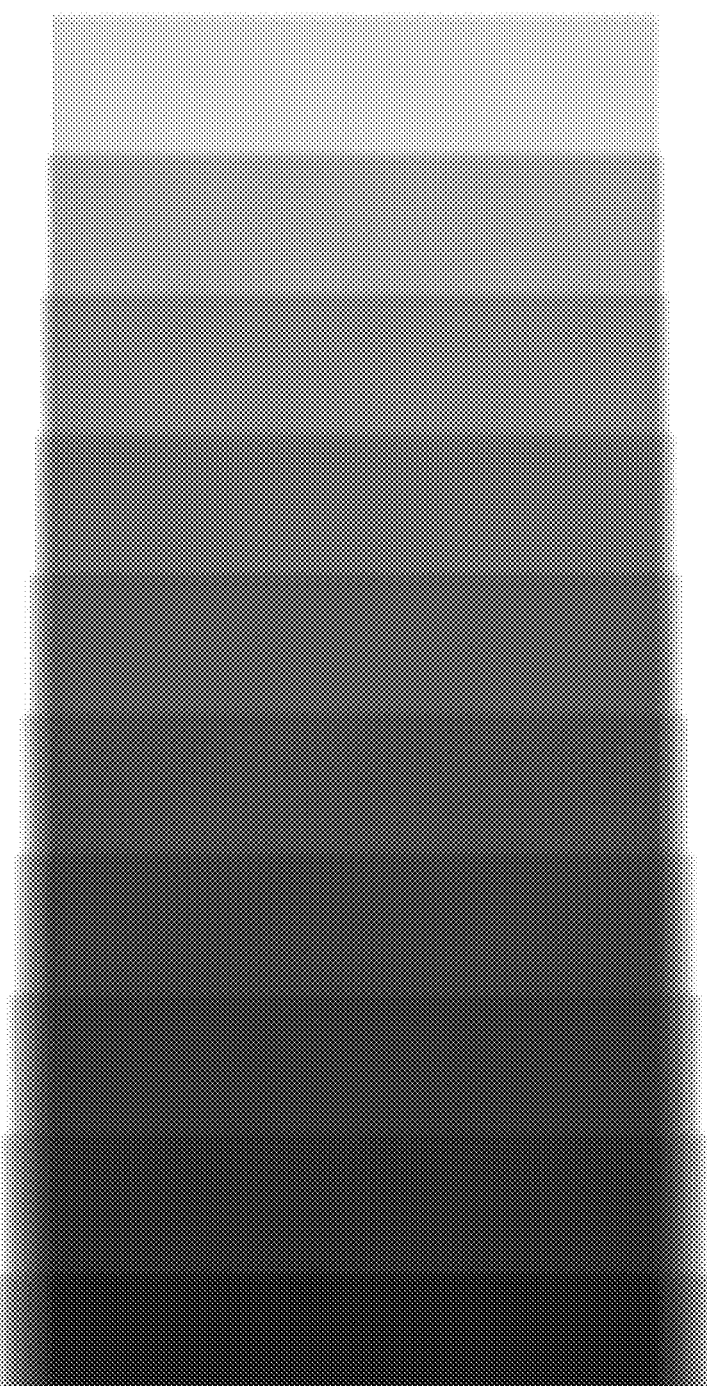
FIG. 39 is a diagram illustrating an example of an X-ray transmission image to be analyzed by a specification unit 202E of FIG. 37.
Figure 40:
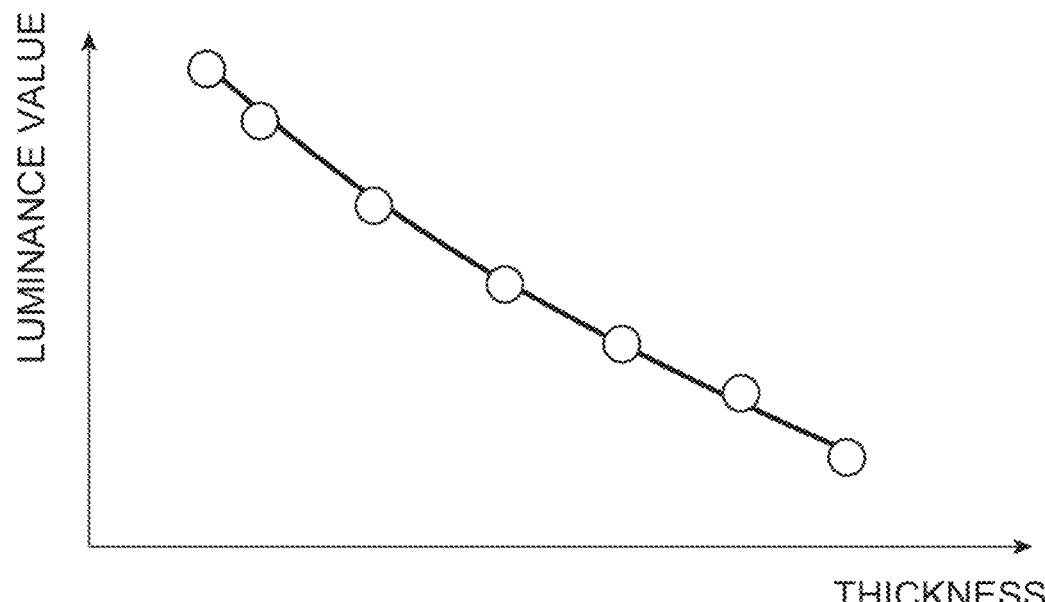
FIG. 40 is a diagram illustrating an example of a characteristic graph of thickness and luminance acquired by the specification unit 202E of FIG. 37.

In addition, the specification unit 202E may analyze the characteristics at a plurality of points of the jig whose thickness or material changes as the energy characteristics of the X-ray transmission image of the jig. FIG. 39 is a diagram illustrating an example of an X-ray transmission image to be analyzed by the specification unit 202E. FIG. 39 is an X-ray transmission image for a jig having a shape in which the thickness changes stepwise. The specification unit 202E selects a plurality of measurement regions (regions of interest (ROI)) having different thicknesses from such an X-ray transmission image, analyzes the luminance average value for each of the plurality of measurement regions, and acquires a characteristic graph of thickness and luminance as energy characteristics. FIG. 40 shows an example of a characteristic graph of thickness and luminance acquired by the specification unit 202E.

Figure 41:
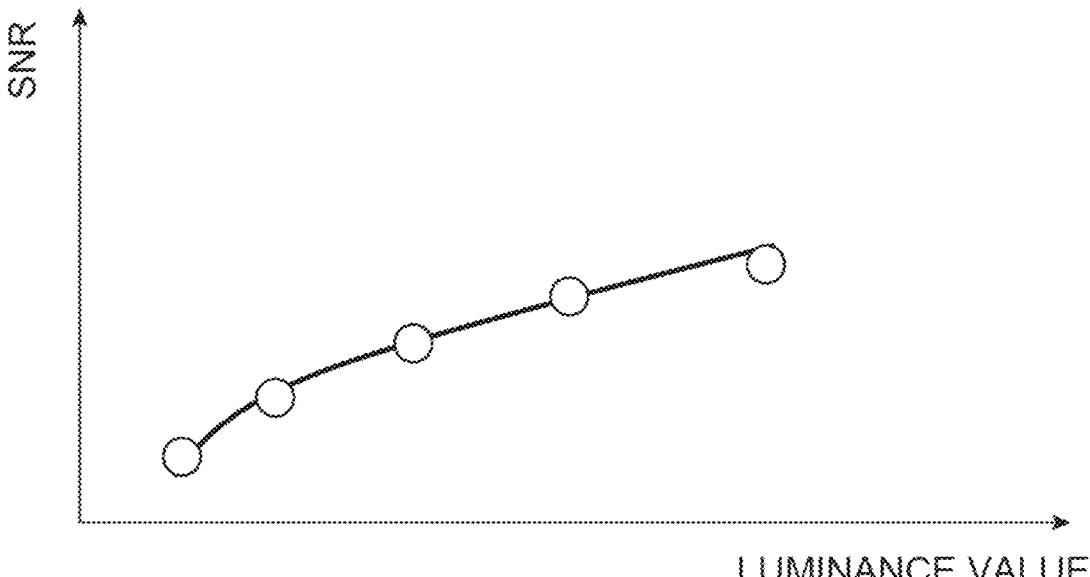
FIG. 41 is a diagram illustrating an example of a characteristic graph of luminance and SNR acquired by the specification unit 202E of FIG. 37.

In addition, the specification unit 202E can also analyze the luminance value and noise for each of the plurality of measurement regions as the noise characteristics of the X-ray transmission image of the jig, and acquire a characteristic graph of a luminance to noise ratio as the noise characteristics. That is, the specification unit 202E selects a plurality of measurement regions ROI having different thicknesses or materials from the X-ray transmission image, analyzes the standard deviation of the luminance values of the plurality of measurement regions ROI and the average value of the luminance values thereof, and acquires a characteristic graph of luminance and a SN ratio (SNR) as the noise characteristics. In this case, the specification unit 202E calculates the SNR for each measurement region ROI using SNR=(average value of luminance values)÷(standard deviation of luminance values). FIG. 41 shows an example of a characteristic graph of luminance and SNR acquired by the specification unit 202E. Here, the specification unit 202E may acquire a characteristic graph in which the vertical axis is noise calculated from the standard deviation of the luminance values, as the noise characteristics, instead of the above characteristic graph of luminance and SNR.

Figure 42:
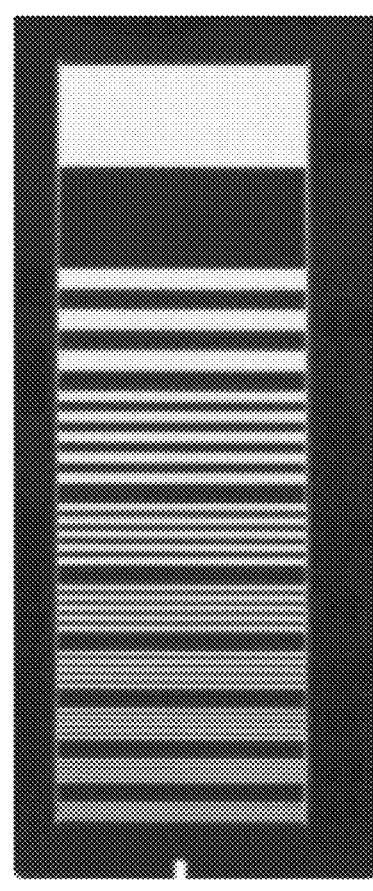
FIG. 42 is a diagram illustrating an example of an X-ray transmission image used for the evaluation of resolution which is performed by the specification unit 202E of FIG. 37.

In addition, in a case where a jig having a chart is used, the specification unit 202E can also acquire the distribution of resolutions in the X-ray transmission image of the jig as the resolution characteristics. Further, the specification unit 202E also has a function of acquiring the resolution characteristics of an image after the noise removal process is performed by applying a plurality of trained models 206E to the X-ray transmission image of the jig. FIG. 42 shows an example of an X-ray transmission image used for the evaluation of resolution. In this X-ray transmission image, a chart whose resolution changes stepwise in one direction is used as an imaging target. The resolution of the X-ray transmission image can be measured using a modulation transfer function (MTF) or a contrast transfer function (CTF).

Referring back to FIG. 37, the selection unit 204E finally selects trained models 206E to be used for the noise removal process of the X-ray transmission image of the target object F from the plurality of trained models 206E stored in the control device 20E on the basis of the image characteristics acquired by the specification unit 202E. That is, the selection unit 204E compares the image characteristics specified by the specification unit 202E with the image characteristics specified from the image data used to construct the plurality of trained models 206E, and selects a trained model 206E in which both are similar to each other.

For example, the selection unit 204E selects one trained model 206E constructed by the image data of average energy closest to the value of the average energy of the transmitted X-rays specified by the specification unit 202E.

In addition, the selection unit 204E acquires a characteristic graph of thickness and luminance for the image data used to construct the plurality of trained models 206E in the same manner as the method of specification performed by the specification unit 202E, and selects trained models 206E constructed by image data having characteristics closest to the characteristic graph of thickness and luminance acquired for the jig as final trained models 206E. However, the image characteristics of the image data used to construct the trained models 206E may be referred to those calculated in advance outside the control device 20E. By using the image characteristics obtained by setting a plurality of measurement regions in this way, it is possible to select the best trained model for noise removal of the X-ray transmission image of the target object F. Particularly, it is possible to accurately estimate a difference in the X-ray spectrum or a difference in the effect of the filter during measurement of the X-ray transmission image.

In addition, the selection unit 204E may select trained models 206E constructed by image data having the characteristics of the luminance to noise ratio closest to the characteristics of the luminance to noise ratio acquired by the specification unit 202E as the final trained models 206E. However, the image characteristics of the image data used to construct the trained models 206E may be acquired by the selection unit 204E from the image data, or may be referred to those calculated in advance outside the control device 20E. Here, the selection unit 204E may select the trained model 206E using the characteristics of luminance and noise, as the noise characteristics, instead of the characteristics of the luminance to noise ratio. By using such characteristics of luminance and noise, it is possible to specify a dominant noise factor (such as shot noise or readout noise) from the slope of the graph in the region of each signal amount with respect to each signal amount detected by the X-ray detection camera 10, and to select trained models 206E on the basis of the result of specification.

Figure 43:
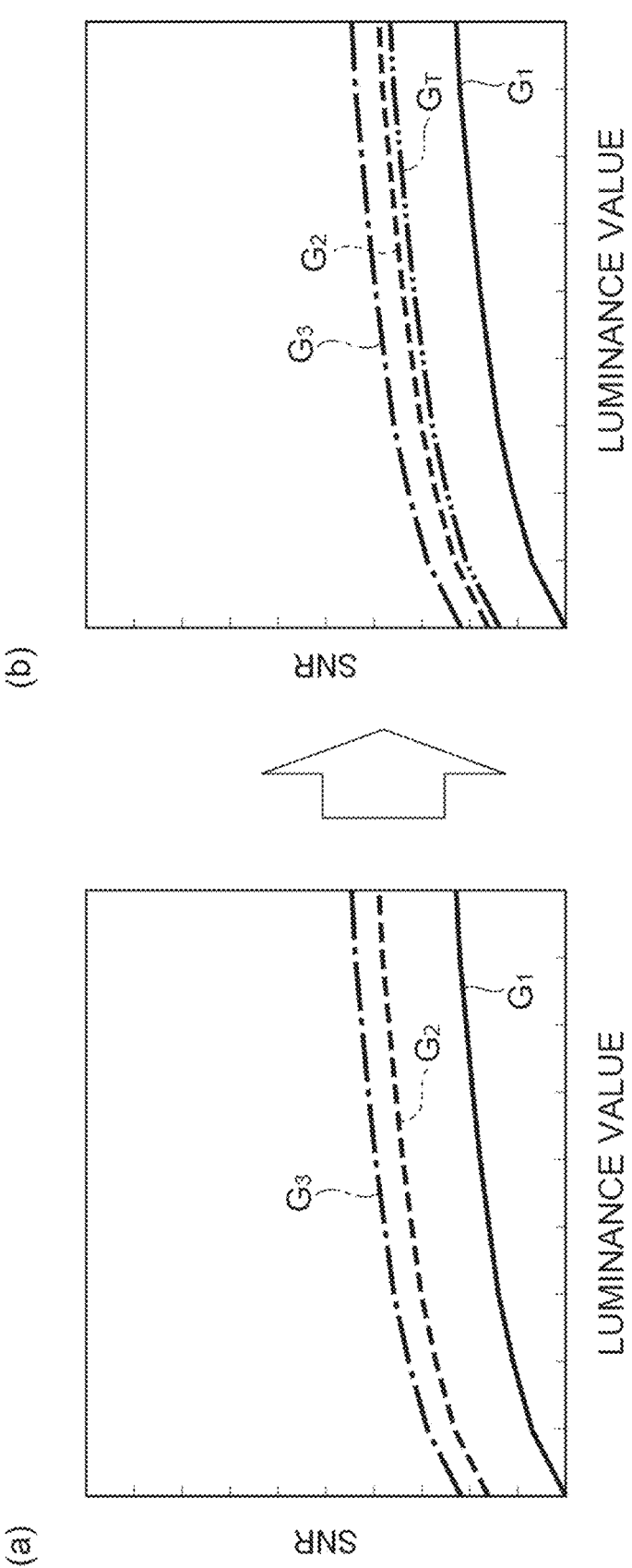
FIG. 43 is a diagram illustrating a function of selection of a trained model based on image characteristics which is performed by the selection unit 204E of FIG. 37.

FIG. 43 is a diagram illustrating a function of selection of a trained model based on image characteristics which is performed by the selection unit 204E. In FIG. 43, the part (a) shows characteristic graphs $G_1$, $G_2$, and $G_3$ of luminance and SNR of image data used to construct the plurality of trained models 206E, and the part (b) shows a characteristic graph $G_T$ of luminance and SNR of the X-ray transmission image obtained by capturing an image of the jig in addition to these characteristic graphs $G_1$, $G_2$, and $G_3$. In a case where such characteristic graphs $G_1$, $G_2$, $G_3$, and $G_T$ are targeted, the selection unit 204E functions so as to select trained models 206E constructed by image data of the characteristic graph $G_2$ closest to the characteristics of the characteristic graph $G_T$. At the time of selection, the selection unit 204E calculates an SNR error for each luminance value at regular intervals between each of the characteristic graphs $G_1$, $G_2$, and $G_3$ and the characteristic graph $G_T$, calculates the root mean squared error (RMSE) of these errors, and selects trained models 206E corresponding to the characteristic graphs $G_1$, $G_2$, and $G_3$ having the smallest root mean squared error. In addition, even in a case where the selection is performed using the energy characteristics, the selection unit 204E can select trained models 206E in the same way.

The selection unit 204E can also select trained models 206E used to generate an image having relatively excellent characteristics on the basis of the characteristics of an image after a plurality of trained models are applied to the X-ray transmission image of the jig and the noise removal process is executed.

For example, the selection unit 204E uses the X-ray transmission image obtained by capturing an image of the jig having charts of various resolutions to apply a plurality of trained models 206E to the image and evaluate the resolution characteristics of the resulting image after noise removal. The selection unit 204E then selects trained model 206E used for an image having the smallest change in the resolution of each distribution before and after the noise removal process.

Figure 44:
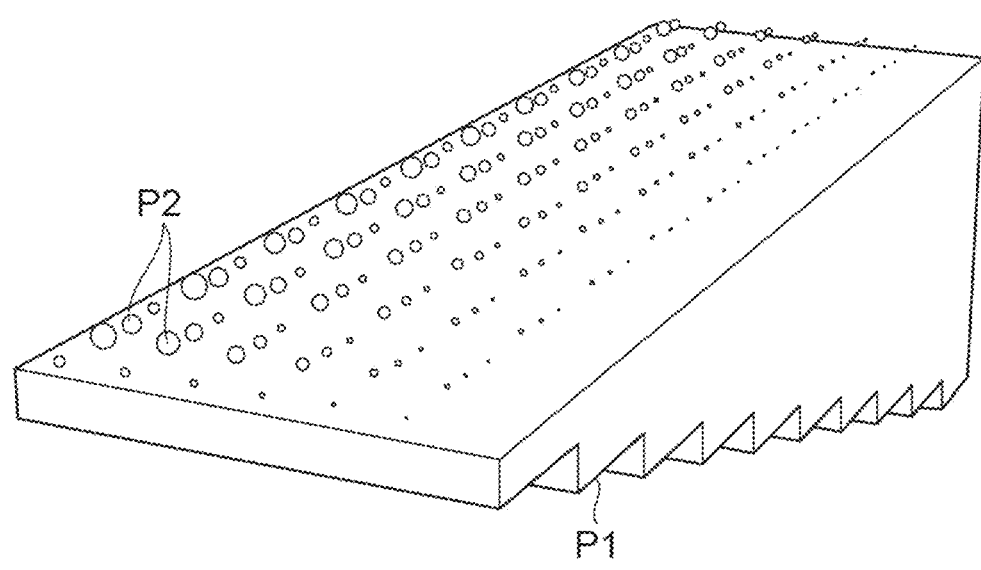
FIG. 44 is a perspective view illustrating an example of a structure of a jig used for the evaluation of a luminance to noise ratio which is performed by the selection unit 204E of FIG. 37.
Figure 45:
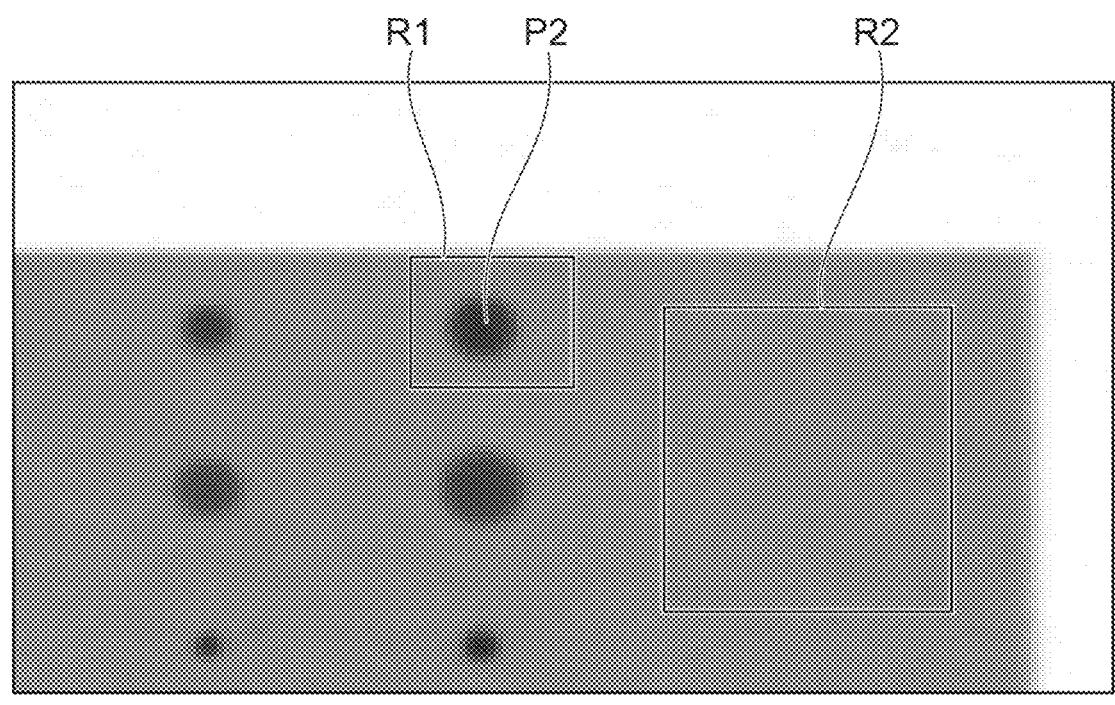
FIG. 45 is a diagram illustrating an X-ray transmission image after the noise removal process obtained for the jig of FIG. 44.

In addition to the evaluation of the above change in resolution, the selection unit 204E may evaluate the characteristics of the luminance to noise ratio of the image after noise removal and select trained model 206E used to generate an image having the highest characteristics. FIG. 44 shows an example of the structure of the jig used for the evaluation of the luminance to noise ratio. For example, as the jig, a jig in which foreign substances P2 having various materials and various sizes are scattered in a member P1 whose thickness changes stepwise in one direction can be used. FIG. 45 shows an X-ray transmission image obtained for the jig of FIG. 44 after the noise removal process. The selection unit 204E selects an image region R1 containing an image of the foreign substance P2 in the X-ray transmission image and an image region R2 not containing an image of the foreign substance P2 in the vicinity of the region R1, and calculates the minimum value $L_{MIN}$ of luminance in the image region R1, the average value $L_{AVE}$ of luminance in the image region R2, and the standard deviation $L_{SD}$ of luminance in the image region R2. The selection unit 204E calculates the luminance to noise ratio CNR using the following expression.

$$CNR=(L_{AVE}-L_{MIN})/L_{SD}$$

Further, the selection unit 204E calculates the luminance to noise ratio CNR for each of the X-ray transmission images after the application of the plurality of trained models 206E, and selects trained models 206E used to generate an X-ray transmission image having the highest luminance to noise ratio CNR.

Alternatively, the selection unit 204E may perform the calculation using the following expression on the basis of the average value $L_{AVE\_R1}$ of luminance in the image region R1, the average value $L_{AVE\_R2}$ of luminance in the image region R2, and the standard deviation $L_{SD}$ of luminance in the image region R2.

$$CNR=(L_{AVE\_R1}-L_{MIN\_R2})/L_{SD}$$

The processing unit 205E applies the trained models 206E selected by the selection unit 204E to the X-ray transmission image acquired for the target object F, and generates an output image by executing image processing for removing noise. The processing unit 205E then outputs the generated output image to the display device 30 or the like.

Figure 46:
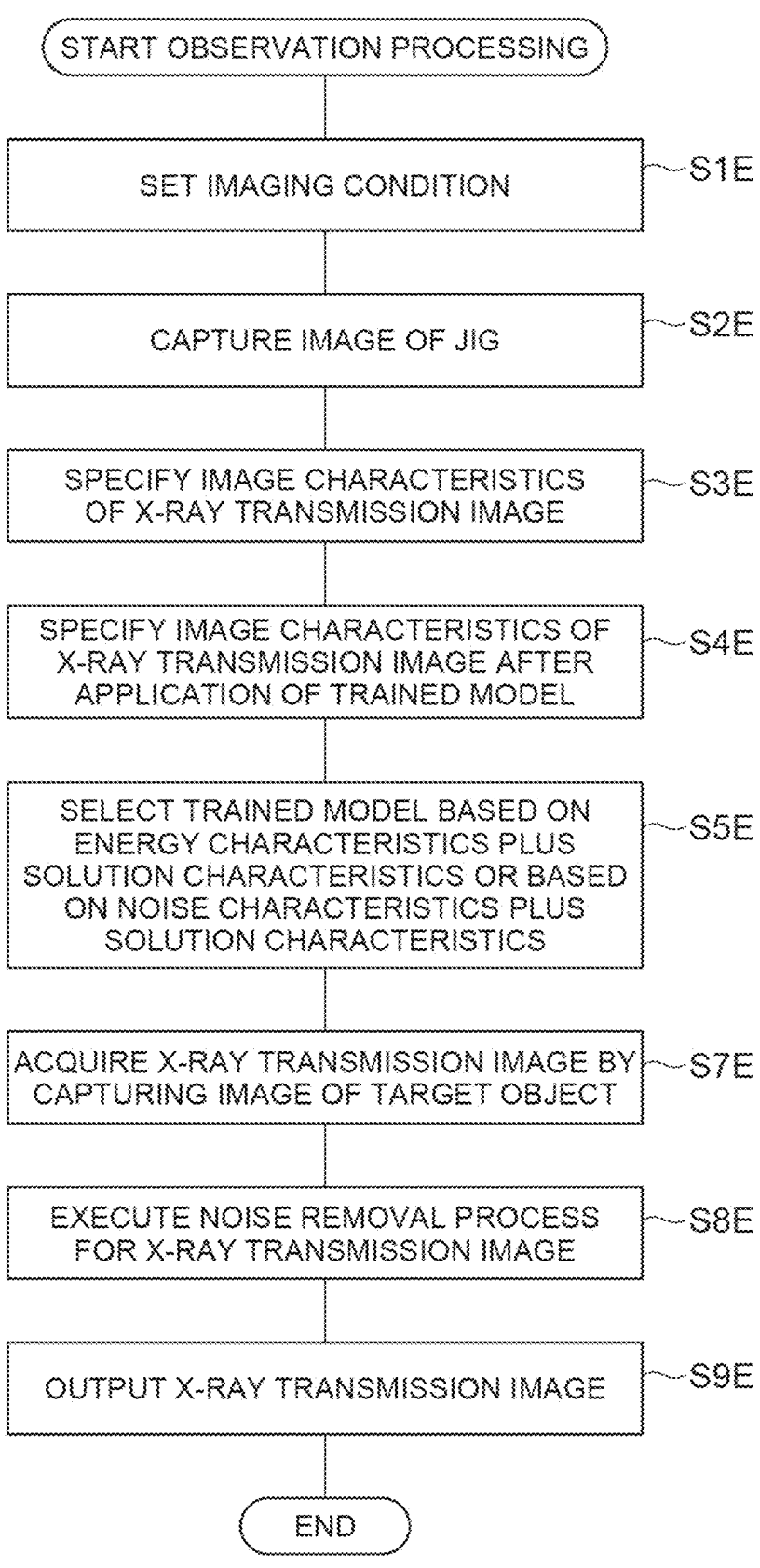
FIG. 46 is a flowchart illustrating a procedure of observation processing using an image acquiring device 1 according to a third embodiment.

Next, a procedure of observing an X-ray transmission image of the target object F using the image acquiring device 1 according to the third embodiment, that is, a flow of a radiographic image acquisition method according to the third embodiment, will be described. FIG. 46 is a flowchart illustrating a procedure of observation processing using the image acquiring device 1.

First, an operator (user) of the image acquiring device 1 sets the imaging conditions in the image acquiring device 1 such as the tube voltage of the X-ray irradiator 50 or the gain in the X-ray detection camera 10 (step S1E). Next, a jig is set in the image acquiring device 1, and the control device 20E acquires an X-ray transmission image for the jig (step S2E). In this case, X-ray transmission images of a plurality of types of jigs may be sequentially acquired.

Accordingly, the control device 20E specifies the image characteristics (energy characteristics, noise characteristics, and resolution characteristics) of the X-ray transmission image of the jig (step S3E). Further, the control device 20E applies a plurality of trained models 206E to the X-ray transmission image of the jig, and specifies the image characteristics (such as the resolution characteristics or the value of the luminance to noise ratio) of each X-ray transmission image after the application of the plurality of trained models 206E (step S4E).

Next, the control device 20E selects trained model 206E on the basis of the result of comparison between the energy characteristics of the X-ray transmission image of the jig and the energy characteristics of the image data used to construct the trained model 206E, and the degree of change in the resolution characteristics of the X-ray transmission image of the jig before and after the application of the trained model (step S5E). Here, the trained model 206E may be selected on the basis of the result of comparison between the noise characteristics of the X-ray transmission image of the jig and the noise characteristics of the image data used to construct trained models 206E, and the state of change in the resolution characteristics of the X-ray transmission image of the jig before and after the application of the trained model. In addition, in step S5E, a trained model 206E having the highest luminance to noise ratio CNR after the application of the trained model of the X-ray transmission image of the jig may be selected instead of the above process.

Further, in the image acquiring device 1, the target object F is set to capture an image of the target object F, and thus an X-ray transmission image of the target object F is acquired (step S7E). Next, the control device 20E applies the finally selected trained model 206E to the X-ray transmission image of the target object F, and thus the noise removal process is executed for the X-ray transmission image (step S8E). Finally, the control device 20E outputs an output image which is an X-ray transmission image that has undergone the noise removal process to the display device 30 (step S9E).

With the image acquiring device 1 described above, it is also possible to remove noise components while increasing signal components in the X-ray transmission image, and to effectively improve an S/N ratio in the X-ray transmission image. In addition, the image characteristics of the X-ray transmission image of the jig are specified, and a trained model used for noise removal is selected from the trained models constructed in advance on the basis of the image characteristics. Thereby, since the characteristics of the X-ray transmission image changing depending on the operating conditions and the like of the X-ray irradiator 50 in the image acquiring device 1 can be estimated, and the trained model 206E selected in accordance with the estimation result is used for noise removal, it is possible to realize noise removal corresponding to the relationship between luminance and noise in the X-ray transmission image. As a result, it is possible to effectively remove noise from the X-ray transmission image.

Generally, an X-ray transmission image contains noise derived from the generation of X-rays. It is also conceivable to increase the X-ray dose in order to improve the SN ratio of the X-ray transmission image. However, in that case, there is a problem in that increasing the X-ray dose increases the exposure of a sensor, shortens the life of the sensor, and shortens the life of the X-ray source, and thus it is difficult to achieve both an improvement in the SN ratio and an increase in life. In the present embodiment, it is not necessary to increase the X-ray dose, and thus it is possible to achieve both an improvement in the SN ratio and an increase in life.

In the present embodiment, in the selection of the trained model, the image characteristics of the X-ray transmission image of the jig and the image characteristics of the image data used to construct the trained model are compared with each other. Thereby, since the trained model 206E constructed by the image data corresponding to the image characteristics of the X-ray transmission image of the jig is selected, it is possible to effectively remove noise from the X-ray transmission image of the target object F.

In addition, in the present embodiment, the trained model is selected using the image characteristics of an image in which a plurality of trained models 206E are applied to the X-ray transmission image of the jig. In this case, since the trained model 206E is selected on the basis of the image characteristics of the X-ray transmission image of the jig to which a plurality of trained models 206E are actually applied, it is possible to effectively remove noise from the X-ray transmission image of the target object F.

Particularly, in the present embodiment, energy characteristics or noise characteristics are used as the image characteristics. In this case, the trained model 206E constructed by an image having characteristics similar to the energy characteristics or noise characteristics of the X-ray transmission image of the jig changing depending on the imaging conditions of the image acquiring device 1 is selected. As a result, it is possible to remove noise from the X-ray transmission image of the target object F corresponding to a change in the conditions of the image acquiring device 1.

In the present embodiment, resolution characteristics or luminance to noise ratio are also used as the image characteristics. According to such a configuration, the selected trained model 206E is applied, and thus it is possible to obtain an X-ray transmission image having good resolution characteristics or luminance to noise ratio. As a result, it is possible to remove noise from the X-ray transmission image of the target object corresponding to a change in the conditions of the image acquiring device 1.

In the above-described embodiment, it is preferable that the trained model is constructed through machine learning using image data obtained by adding a noise value along a normal distribution to a radiographic image of a predetermined structure as training data. Thereby, it becomes easy to prepare image data which is training data used to construct the trained model, and thus it is possible to efficiently construct the trained model.

In addition, in the above-described embodiment, it is also preferable that the image processing module includes a noise map generation unit configured to derive an evaluation value obtained by evaluating a spread of a noise value from a pixel value of each pixel of the radiographic image on the basis of relational data indicating a relationship between the pixel value and the evaluation value and generate a noise map which is data obtained by associating the derived evaluation value with each pixel of the radiographic image, and a processing unit configured to input the radiographic image and the noise map to the trained model and execute the noise removal process of removing noise from the radiographic image. In addition, it is also preferable that the execution step includes deriving an evaluation value obtained by evaluating a spread of a noise value from a pixel value of each pixel of the radiographic image on the basis of relational data indicating a relationship between the pixel value and the evaluation value, generating a noise map which is data obtained by associating the derived evaluation value with each pixel of the radiographic image, inputting the radiographic image and the noise map to the trained model, and executing the noise removal process of removing noise from the radiographic image. In this case, the evaluation value is derived from the pixel value of each image of the radiographic image on the basis of the relational data indicating the relationship between the pixel value and the evaluation value obtained by evaluating the spread of noise value, and the noise map which is data obtained by associating the derived evaluation value with each pixel of the radiographic image is generated. The radiographic image and the noise map are input to the trained model constructed through machine learning in advance, and the noise removal process of removing noise from the radiographic image is executed. Thereby, in consideration of the spread of the noise value evaluated from the pixel value of each pixel of the radiographic image, noise in each pixel of the radiographic image is removed through machine learning, and thus it is possible to realize noise removal corresponding to the relationship between the pixel value and the spread of noise in the radiographic image using the trained model. As a result, it is possible to effectively remove the noise in the radiographic image.

Further, in the above-described embodiment, it is preferable that the image processing module includes an input unit configured to accept an input of condition information indicating either conditions of a source of radiation or imaging conditions when the radiation is radiated to capture an image of a target object, a calculation unit configured to calculate average energy related to the radiation passing through the target object on the basis of the condition information, and a narrowing unit configured to narrow down trained models used for the noise removal process from a plurality of trained models constructed through machine learning in advance using image data on the basis of the average energy. In addition, it is also preferable that the execution step includes accepting an input of condition information indicating either conditions of a source of radiation or imaging conditions when the radiation is radiated to capture an image of a target object, calculating average energy related to the radiation passing through the target object on the basis of the condition information, and narrowing down trained models used for the noise removal process from a plurality of trained models constructed through machine learning in advance using image data on the basis of the average energy. In this case, the average energy of the radiation passing through the target object is calculated on the basis of the conditions of the source of the radiation or the imaging conditions when the radiographic image of the target object is acquired. Candidates for the trained model use for noise removal are narrowed down from the trained models constructed in advance on the basis of the average energy. Thereby, the trained model corresponding to the average energy of the radiation which is a target for imaging is used for noise removal, and thus it is possible to realize noise removal corresponding to the relationship between luminance and noise in the radiographic image. As a result, it is possible to effectively remove the noise in the radiographic image.

In addition, in the above-described embodiment, it is also preferable that the image processing module includes a specification unit configured to specify image characteristics of the radiographic image acquired by the imaging device with a jig as a target, a selection unit configured to select a trained model from a plurality of trained models constructed through machine learning in advance using image data on the basis of the image characteristics, and a processing unit configured to execute the noise removal process using the selected trained model. In addition, it is also preferable that the execution step includes specifying image characteristics of the radiographic image acquired with a jig as a target, selecting a trained model from a plurality of trained models constructed through machine learning in advance using image data on the basis of the image characteristics, and executing the noise removal process using the selected trained model. With such a configuration, the image characteristics of the radiographic image of the jig are specified, and a trained model used for noise removal is selected from the trained models constructed in advance on the basis of the image characteristics. Thereby, since the characteristics of the radiographic image changing depending on the conditions of the radiation source and the like in the system can be estimated, and the trained model selected in accordance with the estimation result is used for noise removal, it is possible to realize noise removal corresponding to the relationship between luminance and noise in the radiographic image. As a result, it is possible to effectively remove the noise in the radiographic image.

The embodiment uses a radiographic image acquiring device, a radiographic image acquiring system, and a radiographic image acquisition method, thereby allowing an S/N ratio in a radiographic image to be effectively improved.

REFERENCE SIGNS LIST

1 Image acquiring device (radiographic image acquiring device, radiographic image acquiring system)
10 X-ray detection camera (imaging device)
11 Scintillator
12 Scan camera (detection element)
20, 20A to 20E Control device (image processing module)
50 X-ray irradiator (radiation source)
60 Belt conveyor (transport device)
72 Pixel
74 Pixel line (pixel group)
73 Readout circuit
201, 201C Input unit
202, 202A, 202C, 202D Calculation unit
202E Specification unit
203C, 203D Narrowing unit
204, 204A, 204B Noise map generation unit
204C, 204E Selection unit
205, 205C, 205E Processing unit
206C, 206E, 207 Trained model
F Target object
TD Transport direction (one direction)

The invention claimed is:

1. A radiographic image acquiring device comprising:
an imaging device configured to scan radiation passing through a target object in one direction and capture an image thereof to acquire a radiographic image;
a scintillator configured to be provided on the imaging device to convert the radiation into light; and
an image processing module configured to calculate an average energy related to the radiation passing through the target object, evaluate the spread of a noise value using the average energy, input the radiographic image to a trained model constructed through machine training in advance using image data and execute a noise removal process of removing noise from the radiographic image,
wherein the imaging device includes
a detection element in which pixel lines each having M (M is an integer equal to or greater than 2) pixels arranged in the one direction are configured to be arranged in N columns (N is an integer equal to or greater than 2) in a direction orthogonal to the one direction and which is configured to output a detection signal related to the light for each of the pixels, and
a readout circuit configured to output the radiographic image by adding the detection signals output from at least two of the M pixels for each of the pixel lines of N columns in the detection element and sequentially outputting the added N detection signals, and
wherein the image processing module includes
at least one processor configured to derive an evaluation value obtained by evaluating a spread of a noise value from a pixel value of each pixel of the radiographic image on the basis of relational data indicating a relationship between the pixel value and the evaluation value and generate a noise map which is data obtained by associating the derived evaluation value with each pixel of the radiographic image, and
input the radiographic image and the noise map to the trained model and execute the noise removal process of removing noise from the radiographic image.

2. The radiographic image acquiring device according to claim 1, wherein the trained model is constructed through machine training using image data obtained by adding a noise value along a normal distribution to a radiographic image of a predetermined structure as training data.

3. The radiographic image acquiring device according to claim 1, wherein the image processing module includes
at least one processor configured to accept an input of condition information indicating either conditions of a source of radiation or imaging conditions when the radiation is radiated to capture an image of a target object,
calculate average energy related to the radiation passing through the target object on the basis of the condition information, and
narrow down trained models used for the noise removal process from a plurality of trained models constructed through machine training in advance using image data on the basis of the average energy.

4. The radiographic image acquiring device according to claim 1, wherein the image processing module includes
at least one processor configured to specify image characteristics of the radiographic image acquired by the imaging device with a jig as a target,
select a trained model from a plurality of trained models constructed through machine training in advance using image data on the basis of the image characteristics, and
execute the noise removal process using the selected trained model.

5. A radiographic image acquiring system comprising:
the radiographic image acquiring device according to claim 1;
a source configured to radiate radiation to the target object; and
a transport device configured to transport the target object to the imaging device in the one direction.

6. A radiographic image acquisition method comprising:
scanning scintillation light corresponding to radiation passing through a target object in one direction and capturing an image thereof to acquire a radiographic image;
calculating an average energy related to the radiation passing through the target object and evaluating the spread of a noise value using the average energy; and
inputting the radiographic image to a trained model constructed through machine training in advance using image data and executing a noise removal process of removing noise from the radiographic image, wherein the acquiring of the radiographic image includes using a detection element in which pixel lines each having M (M is an integer equal to or greater than 2) pixels arranged in the one direction are configured to be arranged in N columns (N is an integer equal to or greater than 2) in a direction orthogonal to the one direction and which is configured to output a detection signal related to the scintillation light for each of the pixels, to output the radiographic image by adding the detection signals output from at least two of the M pixels for each of the pixel lines of N columns in the detection element and sequentially output the added N detection signals, and wherein the executing includes deriving an evaluation value obtained by evaluating a spread of a noise value from a pixel value of each pixel of the radiographic image on the basis of relational data indicating a relationship between the pixel value and the evaluation value, generating a noise map which is data obtained by associating the derived evaluation value with each pixel of the radiographic image, inputting the radiographic image and the noise map to the trained model, and executing the noise removal process of removing noise from the radiographic image.

7. The radiographic image acquisition method according to claim 6, wherein the trained model is constructed through machine training using image data obtained by adding a noise value along a normal distribution to a radiographic image of a predetermined structure as training data.

8. The radiographic image acquisition method according to claim 6, wherein the executing includes accepting an input of condition information indicating either conditions of a source of radiation or imaging conditions when the radiation is radiated to capture an image of a target object, calculating average energy related to the radiation passing through the target object on the basis of the condition information, and narrowing down trained models used for the noise removal process from a plurality of trained models constructed through machine training in advance using image data on the basis of the average energy.

9. The radiographic image acquisition method according to claim 6, wherein the executing includes specifying image characteristics of the radiographic image acquired with a jig as a target, selecting a trained model from a plurality of trained models constructed through machine training in advance using image data on the basis of the image characteristics, and executing the noise removal process using the selected trained model.

10. The radiographic image acquisition method according to claim 6, further comprising:

radiating radiation to the target object; and transporting the target object to the detection element in the one direction.

* * * * *